United States Patent
Ramireddy et al.

(10) Patent No.: US 11,996,910 B2
(45) Date of Patent: May 28, 2024

(54) DOPPLER CODEBOOK-BASED PRECODING AND CSI REPORTING FOR WIRELESS COMMUNICATIONS SYSTEMS

(71) Applicant: Fraunhofer-Gesellschaft zur Förderung der angewandten Forschung e.V., Munich (DE)

(72) Inventors: Venkatesh Ramireddy, Erlangen (DE); Markus Landmann, Erlangen (DE); Marcus Großmann, Erlangen (DE); Sutharshun Varatharaajan, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 309 days.

(21) Appl. No.: 17/197,562

(22) Filed: Mar. 10, 2021

(65) Prior Publication Data
US 2021/0226674 A1   Jul. 22, 2021

Related U.S. Application Data

(63) Continuation of application No. PCT/EP2018/074444, filed on Sep. 11, 2018.

(51) Int. Cl.
*H04B 7/0417* (2017.01)
*H04B 7/01* (2006.01)
(Continued)

(52) U.S. Cl.
CPC .............. *H04B 7/0417* (2013.01); *H04B 7/01* (2013.01); *H04B 7/0486* (2013.01);
(Continued)

(58) Field of Classification Search
CPC ..................... H04B 7/0413; H04B 7/0452
(Continued)

(56) References Cited

U.S. PATENT DOCUMENTS

| 2008/0080634 A1 | 4/2008 | Kotecha et al. |
| 2011/0250919 A1 | 10/2011 | Barbieri et al. |

(Continued)

FOREIGN PATENT DOCUMENTS

| CN | 105103463 A | 11/2015 |
| CN | 105264787 A | 1/2016 |

(Continued)

OTHER PUBLICATIONS

3GPP TS 38.211 V15.1.0, 3rd Generation Partnership Project; Technical Specification Group Radio Access Network; NR; Physical channels and modulation (Release 15), Mar. 2018.
(Continued)

*Primary Examiner* — Kiet M Doan
(74) *Attorney, Agent, or Firm* — NKL Law; Jae Youn Kim

(57) ABSTRACT

A communication device providing CSI feedback in a wireless communication system includes a transceiver to receive downlink reference signals and downlink signals including a reference signal configuration. A processor estimates an explicit CSI in the frequency domain. The processor selects a Doppler-delay-beam precoder matrix for a composite Doppler-delay-beam three-stage precoder, which is based on one or more codebooks including one or more transmit-side spatial beam components,
one or more delay components, and
one or more Doppler-frequency components,
(Continued)

The processor calculates a CQI and/or a PMI and/or a rank indicator, RI, using the explicit CSI and the composite Doppler-delay-beam three-stage precoder, and reports the CSI feedback including the CQI, and/or the PMI and/or the RI. The one or more delay and/or Doppler-frequency components are defined by one or more sub-matrices of a DFT matrix or an oversampled DFT matrix.

19 Claims, 15 Drawing Sheets

(51) Int. Cl.
    *H04B 7/0456*     (2017.01)
    *H04B 7/06*     (2006.01)
(52) U.S. Cl.
    CPC ......... *H04B 7/0626* (2013.01); *H04B 7/0632* (2013.01); *H04B 7/0639* (2013.01)
(58) Field of Classification Search
    USPC .......................................................... 455/450
    See application file for complete search history.

(56) References Cited

U.S. PATENT DOCUMENTS

| | | | |
|---|---|---|---|
| 2014/0177683 | A1 | 6/2014 | Krishnamurthy et al. |
| 2014/0177745 | A1 | 6/2014 | Krishnamurthy et al. |
| 2016/0006122 | A1 | 1/2016 | Seol et al. |
| 2016/0056875 | A1 | 2/2016 | Kang et al. |
| 2016/0087708 | A1 | 3/2016 | Kang et al. |
| 2016/0119097 | A1 | 4/2016 | Nam et al. |
| 2016/0262000 | A1* | 9/2016 | Koorapaty ............ H04W 76/28 |
| 2017/0078062 | A1 | 3/2017 | Park et al. |
| 2017/0279509 | A1 | 9/2017 | Rahman et al. |
| 2017/0302353 | A1 | 10/2017 | Rahman et al. |
| 2017/0346580 | A1 | 11/2017 | Astrom et al. |
| 2018/0076871 | A1 | 3/2018 | Rahman et al. |
| 2018/0145809 | A1 | 5/2018 | Kwak et al. |
| 2018/0198499 | A1 | 7/2018 | Park et al. |
| 2018/0219603 | A1 | 8/2018 | Park et al. |
| 2019/0190624 | A1* | 6/2019 | Kyosti ................. H04B 7/0413 |
| 2020/0037186 | A1 | 1/2020 | Thangarasa et al. |
| 2020/0083938 | A1 | 3/2020 | Park et al. |

FOREIGN PATENT DOCUMENTS

| | | |
|---|---|---|
| CN | 107925466 A | 4/2018 |
| CN | 108028684 A | 5/2018 |
| EP | 3576312 A1 | 12/2019 |
| EP | 3850761 | 3/2020 |
| JP | 2016-40930 A | 3/2016 |
| JP | 2016-63497 A | 4/2016 |
| JP | 2017-163551 A | 9/2017 |
| JP | 2018-507572 A | 3/2018 |
| KR | 20150064383 A | 6/2015 |
| WO | 2014182002 A1 | 11/2014 |
| WO | 2015084051 A1 | 6/2015 |
| WO | 2015/174616 A1 | 11/2015 |
| WO | 2016/068628 A1 | 5/2016 |
| WO | 2017/135295 A1 | 8/2017 |
| WO | 2017/152789 A1 | 9/2017 |
| WO | 2017/156732 A1 | 9/2017 |
| WO | 2017/166281 A1 | 10/2017 |
| WO | 2018/052255 A1 | 3/2018 |
| WO | 2018045028 A1 | 3/2018 |
| WO | 2018174636 A2 | 9/2018 |
| WO | 2020/052736 A1 | 3/2020 |

OTHER PUBLICATIONS

3GPP TS 38.214 V15.1.0, 3rd Generation Partnership Project; Technical Specification Group Radio Access Network; NR; Physical layer procedures for data (Release 15), Mar. 2018.
3GPP TS 38.331 V15.1.0, 3rd Generation Partnership Project; Technical Specification Group Radio Access Network; NR; Radio Resource Control (RRC); Protocol specification (Release 15), Mar. 2018.
Fraunhofer Iis et al, Enhancements on Type-II CSI: Doppler Approach, 3GPP Draft, R1-1902124, Mobile Competence Ctr., 650, Route des Lucioles, Sophia-Antipolis Cedex, F-06921, vol. RAN WG1, Nr:Athens, GR, Feb. 25-Mar. 1, 2019, XP051599819.
Fraunhofer Iis et al, Enhancements on Type-II CSI reporting, 3GPP Draft, R1-1813130, Mobile Competence Ctr., 650, Route des Lucioles, Sophia-Antipolis Cedex, F-06921, vo. RAN WG1, Nr:Spokane, USA, Nov. 12-16, 2018, XP051555112.
Samsung, Summary of CSI enhancement for MU-MIMO, 3GPP Draft, R1-1902304 R16 Summary MUCSI Final, Mobile Competence Ctr., 650, Route des Lucioles, Sophia-Antipolis Cedex, F-06921, Feb. 25-Mar. 1, 2019, vol. RAN WG1, Nr:Athens, GR, XP051599998.
Interdigital Communications LLC, 3GPP Draft, R1-112240, CSI feedback for non-uniform networks, 3rd Generation Partnership Project (3GPP), Mobile Competence Centre, 650, route des Lucioles, F-06921 Sophia- Antipolis Cedex, France, vol. RAN WG1, Athens, Greece, Aug. 22, 2011, XP050537401.
Huawei et al, "Enhancements on CSI reporting and codebook design", 3GPP draft, R1-1808949, Mobile Competence Ctr., 650, Route des Lucioles, F-06921 Sophia-Antipolis, Cedex, vol. RAN WG1, Gothenburg, Sweden, 2018, XP51516324.
K. Manolakis et al, "Channel Prediction by Doppler-Delay Analysis and Benefits for Base Station Cooperation," in 77th IEEE Vehicular Technology Conference, pp. 1-6, Jun. 2, 2013, XP032548009.
R. S. Thoma et al, "RIMAX—A maximum likelihood framework for parameter estimation in multidimensional channel sounding." Proceedings of the International Symposium on Antennas and Propagation (ISAP'04), 2004.
I. Barhumi et al, "Optimal training design for MIMO OFDM systems in mobile wireless channels," IEEE Trans. Signal Process, vol. 51, No. 6, pp. 1615-1624, Jun. 2003, XP011096658.
P. Hoeher et al, "Two-dimensional pilot-symbol-aided channel estimation by Wiener filtering," in Proc. IEEE ICASSP-97, Munich, Germany, Apr. 1997, pp. 1845-1848, XP010226500.
V. Jungnickel et al, "Backhaul requirements for inter-site cooperation in heterogeneous LTE-Advanced networks", 2013 IEEE ICC, Jun. 9, 2013, pp. 905-910, XP032518656.
Akira Saito, "Office Action for JP Application No. 2020-567013", dated Feb. 8, 2022, JPO, Japan.
Intellectual Property India, "Opportunistic Interference Alignment For Multi-Cell Multi-User Uplink", Patent for IN Application No. 3728/CHENP/2015, Patent No. 381782, Jan. 15, 2014, Intellectual Property India, India.
Thiyagaraja Guptha Dhayanandan, "Office Action for IN Application No. 202037050535", dated Dec. 31, 2021, Intellectual Property India, India.
NTT Docomo, Inc. (Rapporteur), RAN WG's progress on NR technology SI in the January adhoc meeting[online], 3GPP TSG-RAN WG2 #97 R2-1701059, Feb. 17, 2017.
Huawei et al., R1-1808949, Enhancements on CSI reporting and codebook design, 3GPP TSG RAN WG1 #94, 2018.
Fraunhofer IIS, Fraunhofer HHI, 3GPP TSG-RAN WG1 #93, R1-1806124, Enhancements on Type-II CSI Reporting Scheme, May 21, 2018 to May 25, 2018, Busan, South Korea.
Minh Trang T Nguyen, Notice of References Cited for Patent Application No. 18/171,77, Nov. 9, 2023, 1 page, USPTO.
Song, Rongbing, Notice of Allowance, Jan. 31, 2024, 4 pages, The National Intellectual Property Administration of PRC (CNIPA).

* cited by examiner

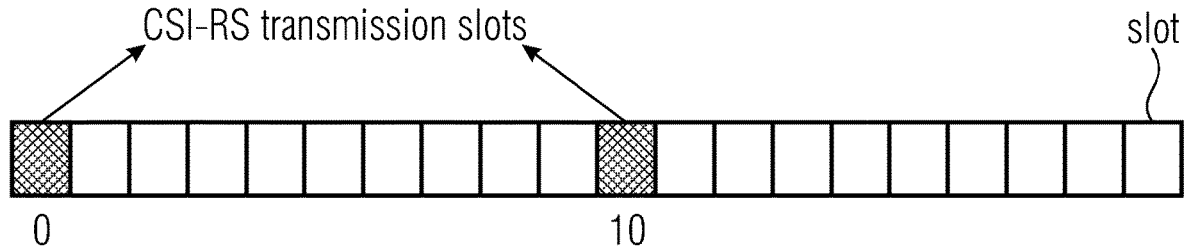
Fig. 5(a)
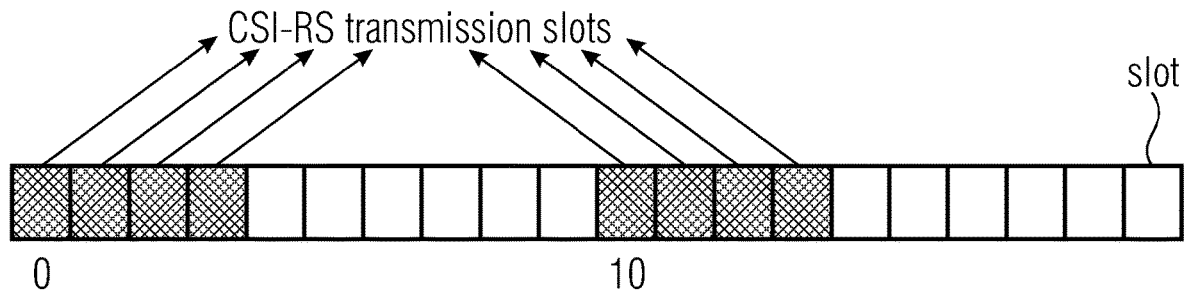
Fig. 5(b)
-- ASN1START
-- TAG-CSI-RS-BURSTDURATION-START
CSI-RS-BURSTDURATION : : = ENUMERATED {
    burstSlots0, burstSlots1, burstSlots2, burstSlots3, burstSlots4, burstSlots5
}
-- TAG-CSI-RS-BURSTDURATION-STOP
-- ASN1STOP
Fig. 6

DOPPLER CODEBOOK-BASED PRECODING AND CSI REPORTING FOR WIRELESS COMMUNICATIONS SYSTEMS

CROSS-REFERENCES TO RELATED APPLICATIONS

This application is a continuation of copending International Application No. PCT/EP2018/074444, filed Sep. 11, 2018, which is incorporated herein by reference in its entirety.

The present application concerns the field of wireless communications, more specifically to wireless communication systems employing precoding using Doppler codebook-based precoding and channel state information, CSI, reporting.

BACKGROUND OF THE INVENTION

FIG. 1 is a schematic representation of an example of a terrestrial wireless network 100 including a core network 102 and a radio access network 104. The radio access network 104 may include a plurality of base stations $gNB_1$ to $gNB_5$, each serving a specific area surrounding the base station schematically represented by respective cells $106_1$ to $106_5$. The base stations are provided to serve users within a cell. The term base station, BS, refers to as gNB in 5G networks, eNB in UMTS/LTE/LTE-A/LTE-A Pro, or just BS in other mobile communication standards. A user may be a stationary device or a mobile device. Further, the wireless communication system may be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1 shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1 by the arrows pointing to "core". The core network 102 may be connected to one or more external networks. Further, some or all of the respective base station $gNB_1$ to $gNB_5$ may connected, e.g. via the S1 or X2 interface or XN interface in NR, with each other via respective backhaul links $116_1$ to $116_5$, which are schematically represented in FIG. 1 by the arrows pointing to "gNBs". The wireless network or communication system depicted in FIG. 1 may by an heterogeneous network having two distinct overlaid networks, a network of macro cells with each macro cell including a macro base station, like base station $gNB_1$ to $gNB_5$, and a network of small cell base stations (not shown in FIG. 1), like femto or pico base stations.

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI), etc. For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration, like 10 milliseconds, in the time domain and having a given bandwidth in the frequency domain. The frame may have a certain number of subframes of a predefined length, e.g., 2 subframes with a length of 1 millisecond. Each subframe may include two slots of 6 or 7 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

In the wireless communication network as shown in FIG. 1 the radio access network 104 may be a heterogeneous network including a network of primary cells, each including a primary base station, also referred to as a macro base station. Further, a plurality of secondary base stations, also referred to as small cell base stations, may be provided for each of the macro cells. In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-advanced pro standard or the 5G or NR, new radio, standard.

In a wireless communication system like to one depicted schematically in FIG. 1, multi-antenna techniques may be used, e.g., in accordance with LTE or NR, to improve user data rates, link reliability, cell coverage and network capacity. To support multi-stream or multi-layer transmissions, linear precoding is used in the physical layer of the communication system. Linear precoding is performed by a precoder matrix which maps layers of data to antenna ports. The precoding may be seen as a generalization of beamforming, which is a technique to spatially direct/focus data transmission towards an intended receiver. The precoder matrix to be used at the gNB to map the data to the transmit antenna ports is decided using channel state information, CSI.

In a communication system as described above, such as LTE or New Radio (5G), downlink signals convey data signals, control signals containing down link, DL, control information (DCI), and a number of reference signals or symbols (RS) used for different purposes. A gNodeB (or gNB or base station) transmits data and control information (DCI) through the so-called physical downlink shared channel (PDSCH) and physical downlink control channel (PDCCH) or enhanced PDCCH (ePDCCH), respectively. Moreover, the downlink signal(s) of the gNB may contain one or multiple types of RSs including a common RS (CRS) in LTE, a channel state information RS (CSI-RS), a demodulation RS (DM-RS), and a phase tracking RS (PT-RS). The CRS is transmitted over a DL system bandwidth part, and used at the user equipment (UE) to obtain a channel estimate to demodulate the data or control information. The CSI-RS is transmitted with a reduced density in the time and frequency domain compared to CRS, and used at the UE for channel estimation/channel state information (CSI) acquisition. The DM-RS is transmitted only in a bandwidth part of the respective PDSCH and used by the UE for data demodulation. For signal precoding at the gNB, several CSI-RS reporting mechanism were introduced such as non-precoded CSI-RS and beamformed CSI-RS reporting (see reference [1]). For a non-precoded CSI-RS, a one-to-one mapping between a CSI-RS port and a transceiver unit, TXRU, of the antenna array at the gNB is utilized. Therefore, non-precoded CSI-RS provides a cell-wide coverage where the different CSI-RS ports have the same beam-direction and beam-width. For beamformed/precoded UE-specific or non-UE-specific CSI-RS, a beam-forming operation is applied over a single- or multiple antenna ports to have several narrow beams with high gain in different directions and therefore, no cell-wide coverage.

In a wireless communication system employing time division duplexing, TDD, due to channel reciprocity, the channel state information (CSI) is available at the base station (gNB). However, when employing frequency division duplexing, FDD, due to the absence of channel reciprocity, the channel has to be estimated at the UE and feed back to the gNB. FIG. 2 shows a block-based model of a MIMO DL transmission using codebook-based-precoding in accordance with LTE release 8. FIG. 2 shows schematically the base station 200, gNB, the user equipment, UE, 202 and the channel 204, like a radio channel for a wireless data communication between the base station 200 and the user equipment 202. The base station includes an antenna array $ANT_T$ having a plurality of antennas or antenna elements, and a precoder 206 receiving a data vector 208 and a precoder matrix F from a codebook 210. The channel 204 may be described by the channel tensor/matrix 212. The user equipment 202 receives the data vector 214 via an antenna or an antenna array $ANT_R$ having a plurality of antennas or antenna elements. A feedback channel 216 between the user equipment 202 and the base station 200 is provided for transmitting feedback information. The previous releases of 3GPP up to Rel.15 support the use of several downlink reference symbols (such as CSI-RS) for CSI estimation at the UE. In FDD systems (up to Rel. 15), the estimated channel at the UE is reported to the gNB implicitly where the CSI transmitted by the UE over the feedback channel includes the rank index (RI), the precoding matrix index (PMI) and the channel quality index (CQI) (and the CRI from Rel. 13) allowing, at the gNB, deciding the precoding matrix, and the modulation order and coding scheme (MCS) of the symbols to be transmitted. The PMI and the RI are used to determine the precoding matrix from a predefined set of matrices $\Omega$ called 'codebook'. The codebook, e.g., in accordance with LTE, may be a look-up table with matrices in each entry of the table, and the PMI and RI from the UE decide from which row and column of the table the precoder matrix to be used is obtained. The precoders and codebooks are designed up to Rel. 15 for gNB s equipped with one-dimensional Uniform Linear Arrays (ULAs) having $N_1$ dual-polarized antennas (in total $N_t=2N_1$ antennas), or with two-dimensional Uniform Planar Arrays (UPAs) having dual-polarized antennas at $N_1N_2$ positions (in total $N_t=2N_1N_2$ antennas). The ULA allows controlling the radio wave in the horizontal (azimuth) direction only, so that azimuth-only beamforming at the gNB is possible, whereas the UPA supports transmit beamforming on both vertical (elevation) and horizontal (azimuth) directions, which is also referred to as full-dimension (FD) MIMO. The codebook, e.g., in the case of massive antenna arrays such as FD-MIMO, may be a set of beamforming weights that forms spatially separated electromagnetic transmit/receive beams using the array response vectors of the array. The beamforming weights (also referred to as the 'array steering vectors') of the array are amplitude gains and phase adjustments that are applied to the signal fed to the antennas (or the signal received from the antennas) to transmit (or obtain) a radiation towards (or from) a particular direction. The components of the precoder matrix are obtained from the codebook, and the PMI and the RI are used to 'read' the codebook and obtain the precoder. The array steering vectors may be described by the columns of a 2D Discrete Fourier Transform (DFT) matrix when ULAs or UPAs are used for signal transmission.

The precoder matrices used in the Type-I and Type-II CSI reporting schemes in 3GPP New Radio Rel. 15 are defined in frequency-domain and have a dual-stage structure: $F(s)=F_1F_2(s)$, $s=0 \ldots, S-1$ (see reference [2]), where S denotes the number of subbands. The matrix $F_1$ is a wideband matrix, independent on index s, and contains U spatial beamforming vectors (the so-called spatial beams) $b_u \in \mathbb{C}^{N_1N_2 \times 1}$, $u=1, \ldots, U$ selected out of a DFT-codebook matrix, $$F_1 = \begin{bmatrix} b_1, \ldots, b_U & 0 \ldots 0 \\ 0 \ldots 0 & b_1, \ldots, b_U \end{bmatrix} \in \mathbb{C}^{2N_1N_2 \times 2U}.$$

The matrix $F_2(s)$, is a selection/combining/co-phasing matrix that selects/combines/co-phases the beams defined in $F_1$ for the sth configured sub-band.

For example, for a rank-1 transmission and Type-I CSI reporting, $F_2(s)$ is given for a dual-polarized antenna array by [2]

$$F_2(s) = \begin{bmatrix} e_u \\ e^{j\delta_1} e_u \end{bmatrix} \in \mathbb{C}^{2U \times 1},$$

where $e_u \in \mathbb{C}^{U \times 1}$, $u=1, 2, \ldots, U$ contains zeros at all positions, except the u-th position which is one. Such a definition of $e_u$ selects the u-th vector for each polarization of the antenna array, and combines them across both polarizations. Furthermore, $\delta_1$ is a quantized phase adjustment for the second polarization of the antenna array.

For example, for a rank-1 transmission and Type-II CSI reporting, $F_2(s)$ is given for dual-polarized antenna arrays by [2]

$$F_2(s) = \begin{bmatrix} e^{j\delta_1} p_1 \\ \vdots \\ e^{j\delta_{2U}} p_{2U} \end{bmatrix} \in \mathbb{C}^{U \cdot 2 \times 1}$$

where $p_u$ and $\delta_u$, $u=1, 2, \ldots, 2U$ are quantized amplitude and phase beam-combining coefficients, respectively.

For rank-R transmission, $F_2(s)$ contains R vectors, where the entries of each vector are chosen to combine single or multiple beams within each polarization and/or combining them across both polarizations.

The selection of the matrices $F_1$ and $F_2(s)$ is performed by the UE based on the knowledge of the current channel conditions. The selected matrices are contained in the CSI report in the form of a RI and a PMI and used at the gNB to update the multi-user precoder for the next transmission time interval.

An inherent drawback of the current CSI reporting formats described in [2] for the implicit feedback scheme is that the RI and PMI only contain information of the current channel conditions. Consequently, the CSI reporting rate is related to the channel coherence time which defines the time duration over which the channel is considered to be not varying. This means, in quasi-static channel scenarios, where the UE does not move or moves slowly, the channel coherence time is large and the CSI needs to be less frequently updated. However, if the channel conditions change fast, for example due to a high movement of the UE in a multi-path channel environment, the channel coherence time is short and the transmit signals experience severe fading caused by a Doppler-frequency spread. For such channel conditions, the CSI needs to be updated frequently which causes a high feedback overhead. Especially, for future NR systems (Rel. 16) that are likely to be more multi-user centric, the multiple CSI reports from users in highly-dynamic channel scenarios will drastically reduce the overall efficiency of the communication system.

To overcome this problem, several explicit CSI feedback schemes have been proposed that take into account the channel-evolution over time (see reference [3]). Here, explicit CSI refers to reporting of explicit channel coefficients from the UE to the gNB without a codebook for the precoder selection at the UE. Those schemes have in common estimating the parameters of the dominant channel taps of the multipath propagation channel as well as their time-evolution at the UE. For example, in [3] each channel tap is modelled as a sum of sub-channel taps where each sub-tap is parameterized with a Doppler-frequency shift and path gain. The estimated parameters for each channel tap are fed back to the base station, where they are used with a channel model for time-domain based channel prediction before downlink precoding. The availability of explicit CSI comes at an increased overhead for the feedback channel compared to implicit-based channel feedback, especially for slow-varying channels, which is not desired.

For example, WO 2018/052255 A1 relates to explicit CSI acquisition to represent the channel in wireless communication systems using the principle component analysis (PCA), which is applied on the frequency-domain channel matrix, covariance matrix, or eigenvector of the channel matrix. Thus, a codebook approach for downlink signal precoding at the base station equipped with a two-dimensional array and CSI reporting configuration is proposed. However, an inherent drawback of the proposed CSI reporting scheme is that the CSI report from a user contains only information about the selected CQI, PMI and RI with respect to the current MIMO channel state/realization and does not take into account channel variations over time caused by small-scale channel fading. Therefore, when users experience fast-fading channel conditions, a frequent CSI update is needed which causes a high feedback overhead over time. Moreover, the proposed CSI reporting scheme is restricted to one beam per layer PMI feedback which leads to a limited CSI accuracy and turns out to be insufficient for CSI acquisition in multi-user MIMO.

Moreover, to track channel-evolution over time, the reference signal need be spread over time. In the current 3GPP NR specification [1], a single shot CSI-RS is configured at a particular time slot. Such slots of CSI-RS are periodically transmitted, or triggered on demand. The configuration of a CSI-RS resource set(s) which may refer to NZP-CSI-RS, CSI-IM or CSI-SSB resource set(s) [2] is performed using the following higher layer parameters (see reference [4]):

CSI-ResourceConfig—The resource set(s) configuration consists of the IDs of the resources configured in the resource set(s), the type of each CSI-RS resource in terms of its periodicity, and the bandwidth part they are configured in.

CSI-ResourcePeriodicityAndOffset—Mentions the periodicity of a CSI-RS resource in terms of number of slots and offset of CSI-RS.

CSI-RS-ResourceMapping—Mentions the resource elements in the time-frequency map the CSI-RS resource is mapped to, number of CSI-RS ports, the CDM type used for the mapped reference symbols, and the density and bandwidth of occupancy of the reference symbols in the frequency domain.

frequencyDomainAllocation nrofPorts firstOFDMSymbolInTimeDomain firstOFDMSymbolInTimeDomain2 cdm-Type density freqB and

While the CSI-RS design may be used to acquire CSI for a link adaptation (modulation and coding scheme—MCS), and for selecting a precoding matrix from a specific channel realization/snapshot, it cannot track channel evolution in time to estimate Doppler-frequency components of a MIMO channel.

It is noted that the information in the above section is only for enhancing the understanding of the background of the invention and therefore it may contain information does not form conventional technology that is already known to a person of ordinary skill in the art.

SUMMARY

According to an embodiment, a communication device for providing a channel state information, CSI, feedback in a wireless communication system may have:
a transceiver configured to receive, from a transmitter a radio signal via a time-variant, frequency-selective MIMO channel, the radio signal including downlink reference signals according to a reference signal configuration including a number of antenna ports, and downlink signals including the reference signal configuration; and
a processor configured to
  estimate an explicit CSI in the frequency domain using measurements on the downlink reference signals on the radio channel, the downlink reference signals provided over a certain observation time,
  select, based on a performance metric, a Doppler-delay-beam precoder matrix, W, for a composite Doppler-delay-beam three-stage precoder, the Doppler-delay-beam three-stage precoder being based on one or more codebooks, the one or more codebooks including
    one or more transmit-side spatial beam components of the composite Doppler-delay-beam three-stage precoder,
    one or more delay components of the composite Doppler-delay-beam three-stage precoder, and
    one or more Doppler-frequency components of the composite Doppler-delay-beam three-stage precoder,
  calculate either one or more of a channel quality indicator, CQI, and/or a precoder matrix indicator, PMI, and/or a rank indicator, RI, using the explicit CSI and the composite Doppler-delay-beam three-stage precoder with the selected Doppler-delay-beam precoder matrix, W, and
  report to the transmitter the CSI feedback including either one or more of the CQI, and/or the PMI and/or the RI, wherein the PMI and RI are used to indicate the Doppler-delay-beam three-stage composite precoder matrix for the configured antenna ports,
wherein the one or more delay components and/or the one or more Doppler-frequency components of the composite Doppler-delay-beam three-stage precoder are defined by one or more sub-matrices of a DFT matrix or by one or more sub-matrices of an oversampled DFT matrix.

According to another embodiment, a transmitter in a wireless communication system including a communication device may have:
an antenna array having a plurality of antennas for a wireless communication with one or more communication devices of claim 1 for providing a channel state information, CSI, feedback to the transmitter; and
a precoder connected to the antenna array, the precoder to apply a set of beamforming weights to one or more antennas of the antenna array to form, by the antenna array, one or more transmit beams or one or more receive beams,
a transceiver configured to
  transmit, to the communication device, downlink reference signals, CSI-RS, according to a CSI-RS configuration including a number of CSI-RS antenna ports and a parameter, e.g., referred to as CSI-RS BurstDuration, indicating a time-domain-repetition of the downlink reference signals, e.g., in terms of a number of consecutive slots the downlink reference signals are repeated in, and downlink signals including the CSI-RS configuration; and receive uplink signals including a plurality of CSI reports from the communication device; and
a processor configured to:
  extract at least the two component precoder matrix identifier and the rank indicator from the plurality of CSI reports; and
  construct a Doppler-delay-beam precoder matrix applied on the antenna ports using a first component and a second component of the PMI, and determine the beamforming weights responsive to the constructed precoder matrix.

According to yet another embodiment, a communication device for providing a channel state information, CSI, feedback in a wireless communication system may have:
a transceiver configured to receive, from a transmitter a radio signal via a time-variant, frequency-selective MIMO channel, the radio signal including downlink reference signals according to a reference signal configuration including a number of antenna ports, and downlink signals including the reference signal configuration; and
a processor configured to
  estimate an explicit CSI in the frequency domain using measurements on the downlink reference signals on the radio channel, the downlink reference signals provided over a certain observation time,
  select, based on a performance metric, a Doppler-beam precoder matrix, P, for a composite Doppler-beam dual-stage precoder, the Doppler-beam dual-stage precoder being based on one or more codebooks, the one or more codebooks including
    one or more transmit-side spatial beam components of the composite Doppler-beam dual-stage precoder, and
    one or more Doppler-frequency components of the composite Doppler-beam dual-stage precoder,
  calculate one or more of a channel quality indicator, CQI, a precoder matrix indicator, PMI, and a rank indicator, RI, using the explicit CSI and the composite Doppler-beam dual-stage precoder with the selected Doppler-beam precoder matrix, P, and
  report to the transmitter the CSI feedback including either one or more of the CQI, and/or the PMI and/or the RI, wherein the PMI and RI are used to indicate the Doppler-beam dual-stage composite precoder matrix for the configured antenna ports.

According to yet another embodiment, a transmitter in a wireless communication system including a communication device may have:
an antenna array having a plurality of antennas for a wireless communication with one or more communication devices of claim 1 for providing a channel state information, CSI, feedback to the transmitter; and
a precoder connected to the antenna array, the precoder to apply a set of beamforming weights to one or more antennas of the antenna array to form, by the antenna array, one or more transmit beams or one or more receive beams,
a transceiver configured to
  transmit, to the communication device, downlink reference signals according to a CSI-RS configuration including a number of CSI-RS antenna ports and a parameter, e.g., referred to as CSI-RS BurstDuration, indicating a time-domain-repetition of the downlink reference signals, e.g., in terms of a number of consecutive slots the downlink reference signals are repeated in, and downlink signals including the CSI-RS configuration; and receive uplink signals including a plurality of CSI reports from the communication device; and a processor configured to:

extract at least the two component precoder matrix identifier and the rank indicator from the plurality of CSI reports; and construct a Doppler-beam precoder matrix applied on the antenna ports using a first component and a second component of the PMI, and determine the beamforming weights responsive to the constructed precoder matrix.

According to yet another embodiment, a wireless communication network may have:

at least one inventive communication device, and at least one BS, or transmitter, in a wireless communication system including a communication device, which transmitter may have:

an antenna array having a plurality of antennas for a wireless communication with one or more communication devices of claim 1 for providing a channel state information, CSI, feedback to the transmitter; and a precoder connected to the antenna array, the precoder to apply a set of beamforming weights to one or more antennas of the antenna array to form, by the antenna array, one or more transmit beams or one or more receive beams, a transceiver configured to transmit, to the communication device, downlink reference signals, CSI-RS, according to a CSI-RS configuration including a number of CSI-RS antenna ports and a parameter, e.g., referred to as CSI-RS BurstDuration, indicating a time-domain-repetition of the downlink reference signals, e.g., in terms of a number of consecutive slots the downlink reference signals are repeated in, and downlink signals including the CSI-RS configuration; and receive uplink signals including a plurality of CSI reports from the communication device; and a processor configured to:

extract at least the two component precoder matrix identifier and the rank indicator from the plurality of CSI reports; and construct a Doppler-delay-beam precoder matrix applied on the antenna ports using a first component and a second component of the PMI, and determine the beamforming weights responsive to the constructed precoder matrix.

According to still another embodiment, a method for providing a channel state information, CSI, feedback in a wireless communication system may have the steps of:

receiving, from a transmitter, a radio signal via a time-variant, frequency-selective MIMO channel, the radio signal including downlink reference signals according to a reference signal configuration including a number of antenna ports, and downlink signals including the reference signal configuration;

estimating, at the communication device, an explicit CSI in the frequency domain using measurements on the downlink reference signals on the radio channel, the downlink reference signals provided over a certain observation time, based on a performance metric, selecting, at the communication device, a Doppler-delay-beam precoder matrix, W, for a composite Doppler-delay-beam three-stage precoder, the Doppler-delay-beam three-stage precoder being based on one or more codebooks, the one or more codebooks including one or more transmit-side spatial beam components of the composite Doppler-delay-beam three-stage precoder, one or more delay components of the composite Doppler-delay-beam three-stage precoder, and one or more Doppler-frequency components of the composite Doppler-delay-beam three-stage precoder, calculating, at the communication device, one or more of a channel quality indicator, CQI, a precoder matrix indicator, PMI, and a rank indicator, RI, using the explicit CSI and the composite Doppler-delay-beam three-stage precoder with the selected Doppler-delay-beam precoder matrix, W, and reporting from the communication device to the transmitter the CSI feedback including one or more of the CQI, the PMI and the RI, wherein the PMI and RI are used to indicate the Doppler-delay-beam three-stage composite precoder matrix for the configured antenna ports, wherein the one or more delay components and/or the one or more Doppler-frequency components of the composite Doppler-delay-beam three-stage precoder are defined by one or more sub-matrices of a DFT matrix or by one or more sub-matrices of an oversampled DFT matrix.

According to still another embodiment, a method for transmitting in a wireless communication system including a communication device and a transmitter may have the steps of: transmitting, to a communication device, downlink reference signals according to a CSI-RS configuration including a number of CSI-RS antenna ports and a parameter, e.g., referred to as CSI-RS BurstDuration, indicating a time-domain-repetition of the downlink reference signals, e.g., in terms of a number of consecutive slots the downlink reference signals are repeated in, and downlink signals including the CSI-RS configuration; receiving, at the transmitter, uplink signals including a plurality of CSI reports from the communication device; extracting, at the transmitter, at least the two component precoder matrix identifier and the rank indicator from the plurality of CSI reports; constructing, at the transmitter, a Doppler-delay-beam precoder matrix applied on the antenna ports using a first component and a second component of the PMI, and determining, responsive to the constructed precoder matrix, beamforming weights for a precoder connected to an the antenna array of the transmitter, wherein the one or more delay components and/or the one or more Doppler-frequency components of the composite Doppler-delay-beam three-stage precoder are defined by one or more sub-matrices of a DFT matrix or by one or more sub-matrices of an oversampled DFT matrix.

According to still another embodiment, a method for providing a channel state information, CSI, feedback in a wireless communication system may have the steps of:

receiving, from a transmitter, a radio signal via a time-variant, frequency-selective MIMO channel, the radio signal including downlink reference signals according to a reference signal configuration including a number of antenna ports, and downlink signals including the reference signal configuration;

estimating, at the communication device, an explicit CSI in the frequency domain using measurements on the downlink reference signals on the radio channel, the downlink reference signals provided over a certain observation time, based on a performance metric, selecting, at the communication device, a Doppler-beam precoder matrix, P, for a composite Doppler-beam dual-stage precoder, the Doppler-beam dual-stage precoder being based on one or more codebooks, the one or more codebooks including one or more transmit-side spatial beam components of the composite Doppler-beam dual-stage precoder, and one or more Doppler-frequency components of the composite Doppler-beam dual-stage precoder, calculating one or more of a channel quality indicator, CQI, a precoder matrix indicator, PMI, and a rank indicator, RI, using the explicit CSI and the composite Doppler-beam dual-stage precoder with the selected Doppler-beam precoder matrix, P, and reporting to the transmitter the CSI feedback including either one or more of the CQI, and/or the PMI and/or the RI, wherein the PMI and RI are used to indicate the Doppler-beam dual-stage composite precoder matrix for the configured antenna ports.

According to yet another embodiment, a method for transmitting in a wireless communication system including a communication device and a transmitter may have the steps of: transmitting, to a communication device, downlink reference signals according to a CSI-RS configuration including a number of CSI-RS antenna ports and a parameter, e.g., referred to as CSI-RS BurstDuration, indicating a time-domain-repetition of the downlink reference signals, e.g., in terms of a number of consecutive slots the downlink reference signals are repeated in, and downlink signals including the CSI-RS configuration; receiving, at the transmitter, uplink signals including a plurality of CSI reports from the communication device; extracting, at the transmitter, at least the two component precoder matrix identifier and the rank indicator from the plurality of CSI reports; constructing, at the transmitter, a Doppler-beam dual-stage precoder matrix applied on the antenna ports using a first component and a second component of the PMI, and determining, responsive to the constructed precoder matrix, beamforming weights for a precoder connected to an antenna array of the transmitter.

According to another embodiment, a non-transitory digital storage medium may have a computer program stored thereon to perform any of the inventive methods, when said computer program is run by a computer.

BRIEF DESCRIPTION OF THE DRAWINGS

Embodiments of the present invention will be detailed subsequently referring to the appended drawings, in which:

FIG. 5($a$) illustrates a CSI-RS with a periodicity of 10 slots and no repetition (CSI-RS-BurstDuration not configured or CSI-RS-BurstDuration=0);

FIG. 5($b$) illustrates a CSI-RS with a periodicity of 10 slots and repetition of 4 slots (CSI-RS-BurstDuration=4);

FIG. 6 illustrates a CSI-RS-BurstDuration information element in accordance with an embodiment;

DETAILED DESCRIPTION OF THE INVENTION

In the following, advantageous embodiments of the present invention are described in further detail with reference to the enclosed drawings in which elements having the same or similar function are referenced by the same reference signs.

Figure 1:
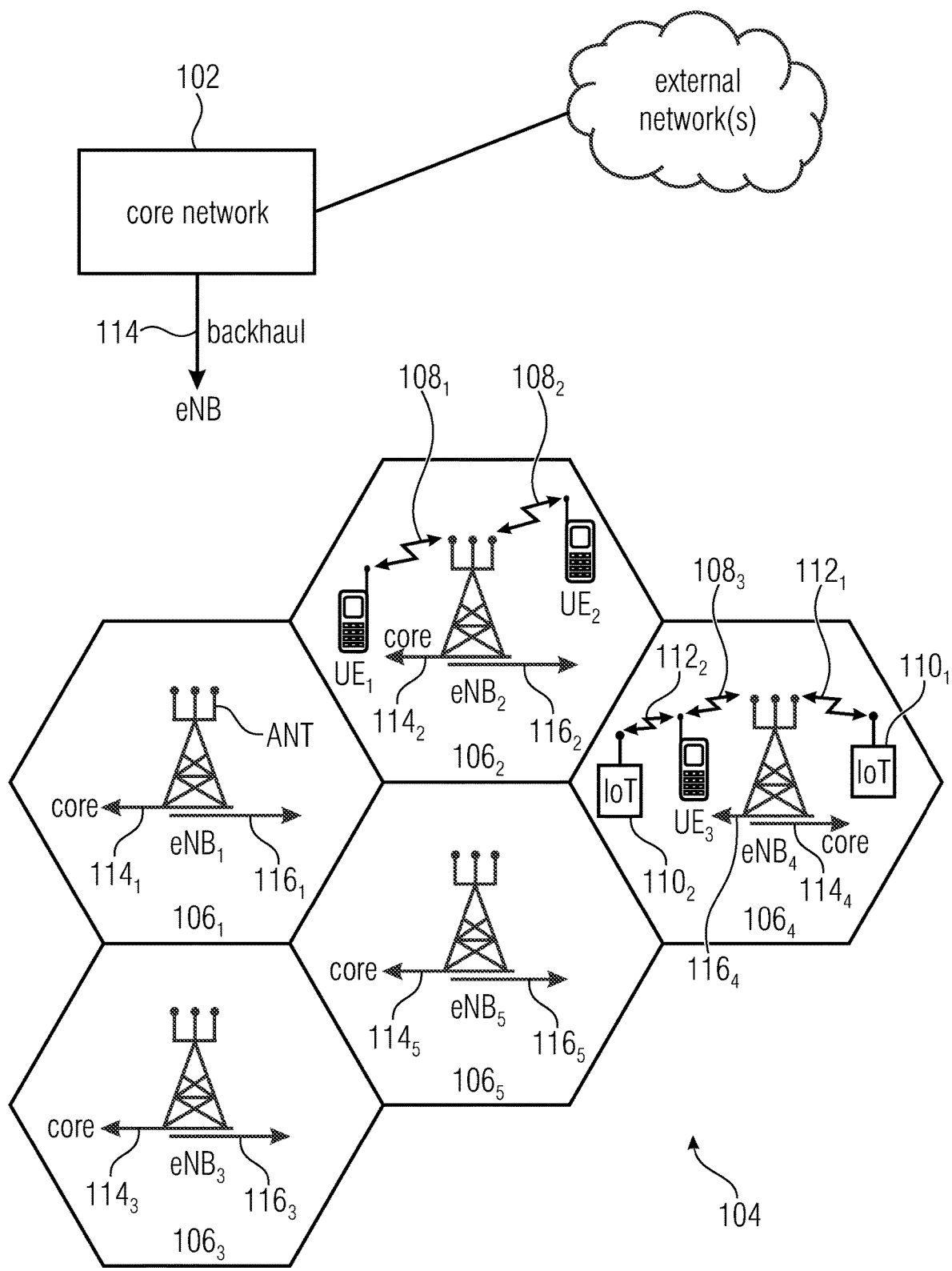
FIG. 1 shows a schematic representation of an example of a wireless communication system.
Figure 2:
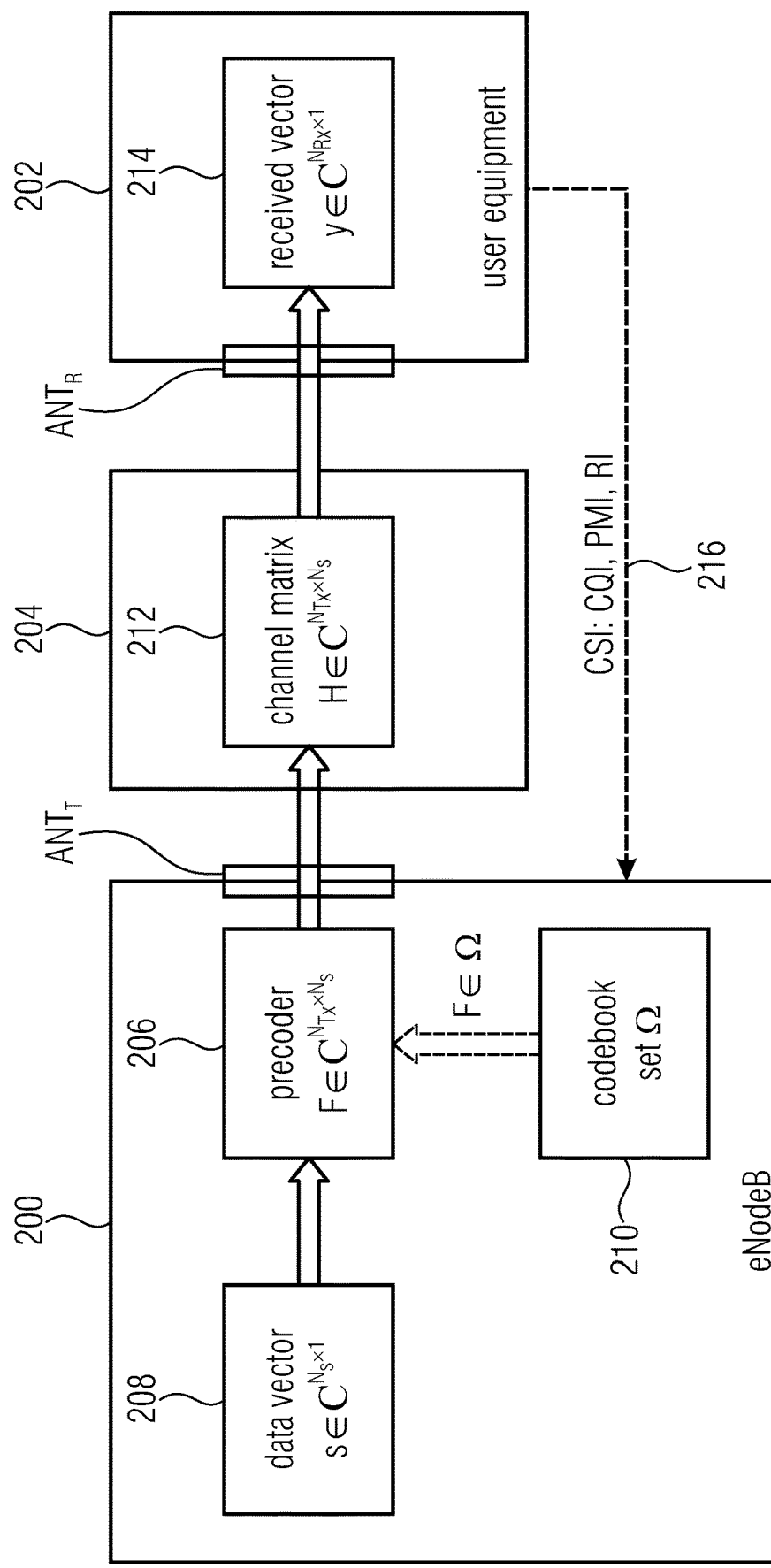
FIG. 2 shows a block-based model of a MIMO DL transmission using codebook-based-precoding in accordance with LTE release 8.
Figure 3:
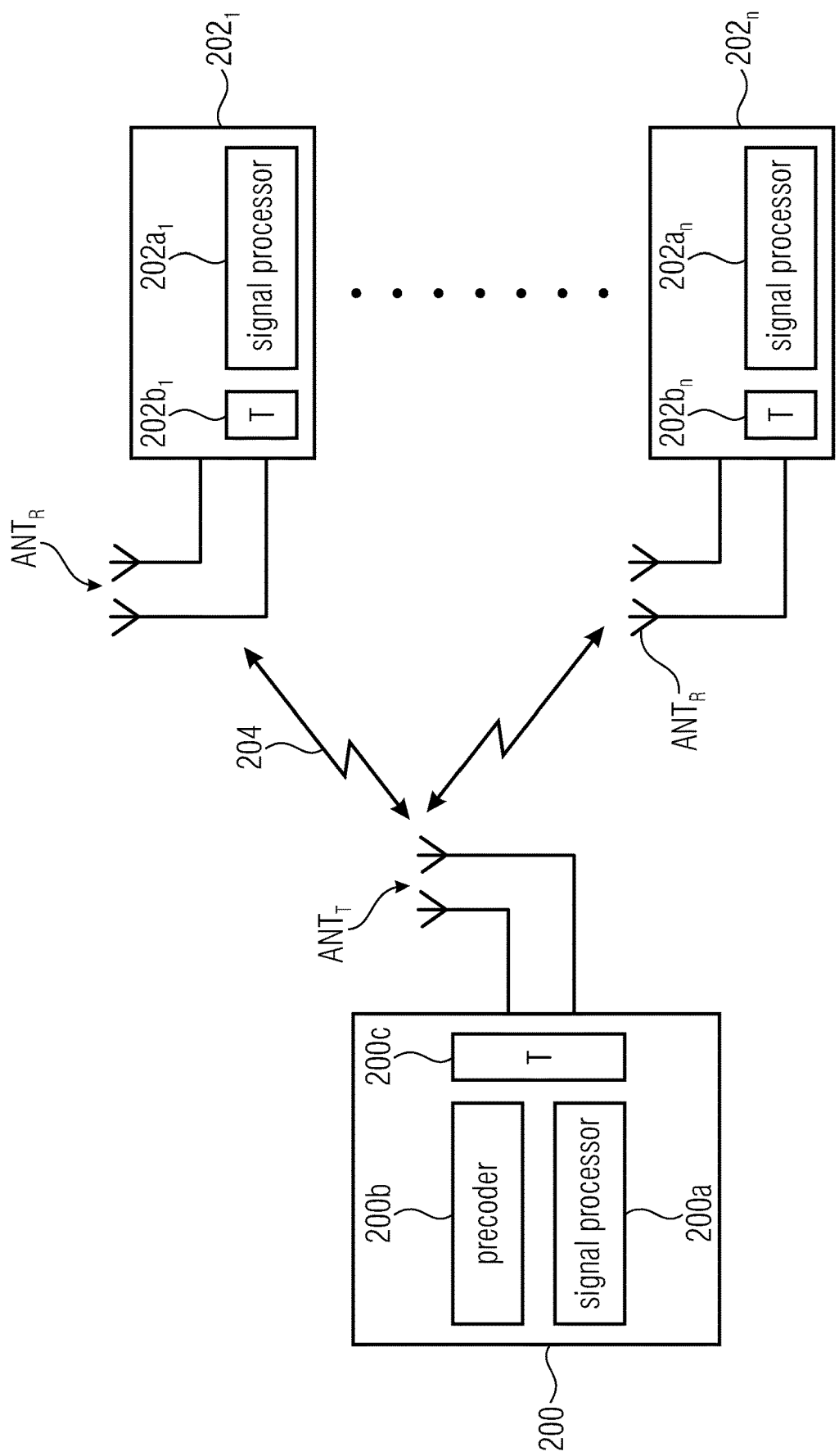
FIG. 3 is a schematic representation of a wireless communication system for communicating information between a transmitter, which may operate in accordance with the inventive teachings described herein, and a plurality of receivers, which may operate in accordance with the inventive teachings described herein.

Embodiments of the present invention may be implemented in a wireless communication system or network as depicted in FIG. 1 or FIG. 2 including transmitters or transceivers, like base stations, and communication devices (receivers) or users, like mobile or stationary terminals or IoT devices, as mentioned above. FIG. 3 is a schematic representation of a wireless communication system for communicating information between a transmitter 200, like a base station, and a plurality of communication devices $202_1$ to $202_n$, like UEs, which are served by the base station 200. The base station 200 and the UEs 202 may communicate via a wireless communication link or channel 204, like a radio link. The base station 200 includes one or more antennas $ANT_T$ or an antenna array having a plurality of antenna elements, and a signal processor 200a. The UEs 202 include one or more antennas $ANT_R$ or an antenna array having a plurality of antennas, a signal processor $202a_1$, $202a_n$, and a transceiver $202b_1$, $202b_n$. The base station 200 and the respective UEs 202 may operate in accordance with the inventive teachings described herein.

Doppler-Delay-Beam Three-Stage Composite Precoder
User Equipment

The present invention provides a communication device 202 for providing a channel state information, CSI, feedback in a wireless communication system. The communication device comprises:

a transceiver 202b configured to receive, from a transmitter 200, a radio signal via a time-variant, frequency-selective MIMO channel 204, the radio signal including downlink reference signals according to a reference signal configuration comprising a number of antenna ports, and downlink signals comprising the reference signal configuration, and a processor 202a configured to estimate an explicit CSI in the frequency domain using measurements on the downlink reference signals on the radio channel, the downlink reference signals provided over a certain observation time, select, based on a performance metric, a Doppler-delay-beam precoder matrix (W) for a composite Doppler-delay-beam three-stage precoder, the Doppler-delay-beam three-stage precoder being based on one or more codebooks, the one or more codebooks including one or more transmit-side spatial beam components of the composite Doppler-delay-beam three-stage precoder, one or more delay components of the composite Doppler-delay-beam three-stage precoder, and one or more Doppler-frequency components of the composite Doppler-delay-beam three-stage precoder, calculate either one or more of a channel quality indicator, CQI, and/or a precoder matrix indicator, PMI, and/or a rank indicator, RI, using the explicit CSI and the composite Doppler-delay-beam three-stage precoder with the selected Doppler-delay-beam precoder matrix (W), and report to the transmitter the CSI feedback including either one or more of the CQI, and/or the PMI and/or the RI, wherein the PMI and RI are used to indicate the Doppler-delay-beam three-stage composite precoder matrix for the configured antenna ports, wherein the one or more delay components and/or the one or more Doppler-frequency components of the composite Doppler-delay-beam three-stage precoder are defined by one or more sub-matrices of a DFT matrix or by one or more sub-matrices of an oversampled DFT matrix.

In accordance with embodiments, the Doppler-delay-beam three-stage precoder is configured to perform precoding in the spatial-delay-Doppler domain, the Doppler-delay-beam three-stage precoder being based on three separate codebooks, wherein the three separate codebooks include a first codebook ($\Omega_1$) for the one or more transmit-side spatial beam components of the composite Doppler-delay-beam three-stage precoder, a second codebook ($\Omega_2$) for the one or more delay components of the composite Doppler-delay-beam three-stage precoder, and a third codebook ($\Omega_3$) for the one or more Doppler-frequency components of the composite Doppler-delay-beam three-stage precoder, and a set of combination coefficients for complex scaling/combining one or more of the vectors selected from the first, second and third codebook, and wherein the entries of the second codebook ($\Omega_2$) are given by a sub-matrix or multiple submatrices of a S×S DFT-matrix or a S×SO$_2$ oversampled DFT matrix, where S denotes the number of subbands, $O_2 \in \{1, 2, 3 \ldots\}$ denotes the oversampling factor and/or wherein the entries of the third codebook ($\Omega_3$) are given by a sub-matrix or multiple submatrices of a T×T DFT-matrix or a T×TO$_3$ oversampled DFT matrix, where T refers to a number of time instances during the observation time, and $O_3 \in \{1, 2, 3 \ldots\}$ denotes the oversampling factor.

In accordance with embodiments, the communication device is configured to receive from the transmitter the higher layer (such as Radio Resource Control (RRC) layer or MAC-CE) or physical layer (L1) parameter S for the configuration of the second codebook ($\Omega_2$), or use a priori known (default) parameter S for the configuration of the second codebook ($\Omega_2$).

In accordance with embodiments, the communication device is configured to receive from the transmitter the higher layer (such as Radio Resource Control (RRC) layer or MAC-CE) or physical layer (L1) parameter T for the configuration of the third codebook ($\Omega_3$), or use a priori known (default) parameter T for the configuration of the third codebook ($\Omega_3$).

In accordance with embodiments, the precoder matrix ($W^{(l)}$) for the p-th polarization and the l-th layer is composed of:

$U^{(l)}$ beamforming vectors $b_u^{(l)}$, independent of the polarization, selected from the first codebook, $D_u^{(l)}$ delay vectors $d_{p,u,d}^{(l)}$ selected from the second codebook for the u-th beam, $F_{d,u}^{(l)}$ Doppler-frequency vectors $f_{p,u,d,v}^{(l)}$ selected from the third codebook for u-th beam and d-th delay, and a set of combination coefficients $\gamma_{p,u,d,v}^{(l)}$ for complex scaling/combining the vectors selected from the first, second and third codebook.

In accordance with embodiments, the Doppler-delay-beam precoder matrix (W) of the l-th transmission layer and p-th polarization is represented by $$W^{(l)} = P^{(l)} \begin{bmatrix} \sum_{u=0}^{U^{(l)}-1} \sum_{d=0}^{D_u^{(l)}-1} \sum_{v=0}^{F_{d,u}^{(l)}-1} \gamma_{1,u,d,v}^{(l)} f_{1,u,d,v}^{(l)} \otimes d_{1,u,d}^{(l)T} \otimes b_u^{(l)} \\ \sum_{u=0}^{U^{(l)}-1} \sum_{d=0}^{D_u^{(l)}-1} \sum_{v=0}^{F_{d,u}^{(l)}-1} \gamma_{2,u,d,v}^{(l)} f_{2,u,d,v}^{(l)} \otimes d_{2,u,d}^{(l)T} \otimes b_u^{(l)} \end{bmatrix},$$

where $U^{(l)}$ is the number of beams per polarization for the l-th layer, $D_u^{(l)}$ is the number of delays for the l-th layer and u-th beam, $F_{d,u}^{(l)}$ is the number of Doppler-frequency components for the l-th layer, u-th beam and d-th delay, $f_{p,u,d,v}^{(l)}$ is the v-th Doppler-frequency vector of size T×1 associated with the l-th layer, d-th delay, u-th spatial beam, and the p-th (p=1,2) polarization of the precoder;

$d_{p,u,d}^{(l)}$ is the d-th delay vector of size S×1 associated with the l-th layer, u-th spatial beam and the p-th polarization of the precoder;

$b_u^{(l)}$ is the u-th spatial beam associated with the l-th layer;

$\gamma_{p,u,d,v}^{(l)}$ is the Doppler-delay complex combination coefficient associated with the l-th layer, u-th spatial beam, d-th delay, v-th Doppler-frequency and the p-th polarization of the precoder, and $P^{(l)}$ is a scalar normalization factor to ensure a certain average total transmission power.

In accordance with embodiments, the Doppler-delay-beam precoder is represented by a dual-stage precoder:

$$W^{(l)} = W^{(1,l)} w^{(2,l)} \in \mathbb{N}_t \cdot T \times S,$$

where $$W^{(1,l)} = P^{(l)} \begin{bmatrix} X_1 & 0 \\ 0 & X_2 \end{bmatrix} \text{ with}$$

$$X_1 = \left[ f_{1,0,0,0}^{(l)} \otimes d_{1,0,0}^{(l)T} \otimes b_0^{(l)} \quad \cdots \quad f_{1,u,d,v}^{(l)} \otimes d_{1,u,d}^{(l)T} \otimes b_u^{(l)} \quad \cdots \quad f_{1,U^{(l)}-1,D_u^{(l)}-1,F_{d,u}^{(l)}-1}^{(l)} \otimes d_{1,U^{(l)}-1,D_u^{(l)}-1}^{(l)T} \otimes b_{U^{(l)}-1}^{(l)} \right],$$

$$X_2 = \left[ f_{2,0,0,0}^{(l)} \otimes d_{2,0,0}^{(l)T} \otimes b_0^{(l)} \quad \cdots \quad f_{2,u,d,v}^{(l)} \otimes d_{2,u,d}^{(l)T} \otimes b_u^{(l)} \quad \cdots \quad f_{2,U^{(l)}-1,D_u^{(l)}-1,F_{d,u}^{(l)}-1}^{(l)} \otimes d_{2,U^{(l)}-1,D_u^{(l)}-1}^{(l)T} \otimes b_{U^{(l)}-1}^{(l)} \right],$$

and $w^{(2,l)}$ contains the complex Doppler-delay-beam combining coefficients, $$w_{(2,l)} = [\gamma_{1,0,0,0}^{(l)} \quad \cdots \quad \gamma_{1,u,d,v}^{(l)} \quad \cdots \quad \gamma_{1,U^{(l)}-1,D_u^{(l)}-1,F_{d,u}^{(l)}-1}^{(l)} \quad \gamma_{2,0,0,0}^{(l)} \cdots \gamma_{2,u,d,v}^{(l)} \cdots \gamma_{2,U^{(l)}-1,D_u^{(l)}-1,F_{d,u}^{(l)}-1}^{(l)}]^T$$

and $\gamma_{p,u,d,v}^{(l)} = I_S \cdot \gamma_{p,u,d,v}^{(l)}$ where $I_S$ is an identity matrix of size S, where
- $f_{p,u,d,v}^{(l)}$ is the v-th Doppler-frequency vector of size T×1 associated with the l-th layer, d-th delay, u-th spatial beam, and the p-th (p=1,2) polarization of the precoder;
- $d_{p,u,d}^{(l)}$ is the d-th delay vector of size S×1 associated with the l-th layer, u-th spatial beam and the p-th polarization of the precoder;
- $b_u^{(l)}$ is the u-th spatial beam associated with the l-th layer;
- $\gamma_{p,u,d,v}^{(l)}$ is the Doppler-delay coefficient associated with the l-th layer, u-th spatial beam, d-th delay, v-th Doppler-frequency and the p-th polarization of the precoder, and
- $P^{(l)}$ is a scalar normalization factor to ensure a certain average total transmission power.

In accordance with embodiments
the first codebook ($\Omega_1$) comprises a first oversampled DFT-codebook matrix of size $N_1 N_2 \times O_{1,1} N_1 O_{1,2} N_2$ from which the vectors $b_u^{(l)}$ are selected, where $N_1$ and $N_2$ refer to the first and second numbers of antenna ports, respectively, and $O_{1,1}$ and $O_{1,2}$ refer to the oversampling factors with $O_{1,1} \in \{1, 2, 3, \ldots\}$ and $O_{1,2} \in \{1, 2, 3, \ldots\}$, wherein the second codebook ($\Omega_2$) comprises a second oversampled DFT-codebook matrix of size $S \times SO_2$ from which the delay vectors $d_{u,d}^{(l)}$ are selected, where S refers to the number of configured sub-bands/PRBs, or subcarriers, and $O_2$ refers to the oversampling factor $O_2 = 1, 2, \ldots$, and wherein the third codebook ($\Omega_3$) comprises a third oversampled DFT-codebook matrix of size $T \times TO_3$ from which the Doppler-frequency vectors $f_{p,u,d,v}^{(l)}$ are selected, where T refers to the number of time instances during the observation time, and $O_3$ refers to the oversampling factor with $O_3 = 1, 2, \ldots$.

In accordance with embodiments, the communication device is configured to
receive from the transmitter the higher layer (such as Radio Resource Control (RRC) layer or MAC-CE) or physical layer (L1) parameters $N_1$, $N_2$, $O_{1,1}$ and $O_{1,2}$ for the configuration of the first codebook ($\Omega_1$), or
use a priori known (default) parameters $N_1$, $N_2$, $O_{1,1}$, $O_{1,2}$ and for the configuration of the first codebook ($\Omega_1$).

In accordance with embodiments, the communication device is configured to
receive from the transmitter the higher layer (such as Radio Resource Control (RRC) layer or MAC-CE) or physical layer (L1) parameter $O_2$ and/or parameter $O_3$ for the configuration of the second codebook $\Omega_2$ and/or the third codebook $\Omega_3$, or
use an a priori known (default) parameter $O_2$ and/or parameter $O_3$ for the configuration of the second codebook $\Omega_2$ and/or the third codebook $\Omega_3$.

In accordance with embodiments, the communication device is configured to
select $D_u^{(l)}$ delays or delay differences for the u-th beam for constructing the Doppler-delay-beam three-stage precoder matrix for the l-th layer from the second codebook matrix ($\Omega_2$) containing X entries or columns, and
feedback the $X - D_u^{(l)}$ non-selected delay indices from the codebook matrix to the transmitter.

In accordance with embodiments,
the number of delays $D_u^{(l)}$ is identical to a subset of beams or all beams, such that $D_u^{(l)} = D^{(l)}$, or
the number of delays $D_u^{(l)}$ is identical to the beams and layers, such that $D_u^{(l)} = D$.

In accordance with embodiments, the parameter $D_u^{(l)}$ is known a priori at the communication device, or wherein the communication device is configured to receive from the transmitter the parameter $D_u^{(l)}$.

In accordance with embodiments, the communication device is configured to
select $F_{d,u}^{(l)}$ Doppler-frequency components for the d-th delay and the u-th beam for constructing the Doppler-delay-beam three-stage precoder matrix for the l-th layer from the third codebook matrix ($\Omega_3$) containing X entries or columns, and
feedback the $X - F_{d,u}^{(l)}$ non-selected Doppler-frequency component indices from the codebook matrix to the transmitter.

In accordance with embodiments,
the number of Doppler-frequency components $F_{d,u}^{(l)}$ is identical to a subset of delays and a subset of beams, such that $F_{d,u}^{(l)} = F^{(l)}$, or
the number of delays $D_u^{(l)}$ is identical to the delays, beams and layers, such that $F_{d,u}^{(l)} = F$.

In accordance with embodiments, the parameter $F_{d,u}^{(l)}$ is known a priori at the communication device, or wherein the communication device is configured to receive from the transmitter the parameter $F_{d,u}^{(l)}$.

In accordance with embodiments, the communication device is configured to report to the transmitter the CSI feedback according to a CSI reporting configuration received from the transmitter, the CSI reporting configuration including, for example, the parameter ReportQuantity, which includes at least one the following values:
cri-RI-PMIDD-CQI,
cri-RI-PMIDy-CQI, cri-RI-PMIDr-CQI,
cri-RI-LI-PMIDD-CQI,
cri-RI-LI-PMIDy-CQI,
cri-RI-LI-PMIDr-CQI,
cri-RI-PMIDD,
cri-RI-PMIDy,
cri-RI-PMIDr,
wherein the PMI quantities are defined as:
PMIDD PMI values including the delay and the Doppler-frequency component configurations,
PMIDy PMI values including only the delay component configuration, excluding the Doppler-frequency component(s), and
PMIDr PMI values including only the Doppler-frequency component configuration, excluding the delay component(s).

In accordance with embodiments,
the delays or delay differences depend on the beam and transmission layer, or
a subset of the delays are identical for a subset of beams of a transmission layer, or
the number of delays and the delays per beam are identical for a transmission layer so that all beams of a transmission layer are associated with the same delays, or
the number of delays and the delays per beam are identical for all transmission layers so that all beams and layers are associated with the same delays.

In accordance with embodiments,
the Doppler-frequency components associated with a subset of delays and subset of spatial beams are identical, or
a subset of Doppler-frequency components is identical for a subset of delays, subset of spatial beams and subset of transmission layers, or
a number of Doppler-frequency components and the Doppler-frequency components per delay and beam are identical for a transmission layer so that all delays per beam of a transmission layer are associated with the same Doppler-frequency components, or
a number of Doppler-frequency components and the Doppler-frequency components per delay and per beam are identical for all transmission layers so that all delays per beam of all transmission layers are associated with the same Doppler-frequency components.

In accordance with embodiments,
the explicit CSI is represented by a three-dimensional channel tensor $\mathcal{H} \in \mathbb{C}^{N \times S \times T}$ of the dimension N×S×T with S being the number of configured sub-bands/PRBs, or subcarriers, T being the number of time instances during the observation time, and $N=N_r \cdot N_1 \cdot N_2 \cdot P$, and the first, second and third dimensions of the channel tensor representing the space, frequency, and time components of the time-variant frequency-selective MIMO channel, respectively, or
the explicit CSI is represented by a four-dimensional channel tensor $\mathcal{H} \in \mathbb{C}^{N_r \times N_t \times S \times T}$ of dimension $N_r \times N_t \times S \times T$, where $N_t = N_1 \cdot N_2 \cdot P$, the first and second dimensions of $\mathcal{H}$ representing the receive-side and transmit-side space components of the time-variant frequency-selective MIMO channel, respectively, and the third and fourth dimensions of $\mathcal{H}$ representing the frequency and time component of the channel, respectively.

In accordance with embodiments, the processor is configured to select a Doppler-delay-beam precoder matrix (W) based on a performance metric for e.g., the mutual-information $l(W; \mathcal{H})$, which is a function of the Doppler-delay precoder-beam matrix W and a multi-dimensional channel tensor $\mathcal{H}$.

In accordance with embodiments, the processor is configured to select a wideband CQI that optimizes the average block error rate block_error_rate($\mathcal{H} | W^{(l)}$ (l=1, ..., L)) at the communication device for the selected composite Doppler-delay-beam precoder matrix $W^{(l)}$ (l=1, ..., L) and a multi-dimensional channel tensor $\mathcal{H}$ for the T time instants.

In accordance with embodiments, the processor is configured to
use, in a first step, a high resolution parameter estimation algorithm to estimate parameters of a channel model directly from a multi-dimensional channel tensor $\mathcal{H}$, or to calculate the coefficients of H(t, w) directly in a non-parameterized form from the MIMO channel tensor $\mathcal{H}$,
use, in a second step, the parameterized channel model and the selected Doppler-delay-beam composite precoder $W^{(l)}$ (l=1, ..., L) to calculate a parameterized precoded time-variant MIMO channel model frequency-domain response as $$H_{prec}(t,w) = H(t,w)[W^{(1)}(t,w), W^{(2)}(t,w), \ldots, W^{(L)}(t,w)],$$

where the (i,j) entry of $[H(t,w)]_{i,j} = h_{i,j}(t, w)$, and $W^{(l)}(t, w)$ is the t-th block and w-th column of $W^{(l)}$,
use, in a third step, the parameterized precoded MIMO channel model response to calculate one or more CQI values for one or more future time instants.

In accordance with embodiments, the processor is configured to
predict a CQI value for a time-instant/slot n+K, where n denotes the current time-instant/slot, and K denotes the relative time difference with respect to the current time-instant/slot n, and
use the K predicted CQI values to calculate differential predicted CQI values by reducing the K predicted CQI values by the average CQI value.

In accordance with embodiments, the communication device is configured to receive a CSI reporting configuration comprising a parameter CQI-PredictionTime assigned with the value K which is used by the communication device for CQI prediction.

In accordance with embodiments, in case the CSI feedback uses the PMI, the processor is configured to report at least a two-component PMI,
where the first PMI corresponds to the selected vectors $b_u^{(l)}$, $d_{p,u,d}^{(l)}$ and $f_{p,u,d,v}^{(l)}$, and
where the second PMI corresponds to $2 \Sigma_{u,d,l} F_{d,u}^{(l)}$ Doppler-delay-beam combining coefficients $\gamma_{p,u,d,v}^{(l)}$ from the communication device to the transmitter.

In accordance with embodiments, the processor is configured to
represent the first-component PMI in the form of three-tuple sets, where each three-tuple (u, d, v) is associated with a selected spatial beam vector $b_u^{(l)}$, a selected delay vector $d_{p,u,d}^{(l)}$, and a selected Doppler-frequency vector $f_{p,u,d,v}^{(l)}$, the three-tuple sets being represented by $i_1 = [i_{1,1}, i_{1,2}, i_{1,3}]$, where $i_1$ represents the first PMI component, and where $i_{1,1}$ contains $\Sigma_l U^{(l)}$ indices of the selected DFT-vectors for the spatial beams, $i_{1,2}$ contains $2 \Sigma_{u,l} D_u^{(l)}$ indices of the selected delay-vectors, and $i_{1,3}$ contains $2 \Sigma_{u,d,l} F_{d,u}^{(l)}$ indices of the selected Doppler-frequency-vectors,
quantize the Doppler-delay-beam combining coefficients using a codebook approach, where the quantized Doppler-delay-beam combining coefficients are represented by $i_2$, the second PMI component, and report the two PMI components to the transmitter.

In accordance with embodiments, for quantizing the complex Doppler-delay coefficients $\gamma_{p,u,d,v}^{(l)}$ with a codebook approach, each coefficient is represented by $$\gamma_{p,u,d,v}^{(l)} = \hat{\gamma}_{p,u,d,v}^{(l)} \phi_{p,u,d,v}^{(l)},$$

where $\hat{\gamma}_{p,u,d,v}^{(l)}$ is a polarization-, beam-, delay- and Doppler-frequency-dependent amplitude coefficient which is quantized with N bits; and $\phi_{p,u,d,v}^{(l)}$ represents a phase which is represented by a BPSK, or QPSK, or 8PSK, or any other higher-order PSK constellation, or wherein each coefficient is represented by its real and imaginary part as $$\gamma_{p,u,d,v}^{(l)} = \operatorname{Re}\{\hat{\gamma}_{p,u,d,v}^{(l)}\} + j \cdot \operatorname{Imag}\{\hat{\gamma}_{p,u,d,v}^{(l)}\},$$

where $\operatorname{Re}\{\hat{\gamma}_{p,u,d,v}^{(l)}\}$ and $\operatorname{Imag}\{\hat{\gamma}_{q,u,d,v}^{(l)}\}$ are quantized each with N bits.

In accordance with embodiments, the communication device is configured to select the delay indices for the beams for calculating the Doppler-delay-beam three-stage precoder, indicate the delay index corresponding to the strongest delay, and feedback the delay indices with the indication of the strongest delay index to the transmitter.

In accordance with embodiments, the communication device is configured to select the Doppler-frequency components for the delays and beams for calculating the Doppler-delay-beam three-stage precoder, indicate the Doppler-frequency component index corresponding to the strongest Doppler-frequency component, and feedback the Doppler-frequency component indices with the indication of the strongest Doppler-frequency component index to the transmitter.

In accordance with embodiments, the CSI feedback further includes a rank indicator, RI, and the processor is configured to report the RI for the transmission, wherein the RI is selected with respect to the Doppler-delay-beam precoder matrix $W^{(l)}$ (l=1, . . . , L) and denotes an average number of layers supported by the Doppler-delay-beam precoded time-variant frequency-selective MIMO channel.

In accordance with embodiments, the communication device is configured with a CSI-RS reporting configuration via a higher layer for reporting either the CQI and/or RI and/or PMI for a beam-formed CSI-RS, the vectors in the first codebook matrix represented by $N_1N_2$-length column vectors, where the m-th vector (m=1, . . . , $N_1N_2$) contains a single 1 at the m-th position and zeros elsewhere.

In accordance with embodiments, the communication device is configured to receive a CSI-RS resource configuration including a higher layer (e.g., RRC) parameter, e.g., referred to as CSI-RS-BurstDuration, indicating a time-domain-repetition of the downlink reference signals, e.g., in terms of a number of consecutive slots the downlink reference signals are repeated in.

In accordance with embodiments, the communication device assumes that for CQI, and/or RI, and/or PMI calculation, the transmitter applies the Doppler-delay-beam precoder to PDSCH signals on antenna ports {1000,1008+v−1} for v=L layers as $$\begin{bmatrix} y^{(t,3000)}(i) \\ \vdots \\ y^{(t,3000+P-1)}(i) \end{bmatrix} = W(t,i) \begin{bmatrix} x^{(t,0)}(i) \\ \vdots \\ x^{(t,v-1)}(i) \end{bmatrix},$$

where $[x^{(t,0)}(i), \ldots x^{(t,v-1)}(i)]^T$ is a symbol vector of PDSCH symbols, P∈{1, 2, 4, 8, 12, 16, 24, 32}, $x^{(t,u)}(i)$ is the i-th symbol of layer u at time instant t, $y^{(t,u)}(i)$ is the precoded symbol transmitted on antenna port u at time instant t, and $W(t, i) = [W^{(1)}(t, i), \ldots, W^{(L)}(t, i)]$ is the predicted precoder matrix, with $W^{(l)}(t, i)$ being the t-th block and i-th column of $W^{(l)}$.

Base Station

The present invention provides a transmitter 200 in a wireless communication system including a communication device 202. The transmitter comprises:

an antenna array ANTI having a plurality of antennas for a wireless communication with one or more of the inventive communication devices 202 for providing a channel state information, CSI, feedback to the transmitter 200; and a precoder 200b connected to the antenna array ANTI, the precoder 200b to apply a set of beamforming weights to one or more antennas of the antenna array ANTI to form, by the antenna array ANTI, one or more transmit beams or one or more receive beams, a transceiver 200c configured to transmit, to the communication device 202, downlink reference signals (CSI-RS) according to a CSI-RS configuration comprising a number of CSI-RS antenna ports and a parameter, e.g., referred to as CSI-RS BurstDuration, indicating a time-domain-repetition of the downlink reference signals, e.g., in terms of a number of consecutive slots the downlink reference signals are repeated in, and downlink signals comprising the CSI-RS configuration; and receive uplink signals comprising a plurality of CSI reports from the communication device 202; and a processor 200a configured to:

extract at least the two component precoder matrix identifier and the rank indicator from the plurality of CSI reports; and construct a Doppler-delay-beam precoder matrix applied on the antenna ports using a first component and a second component of the PMI, and determine the beamforming weights responsive to the constructed precoder matrix.

In accordance with embodiments, to facilitate precoder matrix prediction for QT future time instants, the processor is configured to extend the Doppler-frequency DFT-vectors $f_{p,u,d,v}^{(l)}$ to length-QT vectors $t_{p,u,d,v}^{(l)}$, the extension defined by $$t_{p,u,d,v}^{(l)} = \left[1, e^{j\frac{2\pi k}{O_3}}, \ldots, e^{j\frac{2\pi k(Q-1)}{O_3}}\right]^T \otimes f_{p,u,d,v}^{(l)}, \forall u, d, v, p, l,$$

where $$f_{p,u,d,v}^{(l)} = \left[1, e^{j\frac{2\pi k}{O_3 T}}, \ldots, e^{j\frac{2\pi k(T-1)}{O_3 T}}\right]^T \in \Omega_3,$$

and the predicted Doppler-delay-beam precoder matrix for the l-th layer is based on $U^{(l)}$ beamforming vectors $b_u^{(l)}$, independent of the polarization, selected from the first codebook, $D_u^{(l)}$ delay vectors $d_{p,u,d}^{(l)}$ selected from the second codebook for the u-th beam, $F_{d,u}^{(l)}$ extended Doppler-frequency vectors $t_{p,u,d,v}^{(l)}$ which are based on the Doppler-frequency vectors $f_{p,u,d,v}^{(l)}$ selected from the third codebook for u-th beam and d-th delay, and a set combination coefficients $\gamma_{p,u,d,v}^{(l)}$ for complex scaling/combining the vectors selected from the first, second and third codebook.

In accordance with embodiments, to facilitate precoder matrix prediction for QT future time instants, the processor is configured to cyclically extend the Doppler-frequency DFT-vectors $f_{p,u,d,v}^{(l)}$ to a length-QT vectors $t_{p,u,d,v}^{(l)}$, the cyclic extension defined by $$t_{p,u,d,v}^{(l)} = \left[1, e^{j\frac{2\pi k}{O_3}}, \ldots, e^{j\frac{2\pi k(Q-1)}{O_3}}\right]^T \otimes f_{p,u,d,v}^{(l)}, \forall u, d, v, p, l,$$

where $$f_{p,u,d,v}^{(l)} = \left[1, e^{j\frac{2\pi k}{O_3 T}}, \ldots, e^{j\frac{2\pi k(T-1)}{O_3 T}}\right]^T \in \Omega_3,$$

and
the predicted Doppler-delay-beam precoder matrix for the l-th layer and q-th (q=1, . . . , QT) time instant is given by $$\hat{W}^{(l)}(q) = P^{(l)} \begin{bmatrix} \sum_{u=0}^{U^{(l)}-1} \sum_{d=0}^{D_u^{(l)}-1} \sum_{v=0}^{F_{d,u}^{(l)}-1} \gamma_{1,u,d,v}^{(l)} t_{1,u,d,v}^{(l)}(q) \otimes d_{1,u,d}^{(l)T} \otimes b_u^{(l)} \\ \sum_{u=0}^{U^{(l)}-1} \sum_{d=0}^{D_u^{(l)}-1} \sum_{v=0}^{F_{d,u}^{(l)}-1} \gamma_{2,u,d,v}^{(l)} t_{2,u,d,v}^{(l)}(q) \otimes d_{2,u,d}^{(l)T} \otimes b_u^{(l)} \end{bmatrix}$$

where $t_{p,u,d,v}^{(l)}$ is the q-th entry of $t_{p,u,d,v}^{(l)}$.

Methods

The present invention provides a method for providing a channel state information, CSI, feedback in a wireless communication system, the method comprising:

receiving, from a transmitter, a radio signal via a time-variant, frequency-selective MIMO channel, the radio signal including downlink reference signals according to a reference signal configuration comprising a number of antenna ports, and downlink signals comprising the reference signal configuration;

estimating, at the communication device, an explicit CSI in the frequency domain using measurements on the downlink reference signals on the radio channel, the downlink reference signals provided over a certain observation time, based on a performance metric, selecting, at the communication device, a Doppler-delay-beam precoder matrix (W) for a composite Doppler-delay-beam three-stage precoder, the Doppler-delay-beam three-stage precoder being based on one or more codebooks, the one or more codebooks including one or more transmit-side spatial beam components of the composite Doppler-delay-beam three-stage precoder, one or more delay components of the composite Doppler-delay-beam three-stage precoder, and one or more Doppler-frequency components of the composite Doppler-delay-beam three-stage precoder, calculating, at the communication device, one or more of a channel quality indicator, CQI, a precoder matrix indicator, PMI, and a rank indicator, RI, using the explicit CSI and the composite Doppler-delay-beam three-stage precoder with the selected Doppler-delay-beam precoder matrix (W), and reporting from the communication device to the transmitter the CSI feedback including one or more of the CQI, the PMI and the RI, wherein the PMI and RI are used to indicate the Doppler-delay-beam three-stage composite precoder matrix for the configured antenna ports, wherein the one or more delay components and/or the one or more Doppler-frequency components of the composite Doppler-delay-beam three-stage precoder are defined by one or more sub-matrices of a DFT matrix or by one or more sub-matrices of an oversampled DFT matrix.

The present invention provides a method for transmitting in a wireless communication system including a communication device and a transmitter, the method comprising:

transmitting, to a communication device, downlink reference signals (CSI-RS) according to a CSI-RS configuration comprising a number of CSI-RS antenna ports and a parameter, e.g., referred to as CSI-RS BurstDuration, indicating a time-domain-repetition of the downlink reference signals, e.g., in terms of a number of consecutive slots the downlink reference signals are repeated in, and downlink signals comprising the CSI-RS configuration;

receiving, at the transmitter, uplink signals comprising a plurality of CSI reports from the communication device;

extracting, at the transmitter, at least the two component precoder matrix identifier and the rank indicator from the plurality of CSI reports;

constructing, at the transmitter, a Doppler-delay-beam precoder matrix applied on the antenna ports using a first component and a second component of the PMI, and determining, responsive to the constructed precoder matrix, beamforming weights for a precoder connected to an the antenna array of the transmitter, wherein the one or more delay components and/or the one or more Doppler-frequency components of the composite Doppler-delay-beam three-stage precoder are defined by one or more sub-matrices of a DFT matrix or by one or more sub-matrices of an oversampled DFT matrix.

Doppler-Beam Dual-Stage Composite Precoder

User Equipment

The present invention provides a communication device 202 for providing a channel state information, CSI, feedback in a wireless communication system. The communication device 202 comprises:

a transceiver 202b configured to receive, from a transmitter 200 a radio signal via a time-variant, frequency-selective MIMO channel 204, the radio signal including downlink reference signals according to a reference signal configuration comprising a number of antenna ports, and downlink signals comprising the reference signal configuration; and a processor 202a configured to estimate an explicit CSI in the frequency domain using measurements on the downlink reference signals on the radio channel, the downlink reference signals provided over a certain observation time, select, based on a performance metric, a Doppler-beam precoder matrix (P) for a composite Doppler-beam dual-stage precoder, the Doppler-beam dual-stage precoder being based on one or more codebooks, the one or more codebooks including
one or more transmit-side spatial beam components of the composite Doppler-beam dual-stage precoder, and
one or more Doppler-frequency components of the composite Doppler-beam dual-stage precoder,
calculate one or more of a channel quality indicator, CQI, a precoder matrix indicator, PMI, and a rank indicator, RI, using the explicit CSI and the composite Doppler-beam dual-stage precoder with the selected Doppler-beam precoder matrix (P), and
report to the transmitter the CSI feedback including either one or more of the CQI, and/or the PMI and/or the RI, wherein the PMI and RI are used to indicate the Doppler-beam dual-stage composite precoder matrix for the configured antenna ports.

In accordance with embodiments, the one or more Doppler-frequency components of the composite Doppler-beam dual-stage precoder are defined by one or more sub-matrices of a DFT matrix or by one or more sub-matrices of an oversampled DFT matrix.

In accordance with embodiments, the Doppler-beam dual-stage precoder is configured to perform precoding in the spatial-Doppler domains, the Doppler-beam dual-stage precoder being based on only two separate codebooks, wherein the two separate codebooks include
a first codebook ($\Omega_1$) for the one or more transmit-side spatial beam components of the composite Doppler-beam dual-stage precoder,
a second codebook ($\Omega_2$) for the one or more Doppler-frequency components of the composite Doppler-beam dual-stage precoder, and
a set of combination coefficients for complex scaling/combining one or more of the vectors selected from the first and second codebook.

In accordance with embodiments, the entries of the second codebook matrix ($\Omega_2$) are given by a sub-matrix or multiple submatrices of a T×T DFT-matrix or a T×TO$_2$ oversampled DFT matrix, where T refers to a number of time instances during the observation time, and $O_2 \in \{1, 2, 3, \ldots\}$ denotes the oversampling factor.

In accordance with embodiments, the communication device is configured to
receive from the transmitter the higher layer (such as Radio Resource Control (RRC) layer or MAC-CE or physical layer (L1) parameter T for the configuration of the second codebook ($\Omega_2$), or
use a priori known (default) parameters T for the configuration of the second codebook ($\Omega_2$).

In accordance with embodiments, the precoder matrix ($P^{(l)}$) for the p-th polarization, l-th transmission layer, and s-th subband, subcarrier or physical resource block (PRB) is composed of
$U^{(l)}$ beamforming vectors $b_u^{(l)}$, independent of the polarization and independent of the subband, subcarrier or physical resource block (PRB), selected from the first codebook, $F_u^{(l)}$ Doppler-frequency vectors $f_{p,u,v}^{(l)}$, independent of the subband, subcarrier or physical resource block (PRB), selected from the second codebook for u-th beam, and
a set of combination coefficients $\gamma_{p,s,u,v}^{(l)}$ for complex scaling/combining the vectors selected from the first and second codebook.

In accordance with embodiments, the Doppler-beam dual-stage precoder matrix ($P^{(l)}$) is configured to perform precoding in the spatial-Doppler domains and is represented for the l-th transmission layer and the s-th sub-band, subcarrier or PRB by $$P^{(l)}(s) = P^{(l)} \begin{bmatrix} \sum_{u=0}^{U^{(l)}-1} \sum_{v=0}^{F_u^{(l)}-1} \gamma_{1,s,u,v}^{(l)} f_{1,u,v}^{(l)} \otimes b_u^{(l)} \\ \sum_{u=0}^{U^{(l)}-1} \sum_{v=0}^{F_u^{(l)}-1} \gamma_{2,s,u,v}^{(l)} f_{2,u,v}^{(l)} \otimes b_u^{(l)} \end{bmatrix},$$

where
$U^{(l)}$ is the number of beams per polarization for the l-th layer,
$F_u^{(l)}$ is the number of Doppler-frequency components for the l-th layer, u-th beam,
$f_{p,u,v}^{(l)}$ is the v-th Doppler-frequency vector of size T×1 associated with the l-th layer, u-th spatial beam, and the p-th (p=1,2) polarization of the precoder;
$b_u^{(l)}$ is the u-th spatial beam associated with the l-th layer;
$\gamma_{p,s,u,v}^{(l)}$ is the complex Doppler-beam combination coefficient associated with the l-th layer, u-th spatial beam, v-th Doppler-frequency, s-th sub-band, subcarrier or PRB, and the p-th polarization of the precoder, and
$P^{(l)}$ is a scalar normalization factor to ensure a certain total transmission power.

In accordance with embodiments, the Doppler-beam dual-stage precoder for the s-th subband, PRB or subcarrier is represented in matrix-vector notation:

$$P^{(l)}(s) = P^{(1,l)} p^{(2,l)}(s) \in N_t \cdot T \times 1,$$

where $$P^{(1,l)}(s) = P^{(l)} \begin{bmatrix} X_1 & 0 \\ 0 & X_2 \end{bmatrix} \text{ with}$$

$$X_1 = \begin{bmatrix} f_{1,0,0}^{(l)} \otimes b_0^{(l)} & \cdots & f_{1,u,v}^{(l)} \otimes b_u^{(l)} & f_{1,U^{(l)}-1,F_{U^{(l)}-1}^{(l)}-1}^{(l)} \otimes b_{U^{(l)}-1}^{(l)} \end{bmatrix},$$

$$X_2 = \begin{bmatrix} f_{2,0,0}^{(l)} \otimes b_0^{(l)} & \cdots & f_{2,u,v}^{(l)} \otimes b_u^{(l)} & f_{2,U^{(l)}-1,F_{U^{(l)}-1}^{(l)}-1}^{(l)} \otimes b_{U^{(l)}-1}^{(l)} \end{bmatrix},$$

and $p^{(2,l)}(s)$ contains the complex Doppler-beam combination coefficients, $$p^{(2,l)} = \begin{bmatrix} \gamma_{1,s,0,0}^{(l)} & \cdots & \gamma_{1,s,u,v}^{(l)} & \cdots & \gamma_{1,s,U^{(l)}-1,F_{U^{(l)}-1}^{(l)}-1}^{(l)} & \gamma_{2,s,0,0}^{(l)} & \cdots & \gamma_{2,s,u,v}^{(l)} & \cdots & \gamma_{2,s,U^{(l)}-1,F_{U^{(l)}-1}^{(l)}-1}^{(l)} \end{bmatrix}^T.$$

In accordance with embodiments,
the first codebook ($\Omega_1$) comprises a first oversampled DFT-codebook matrix of size $N_1 N_2 \times O_{1,1} N_1 O_{1,2} N_2$ from which the vectors $b_u^{(l)}$ are selected, where $N_1$ and $N_2$ refer to the first and second numbers of antenna ports, respectively, and $O_{1,1}$ and $O_{1,2}$ refer to the oversampling factors with $O_{1,1} \in \{1, 2, 3, \ldots\}$ and $O_{1,2} \in \{1, 2, 3, \ldots\}$,
wherein the second codebook ($\Omega_2$) comprises a second oversampled DFT-codebook matrix of size $T \times TO_2$ from which the Doppler-frequency vectors $f_{p,u,v}^{(l)}$ are selected, where T refers to the number of time instances during the observation time, and $O_2 \in \{1, 2, 3, \ldots\}$ refers to the oversampling factor of the codebook.

In accordance with embodiments, the communication device is configured to
receive from the transmitter the higher layer (such as Radio Resource Control (RRC) layer or MAC-CE) or physical layer (L1) parameters $N_1$, $N_2$, $O_{1,1}$ and $O_{1,2}$ for the configuration of the first codebook ($\Omega_1$), or
use a priori known (default) parameters $N_1$, $N_2$, $O_{1,1}$ and $O_{1,2}$ for the configuration of the first codebook ($\Omega_1$).

In accordance with embodiments, the communication device is configured to
receive from the transmitter the higher layer (such as Radio Resource Control (RRC) layer or MAC-CE) or physical layer (L1) parameter $O_2$ for the configuration of the second codebook ($\Omega_2$), or
use a priori known (default) parameter $O_2$ for the configuration of the second codebook ($\Omega_2$).

In accordance with embodiments, the communication device is configured to
select $F_u^{(l)}$ Doppler-frequency components for the u-th beam for constructing the Doppler-delay-beam three-stage precoder matrix for the l-th layer from the second codebook matrix ($\Omega_2$) containing X entries or columns, and
feedback the X–$F_u^{(l)}$ non-selected Doppler-frequency component indices from the codebook matrix to the transmitter.

In accordance with embodiments, the number of Doppler-frequency components $F_u^{(l)}$ is identical for a subset of beams, such that $F_u^{(l)} = F^{(l)}$.

In accordance with embodiments, the parameter $F_u^{(l)}$ is known a priori at the communication device, or wherein the communication device is configured to receive from the transmitter the parameter $F_u^{(l)}$.

In accordance with embodiments, the communication device is configured to report to the transmitter the CSI feedback according to a CSI reporting configuration received from the transmitter, the CSI reporting configuration including, for example, the parameter ReportQuantity, which includes at least one the following values:
cri-RI-PMIDD-CQI,
cri-RI-LI-PMIDD-CQI,
cri-RI-PMIDD, wherein the PMI-DD quantity contains the Doppler-frequency component configurations.

In accordance with embodiments,
the Doppler-frequency components depend on the beam and transmission layer, or
a subset of the Doppler-frequency components associated with a subset of the spatial beams of a transmission layer is identical, or
a number of Doppler-frequency components for a subset of beams of a transmission layer is identical, or
a subset of the Doppler-frequency components is identical for a subset of spatial beams and transmission layers, or a number of Doppler-frequency components and the Doppler-frequency components per beam is identical for a transmission layer, so that all beams of a transmission layer are associated with the same Doppler-frequency components.

In accordance with embodiments,
the explicit CSI is represented by a three-dimensional channel tensor $\mathcal{H} \in \mathbb{C}^{N \times S \times T}$ of the dimension $N \times S \times T$ with S being the number of configured sub-bands/PRBs, or subcarriers, T being the number of time instances during the observation time, and $N = N_r \cdot N_1 \cdot N_2 \cdot P$, and the first, second and third dimensions of the channel tensor representing the space, frequency, and time components of the time-variant frequency-selective MIMO channel, respectively, or
the explicit CSI is represented by a four-dimensional channel tensor $\mathcal{H} \in \mathbb{C}^{N_r \times N_t \times S \times T}$ of dimension $N_r \times N_t \times S \times T$, where $N_t = N_1 \cdot N_2 \cdot P$, the first and second dimensions of $\mathcal{H}$ representing the receive-side and transmit-side space components of the time-variant frequency-selective MIMO channel, respectively, and the third and fourth dimensions of $\mathcal{H}$ representing the frequency and time component of the channel, respectively.

In accordance with embodiments, the processor is configured to select a Doppler-beam precoder matrix $P = [P^{(0)}, \ldots, P^{(L-1)}]$ based on a performance metric for e.g., the mutual-information $I(P; \mathcal{H})$, which is a function of the Doppler-beam precoder matrix P and a multi-dimensional channel tensor $\mathcal{H}$.

In accordance with embodiments, the processor is configured to select a wideband CQI that optimizes the average block error rate block_error_rate($\mathcal{H}$ |P) at the communication device for the selected composite Doppler-beam precoder matrix P and a multi-dimensional channel tensor $\mathcal{H}$ for the T time instants.

In accordance with embodiments, the processor is configured to
use, in a first step, a high resolution parameter estimation algorithm to estimate parameters of a channel model directly from a multi-dimensional channel tensor $\mathcal{H}$, or to calculate the coefficients of H(t, w) directly in a non-parameterized form from the MIMO channel tensor $\mathcal{H}$,
use, in a second step, the parameterized channel model and the selected Doppler-beam composite dual-stage precoder matrix to calculate a parameterized precoded time-variant MIMO channel model frequency-domain response as $$H_{prec}(t,w) = H(t,w)P(t,w),$$

where the (i,j) entry of $[H(t, w)]_{i,j} = h_{i,j}(t, w)$, and P(t,w) is the t-th block and w-th column of P(t, w) P being the Doppler-beam composite dual-stage precoder matrix,
use, in a third step, the parameterized precoded MIMO channel model response to calculate one or more CQI values for one or more future time instants.

In accordance with embodiments, the processor is configured to
predict a CQI value for a time-instant/slot n+K, where n denotes the current time-instant/slot, and K denotes the relative time difference with respect to the current time-instant/slot n, and
use the K predicted CQI values to calculate differential predicted CQI values by reducing the K predicted CQI values by the average CQI value.

In accordance with embodiments, the communication device is configured to receive a CSI reporting configuration comprising a parameter CQI-PredictionTime assigned with the value K which is used by the communication device for CQI prediction.

In accordance with embodiments, in case the CSI feedback uses the PMI, the processor is configured to report at least a two-component PMI,
- where the first PMI corresponds to the selected vectors $b_u^{(l)}$ and $f_{p,u,v}^{(l)}$, and
- where the second PMI corresponds to $2\Sigma_{u,l} F_u^{(l)}$ Doppler-beam combining coefficients $\gamma_{p,s,u,v}^{(l)}$ from the communication device to the transmitter.

In accordance with embodiments, the processor is configured to
- represent the first-component PMI in the form of tuple sets, where each tuple (u, v) is associated with a selected spatial beam vector $b_u^{(l)}$ and a selected Doppler-frequency vector $f_{p,u,v}^{(l)}$, the tuple sets being represented by $i_1=[i_{1,1}, i_{1,2}]$, where represents the first PMI component and where $i_{1,1}$ contains $\Sigma_l U^{(l)}$ indices of the selected DFT-vectors for the spatial beams, $i_{1,2}$ contains $2\Sigma_{u,l} F_u^{(l)}$ indices of the selected Doppler-frequency-vectors,
- quantize the Doppler-beam combining coefficients using a codebook approach, where the quantized Doppler-beam combining coefficients are represented by $i_2$, the second PMI component, and
- report the two PMI components to the transmitter.

In accordance with embodiments, for quantizing the complex Doppler coefficients $\gamma_{p,s,u,v}^{(l)}$ with a codebook approach, each coefficient is represented by $$\gamma_{p,s,u,v}^{(l)} = \hat{\gamma}_{p,s,u,v}^{(l)} \phi_{p,s,u,v}^{(l)} m$$

where
- $\hat{\gamma}_{p,s,u,v}^{(l)}$ is a polarization-, beam- and Doppler-frequency-dependent amplitude coefficient which is quantized with N bits; and
- $\phi_{p,s,u,v}^{(l)}$ represents a phase which is represented by a BPSK, or QPSK, or 8PSK, or any other higher-order PSK constellation, or
- wherein each coefficient is represented by its real and imaginary part as $$\gamma_{p,s,u,v}^{(l)} = \text{Re}\{\hat{\gamma}_{p,s,u,v}^{(l)}\} + j \cdot \text{Imag}\{\hat{\gamma}_{p,s,u,v}^{(l)}\},$$

where $\text{Re}\{\hat{\gamma}_{p,s,u,v}^{(l)}\}$ and $\text{Imag}\{\hat{\gamma}_{q,s,u,v}^{(l)}\}$ are quantized each with N bits.

In accordance with embodiments, the communication device is configured to
- select the Doppler-frequency components for the beams for calculating the Doppler-beam dual-stage precoder,
- indicate the Doppler-frequency component index corresponding to the strongest Doppler-frequency component, and
- feedback the Doppler-frequency component indices with the indication of the strongest Doppler-frequency component index to the transmitter.

In accordance with embodiments, the CSI feedback further includes a rank indicator, RI, and the processor is configured to report the RI for the transmission, wherein the RI is selected with respect to the Doppler-beam dual-stage precoder matrix $P^{(l)}$ (l=1, ..., L) and denotes an average number of layers supported by the Doppler-beam precoded time-variant frequency-selective MIMO channel.

In accordance with embodiments, the communication device is configured with a CSI-RS reporting configuration via a higher layer for reporting either the CQI and/or RI and/or PMI for a beam-formed CSI-RS, the vectors in the first codebook matrix represented by $N_1N_2$-length column vectors, where the m-th vector (m=1, ..., $N_1N_2$) contains a single 1 at the m-th position and zeros elsewhere.

In accordance with embodiments, the communication device is configured to receive a CSI-RS resource configuration including a higher layer (e.g., RRC) parameter, e.g., referred to as CSI-RS-BurstDuration, indicating a time-domain-repetition of the downlink reference signals, e.g., in terms of a number of consecutive slots the downlink reference signals are repeated in.

In accordance with embodiments, the communication device assumes that for CQI, and/or RI, and/or PMI calculation, the transmitter applies the Doppler-beam precoder to PDSCH signals on antenna ports {1000,1008+v−1} for v=L layers as $$\begin{bmatrix} y^{(t,3000)}(i) \\ \vdots \\ y^{(t,3000+P-1)}(i) \end{bmatrix} = P(t, i) \begin{bmatrix} x^{(t,0)}(i) \\ \vdots \\ x^{(t,v-1)}(i) \end{bmatrix},$$

where
- $[x^{(t,0)}(i), \ldots, x^{(t,v-1)}(i)]^T$ is a symbol vector of PDSCH symbols, P∈{1, 2, 4, 8, 12, 16, 24, 32},
- $x^{(t,u)}(i)$ is the i-th symbol of layer u at time instant t,
- $y^{(t,u)}(i)$ is the precoded symbol transmitted on antenna port u at time instant t, and
- $P(t, i)=[P^{(1)}(t, i), \ldots, P^{(L)}(t, i)]$ is the predicted Doppler-beam precoder matrix, with $P^{(l)}(t, i)$ being the t-th block and i-th subband, subcarrier or PRB of $P^{(l)}$.

Base Station

The present invention provides a transmitter 200 in a wireless communication system including a communication device 202. The transmitter comprises:
an antenna array ANTI having a plurality of antennas for a wireless communication with one or more of the inventive communication devices 202 for providing a channel state information, CSI, feedback to the transmitter; and
a precoder 200b connected to the antenna array ANTI, the precoder 202b to apply a set of beamforming weights to one or more antennas of the antenna array ANTI to form, by the antenna array ANTI, one or more transmit beams or one or more receive beams,
a transceiver 202c configured to
- transmit, to the communication device 202, downlink reference signals (CSI-RS) according to a CSI-RS configuration comprising a number of CSI-RS antenna ports and a parameter, e.g., referred to as CSI-RS BurstDuration, indicating a time-domain-repetition of the downlink reference signals, e.g., in terms of a number of consecutive slots the downlink reference signals are repeated in, and downlink signals comprising the CSI-RS configuration; and
- receive uplink signals comprising a plurality of CSI reports from the communication device 202; and a processor 200a configured to:
- extract at least the two component precoder matrix identifier and the rank indicator from the plurality of CSI reports; and construct a Doppler-beam precoder matrix applied on the antenna ports using a first component and a second component of the PMI, and determine the beamforming weights responsive to the constructed precoder matrix.

In accordance with embodiments, to facilitate precoder matrix prediction for QT future time instants, the processor is configured to cyclically extend the Doppler-frequency DFT-vectors $f_{p,u,v}^{(l)}$ to length-QT vectors $t_{p,u,v}^{(l)}$, the cyclic extension defined by $$t_{p,u,v}^{(l)} = \left[1, e^{j\frac{2\pi k}{O_2}}, \ldots, e^{j\frac{2\pi k(Q-1)}{O_2}}\right]^T \otimes f_{p,u,v}^{(l)}, \forall u, v, p, l,$$

$$\text{where } f_{p,u,v}^{(l)} = \left[1, e^{j\frac{2\pi k}{O_2 T}}, \ldots, e^{j\frac{2\pi k(T-1)}{O_2 T}}\right]^T \in \Omega_2, \text{ and}$$

the predicted Doppler-beam precoder matrix for the l-th layer is based on
- $U^{(l)}$ beamforming vectors $b_u^{(l)}$, independent of the polarization, selected from the first codebook,
- $F_u^{(l)}$ extended Doppler-frequency vectors $t_{p,u,v}^{(l)}$ which are based on the Doppler-frequency vectors $f_{p,u,v}^{(l)}$ selected from the second codebook for u-th beam, and
- a set combination coefficients $\gamma_{p,s,u,v}^{(l)}$ for complex scaling/combining the vectors selected from the first and second codebook.

In accordance with embodiments, to facilitate precoder matrix prediction for QT future time instants, the processor is configured to cyclically extend the Doppler-frequency DFT-vectors $f_{p,u,v}^{(l)}$ to length-QT vectors $t_{p,u,v}^{(l)}$, the cyclic extension defined by $$t_{p,u,v}^{(l)} = \left[1, e^{j\frac{2\pi k}{O_2}}, \ldots, e^{j\frac{2\pi k(Q-1)}{O_2}}\right]^T \otimes f_{p,u,v}^{(l)}, \forall u, v, p, l,$$

where $$f_{p,u,v}^{(l)} = \left[1, e^{j\frac{2\pi k}{O_2 T}}, \ldots, e^{j\frac{2\pi k(T-1)}{O_2 T}}\right]^T \in \Omega_2,$$

and
the predicted Doppler-beam precoder matrix for the l-th layer, q-th (q=1, . . . , QT) time instant, and s-th subband, subcarrier or PRB is Oven by $$P^{(l)}(q,s) = P^{(l)} \begin{bmatrix} \sum_{u=0}^{U^{(l)}-1} \sum_{v=0}^{F_u^{(l)}-1} \gamma_{1,s,u,v}^{(l)} t_{1,u,v}^{(l)}(q) \otimes b_u^{(l)} \\ \sum_{u=0}^{U^{(l)}-1} \sum_{v=0}^{F_u^{(l)}-1} \gamma_{2,s,u,v}^{(l)} t_{2,u,v}^{(l)}(q) \otimes b_u^{(l)} \end{bmatrix}$$

where $t_{p,u,v}^{(l)}$ is the q-th entry of $t_{p,u,v}^{(l)}$.

Methods

The present invention provides a method for providing a channel state information, CSI, feedback in a wireless communication system, the method comprising:
receiving, from a transmitter, a radio signal via a time-variant, frequency-selective MIMO channel, the radio signal including downlink reference signals according to a reference signal configuration comprising a number of antenna ports, and downlink signals comprising the reference signal configuration;
estimating, at the communication device, an explicit CSI in the frequency domain using measurements on the downlink reference signals on the radio channel, the downlink reference signals provided over a certain observation time,
based on a performance metric, selecting, at the communication device, a Doppler-beam precoder matrix (P) for a composite Doppler-beam dual-stage precoder, the Doppler-beam dual-stage precoder being based on one or more codebooks, the one or more codebooks including
   one or more transmit-side spatial beam components of the composite Doppler-beam dual-stage precoder, and
   one or more Doppler-frequency components of the composite Doppler-beam dual-stage precoder,
calculating one or more of a channel quality indicator, CQI, a precoder matrix indicator, PMI, and a rank indicator, RI, using the explicit CSI and the composite Doppler-beam dual-stage precoder with the selected Doppler-beam precoder matrix (P), and
reporting to the transmitter the CSI feedback including either one or more of the CQI, and/or the PMI and/or the RI, wherein the PMI and RI are used to indicate the Doppler-beam dual-stage composite precoder matrix for the configured antenna ports.

The present invention provides a method for transmitting in a wireless communication system including a communication device and a transmitter, the method comprising:
transmitting, to a communication device, downlink reference signals (CSI-RS) according to a CSI-RS configuration comprising a number of CSI-RS antenna ports and a parameter, e.g., referred to as CSI-RS BurstDuration, indicating a time-domain-repetition of the downlink reference signals, e.g., in terms of a number of consecutive slots the downlink reference signals are repeated in, and downlink signals comprising the CSI-RS configuration;
receiving, at the transmitter, uplink signals comprising a plurality of CSI reports from the communication device;
extracting, at the transmitter, at least the two component precoder matrix identifier and the rank indicator from the plurality of CSI reports;
constructing, at the transmitter, a Doppler-beam dual-stage precoder matrix applied on the antenna ports using a first component and a second component of the PMI, and determining, responsive to the constructed precoder matrix, beamforming weights for a precoder connected to an the antenna array of the transmitter.

General
System

The present invention provides a base wireless communication network, comprising at least one of the inventive UEs, and at least one of the inventive base stations.

In accordance with embodiments, the communication device and the transmitter comprises one or more of: a mobile terminal, or stationary terminal, or cellular IoT-UE, or an IoT device, or a ground based vehicle, or an aerial vehicle, or a drone, or a moving base station, or road side unit, or a building, or a macro cell base station, or a small cell base station, or a road side unit, or a UE, or a remote radio head, or an AMF, or an SMF, or a core network entity, or a network slice as in the NR or 5G core context, or any transmission/reception point (TRP) enabling an item or a device to communicate using the wireless communication network, the item or device being provided with network connectivity to communicate using the wireless communication network.

Computer Program Product

The present invention provides a computer program product comprising instructions which, when the program is executed by a computer, causes the computer to carry out one or more methods in accordance with the present invention.

In the following, first, embodiments will, be described which use a Doppler-delay-beam three-stage composite precoder employing codebooks with reduced size, followed by a description of further embodiments employing a Doppler-beam dual-stage composite precoder.

Doppler-Delay-Beam Three-Stage Composite Precoder

Embodiments of the present invention provides for an extension of the existing CSI-RS to track the channel time-evolution, e.g., for a channel having channel conditions which change fast, for example due to a high movement of the UE in a multi-path channel environment, and having a short channel coherence time. The present invention is advantageous as by tracking the channel time-evolution, even for channels with varying channel conditions, the CSI needs not to be updated less frequently, e.g., with a rate similar for channels with a long channel coherence time, thereby reducing or avoiding a feedback overhead. For example, the large-scale channel parameters such as path loss and shadow fading may not change quickly over time, even in a channel having a short channel coherence time, so that the channel variations are mainly related to small scale channel fading. This means the MIMO channel parameters of the impulse response such as path components and channel delays do not change over a longer time period, and channel variations caused by movement of the UE lead only to phase fluctuations of the MIMO channel path components. This means the spatial beams, the precoder Doppler-frequency DFT-vectors, the delay DFT-vectors as well as the Doppler-delay coefficients of the Doppler-delay-beam three-stage precoder remain identical or substantially identical for a long time period, and need to be less frequently updated.

To address the above-mentioned issues in conventional approaches, according to which current CSI feedback schemes are not sufficient, embodiments of the present invention provide a CSI-RS design allowing track time-evolution of CSI or a new implicit CSI reporting scheme that takes into account the channel time-evolution and provides information about current and future RI, PMI and CQI in a compressed form to reduce the feedback rate.

Figure 4:
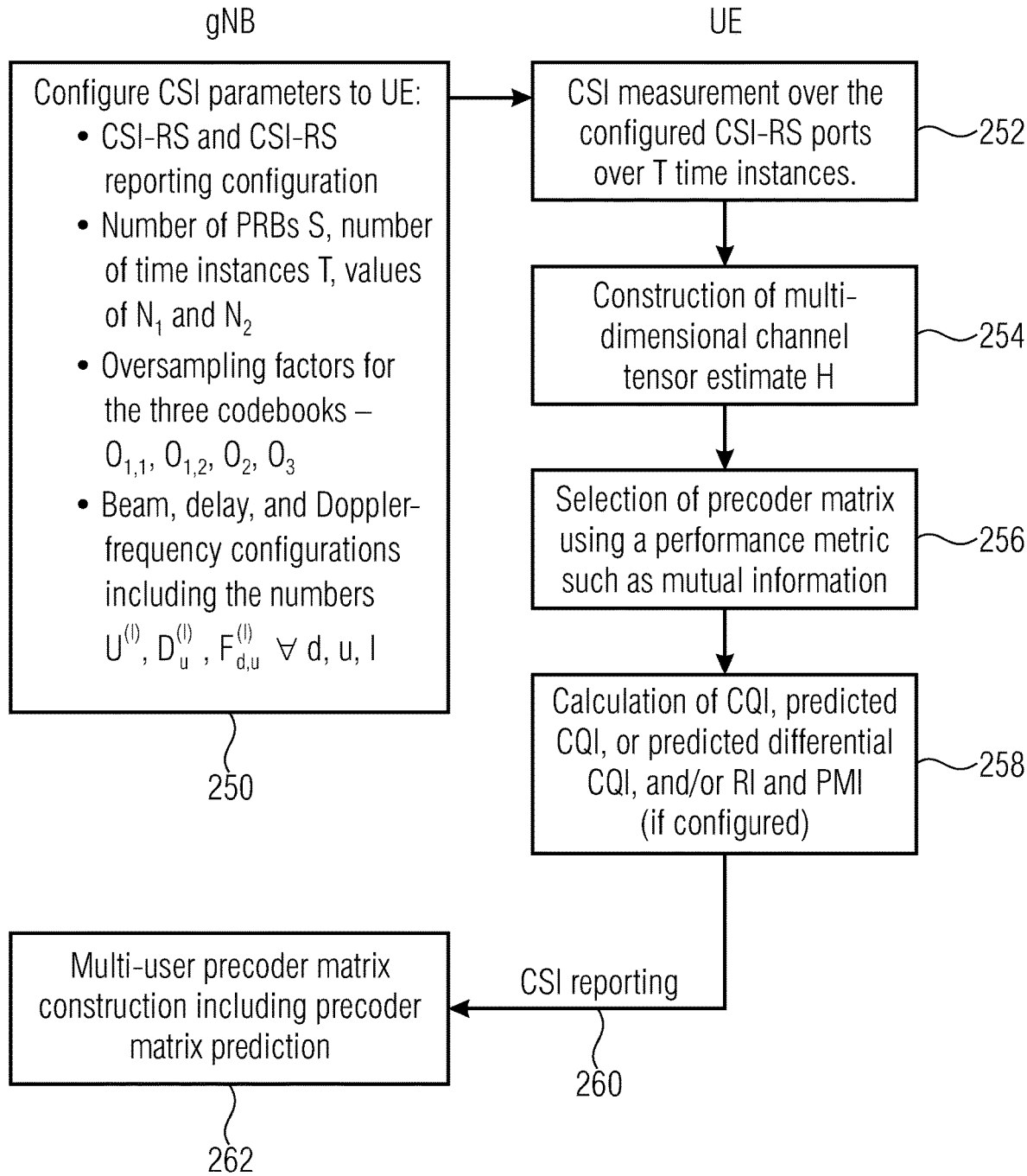
FIG. 4 is a flow diagram illustrating the configuration of CSI parameters, the CSI measurement, the composite precoder matrix calculation and the CSI reporting in accordance with an embodiment of the present invention employing a Doppler-delay-beam three-stage precoder.

FIG. 4 is a flow diagram illustrating the configuration of CSI parameters, the CSI measurement, the composite precoder matrix calculation and the CSI reporting in accordance with an embodiment of the present invention. The UE may be configured with a CSI-RS resource configuration via a higher layer (such as RRC) containing information about the number of assigned CSI-RS ports used for the transmission to the UE. The number of CSI-RS ports, M, is equal to $PN_1N_2$ (where P=1 for co-polarized array antennas, and P=2 for dual-polarized array antennas at the base station), and where $N_1$ and $N_2$ are the number of antenna ports of the first and second spatial dimensions of the gNB array, respectively. The UE is configured with a CSI reporting configuration via a higher layer and/or a physical layer (via DCI) that also contains information for an evaluation of the CSI feedback parameters, such as CQI, RI and PMI, at the UE. The base station or gNB signals via a higher layer or a physical layer at least five integer values for ($N_1$, $N_2$, P), S, and T, where ($N_1$, $N_2$, P) are used to configure a first codebook, and S and T are used to configure a second codebook and a third codebook, respectively, for the PMI decomposition/calculation at the UE. The CQI, RI and PMI selection is performed at the UE according to the subsequently described embodiments.

At a step 250, the gNB or base station sends a CSI-RS configuration and CSI report configuration to the UE. In accordance with embodiments, the CSI-RS configuration may include a CSI-RS resource(s) configuration with respect to sub-clause 7.4.1.5 in TS 38.211 [1] and with sub-clause 6.3.2 in TS.38.331 [4]. Further, an additional higher layer parameter configuration referred to as CSI-RS-BurstDuration is included.

The CSI-RS-BurstDuration is included to provide a CSI-RS design allowing to track the time-evolution of the channel. In accordance with embodiments, a UE is configured with a CSI-RS resource set(s) configuration with the higher layer parameter CSI-RS-BurstDuration, in addition to the configurations from clause 7.4.1.5 in TS 38.211 [2] and clause 6.3.2 in TS.38.331 [4] mentioned above, to track the time-evolution of CSI. The time-domain-repetition of the CSI-RS, in terms of the number of consecutive slots the CSI-RS is repeated in, is provided by the higher layer parameter CSI-RS-BurstDuration. The possible values of CSI-RS-BurstDuration for the NR numerology $\mu$ are $2^\mu \cdot X_B$ slots, where $X_B \in \{0, 1, 2, \ldots, \text{maxNumBurstSlots}-1\}$. The NR numerology $\mu=0, 1, 2, 3, 4 \ldots$ defines, e.g., a subcarrier spacing of $2^\mu \cdot 15$ kHz in accordance with the NR standard.

For example, when the value of $X_B=0$ or the parameter CSI-RS-BurstDuration is not configured, there is no repetition of the CSI-RS over multiple slots. The burst duration scales with the numerology to keep up with the decrease in the slot sizes. Using the same logic used for periodicity of CSI-RS. FIG. 5(a) illustrates a CSI-RS with a periodicity of 10 slots and no repetition (CSI-RS-BurstDuration not configured or CSI-RS-BurstDuration=0), and FIG. 5(b) illustrates a CSI-RS with a periodicity of 10 slots and repetition of 4 slots (CSI-RS-BurstDuration=4). FIG. 6 illustrates a CSI-RS-BurstDuration information element in accordance with an embodiment. The information element of the new RRC parameter CSI-RS-BurstDuration is as follows: the value next to the text burstSlots indicates the value of $X_B$, which for a given New Radio numerology $\mu$ (see [1]) provides the burst duration $2^\mu \cdot X_B$ of the CSI-RS, i.e., the number of consecutive slots of CSI-RS repetition.

The burst-CSI-RS across multiple consecutive slots enables the extraction of time-evolution information of the CSI and for reporting of the precoder matrix, e.g. as a part of the PMI, in a way as described in more detail below. In other words, the UE may calculate the CQI, RI and PMI according to the embodiments described below with a repetition of the CSI-RS resource(s) over multiple consecutive slots, and report them accordingly.

Returning to the flow diagram of FIG. 4, the CSI report configuration provided by the eNB may further include one or more of at least the following parameters:

a configuration of the CSI report configuration with respect to sub-clause 5.2.1.1 in TS 38.214 [2], and the following higher layer parameters: ReportQuantity listed in TS 38.331 [1] with the following additional parameters:
cri-RI-PMIDD-CQI
cri-RI-PMIDy-CQI
cri-RI-PMIDr-CQI
cri-RI-LI-PMIDD-CQI
cri-RI-LI-PMIDy-CQI
cri-RI-LI-PMIDr-CQI
cri-RI-PMIDD
cri-RI-PMIDy
cri-RI-PMIDr The CRI (CSI-RS resource indicator), RI (rank indicator) and LI (layer indicator) mentioned in the reporting quantities are reported, i.e., the possible values reported and the format for reporting CRI, RI and LI are identical as the ones in TS 38.214 [2]. The PMI quantities mentioned in ReportQuantity are defined as:
PMIDD—PMI values including the delay and the Doppler-frequency component configurations as described in the embodiments below;
PMIDy—PMI values including only the delay component configuration as described in the embodiments below, excluding the Doppler-frequency component(s);
PMIDr—PMI values including only the Doppler-frequency component configuration as described in the embodiments below, excluding the delay component(s).
a parameter CQI-PredictionTime assigned with the value K for CQI prediction (if configured).

The CQI value, predicted CQI value, etc. (if configured) as mentioned in the reporting quantity may be calculated as explained in subsequently described embodiments over multiple time slots. The values of the CQI reported are identical as mentioned in TS 38.214 [2].

In addition, the following parameters may be signaled by the eNB to the user equipment via physical layer or higher layer (RRC) parameters:
values of S and T for the configuration of the delay and Doppler-frequency component codebooks $\Omega_2$ and $\Omega_3$, respectively, are represented by the parameters CodebookConfig-S, CodebookConfig-T. The oversampling factors $O_2$ and $O_3$ of the codebooks $\Omega_2$ and $\Omega_3$ are represented by CodebookConfig-O2 and CodebookConfig-O3, respectively.
parameters $N_1$, $N_2$ and oversampling factors $O_{1,1}$ and $O_{1,2}$ for the configuration of the first codebook $\Omega_1$, as described below. The parameters $N_1$ and $N_2$ are represented by CodebookConfig-N1 and CodebookConfig-N2, respectively. The oversampling factors $O_{1,1}$ and $O_{1,2}$ are represented by CodebookConfig-O1_1 and CodebookConfig-O1_2, respectively.
In response to the report configuration, the UE
performs, at step 252, measurements on downlink CSI-RS over T consecutive time-instants/slots,
constructs, at step 254, the time-variant frequency-selective MIMO channel tensor IC;
selects, at step 256, the Doppler-delay-beam composite three-stage precoder matrix for each layer (PMI selection) with respect to a specific performance metric as explained in more detail below;
calculates, at step 258, a CQI value, a predicted CQI value, or predicted differential CQI values (if configured) for a future time instant or for a set of future time instants using the selected Doppler-delay-beam composite three-stage precoder matrix and at least one of the MIMO channel tensor $\mathcal{H}$ and a prediction of the MIMO channel tensor for future time instants, and, optionally, selects a RI value (if configured) using the selected Doppler-delay-beam composite three-stage precoder matrix and the MIMO channel tensor $\mathcal{H}$, and
sends, at step 260, the CSI report to the gNB.

The gNB, at step 262, reconstructs the Doppler-delay-beam composite three-stage precoder matrix (PMI report) to facilitate multi-user precoding matrix calculation and precoder matrix prediction for future time instants.

In accordance with this aspect of the present invention, the one or more delay components and/or the one or more Doppler-frequency components of the composite Doppler-delay-beam three-stage precoder are defined by one or more sub-matrices of a DFT matrix or by one or more sub-matrices of an oversampled DFT matrix. In accordance with embodiments employing the above mentioned three codebooks $\Omega_1$, $\Omega_2$ and $\Omega_3$, the entries of the second codebook matrix $\Omega_2$ are given by a sub-matrix or multiple submatrices of a S×S DFT-matrix or a S×SO$_2$ oversampled DFT matrix, where S denotes the number of subbands, and the entries of the third codebook matrix $\Omega_3$ are given by a sub-matrix or multiple submatrices of a T×T DFT-matrix or a T×TO$_3$ oversampled DFT matrix, where T refers to a number of time instances during the observation time.

This aspect of the present invention is based on the finding that the delay or delay differences used for delay precoding, typically, have only a limited value range and that, due to this limited range, not all entries of the codebook matrix need to be used at the receiver for constructing the space-delay dual-stage precoder. In accordance with the inventive approach, the size of the codebook and the complexity of selecting the codebook entries (delays or delay differences) for constructing the space delay dual-stage precoder are greatly reduced.

Reduction of Codebook Size $\Omega_2$

Figure 7A:
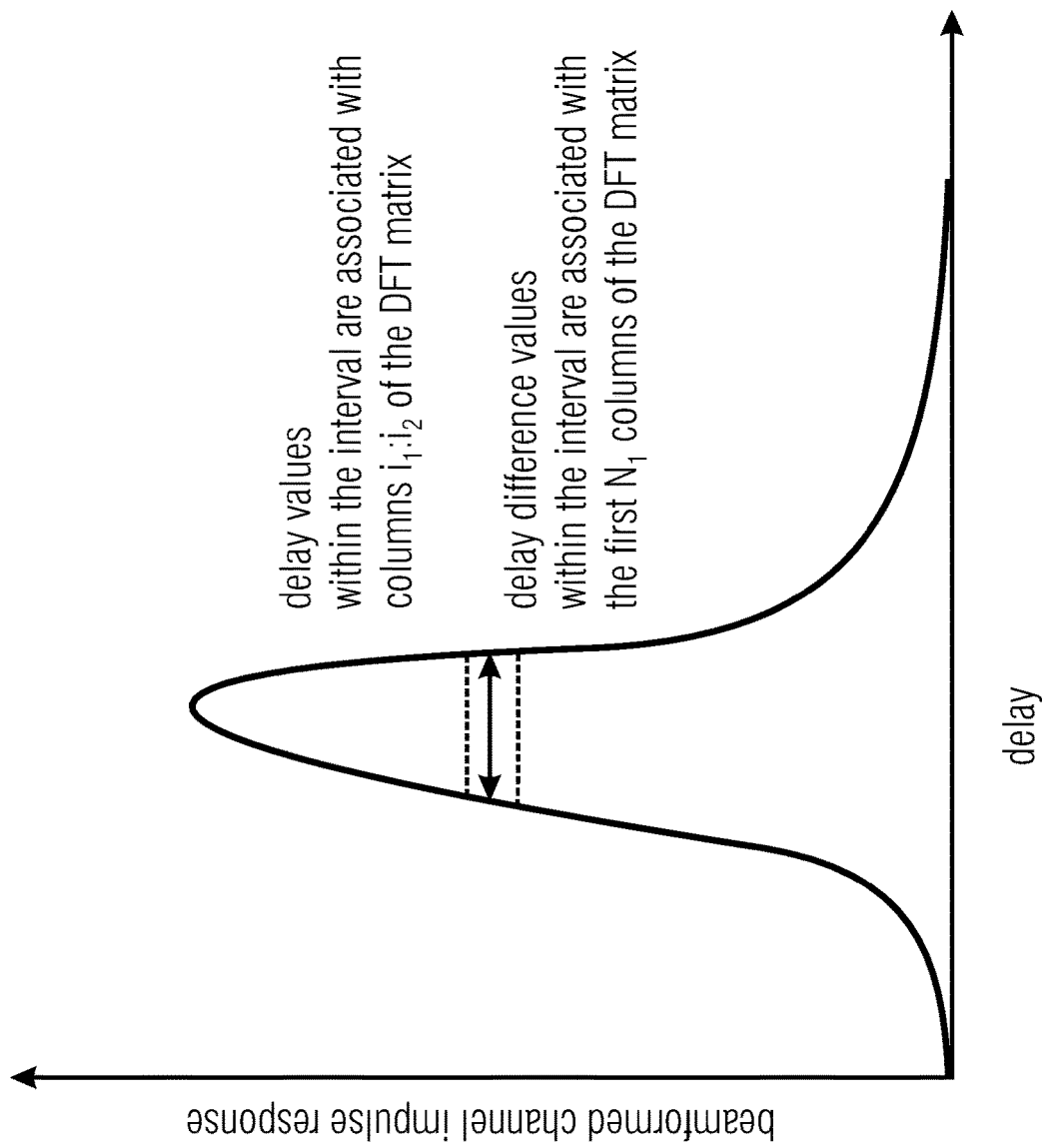
FIGS. 7($a$) and 7($b$) illustrates two examples of the beamformed channel impulse response obtained when combining the first stage precoder $F_1$ with the MIMO channel impulse response, wherein FIG. 7($a$) illustrates the indices of the DFT vectors from the frequency-domain codebook associated with the delays or delay differences within the main peak of the beamformed channel impulse response, and FIG. 7($b$) illustrates the indices of the DFT vectors from the frequency-domain codebook associated with the delays or delay differences within the two peaks of the beamformed channel impulse response.
Figure 7B:
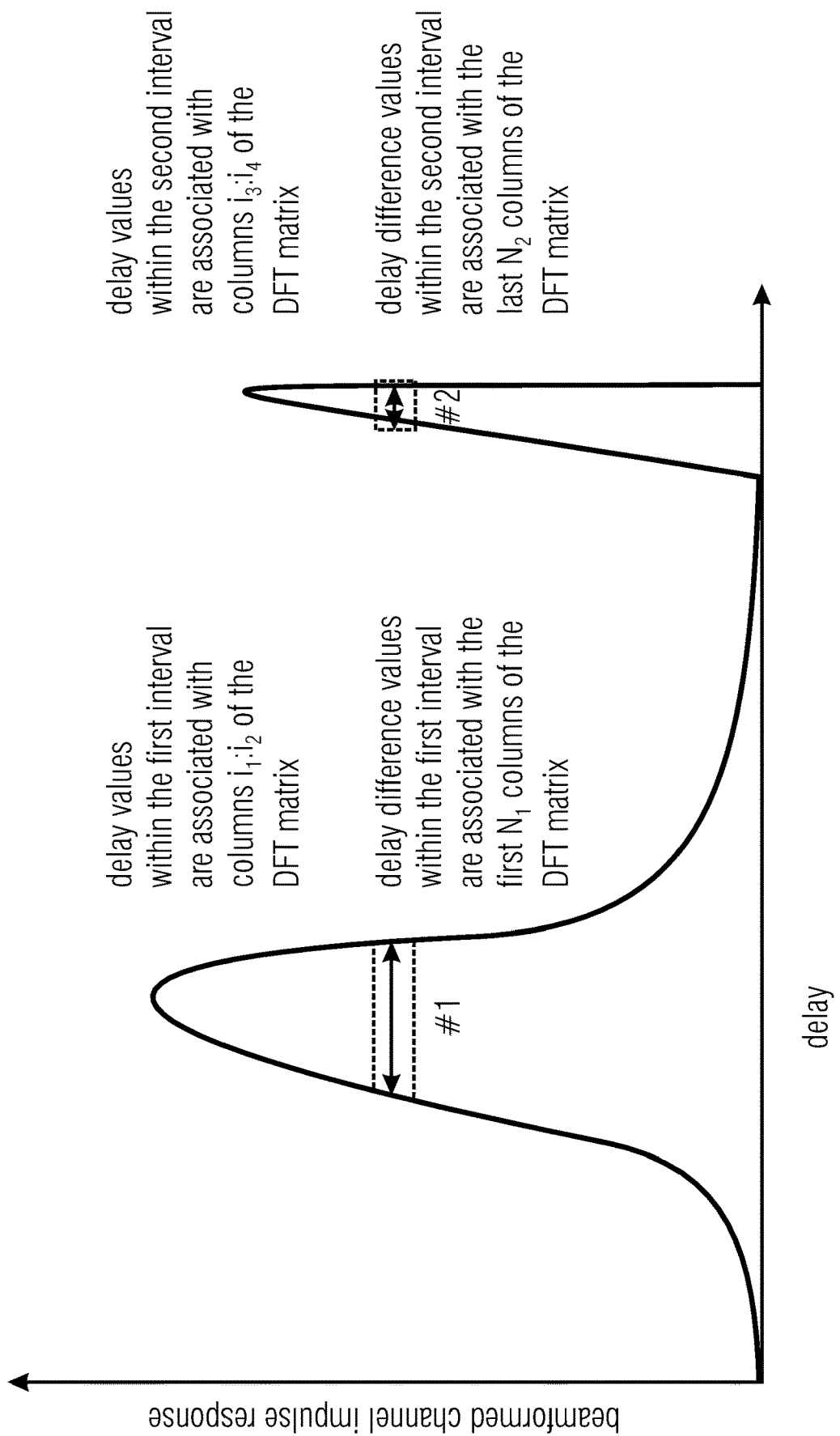

As mentioned above, the delays of the precoder typically have only a limited value range. The value range may depend on the delay spread of the 2U beam-formed channels obtained when combining the beam-formed vectors $b_u^{(l)}$, $\forall u$ with the MIMO channel impulse responses. FIG. 7 illustrates two examples of channel impulse responses obtained when combining the beamforming vectors $b_u^{(l)}$, $\forall u$ with a MIMO channel impulse response. It is observed from FIG. 7(a) that the beam-formed channel impulse response is concentrated and only a few delays are associated with the main peak. Moreover, FIG. 7(a) also illustrates the associated indices of the DFT vectors from the codebook $\Omega_2$ to these delays or delay differences. Similarly, FIG. 7(b) shows a beam-formed channel impulse response comprising two peaks, the delays associated with these two peaks and the corresponding indices of DFT-vectors from the codebook $\Omega_2$. Thus, it can be observed that the delays or delay differences are mainly associated with only a part of the codebook matrix $\Omega_2$, the first entries/columns of the DFT matrix in the case of FIG. 7(a), and the first and last entries/columns of the DFT matrix in the case of FIG. 7(b). Therefore, the entries of the codebook matrix $\Omega_2$ used at the receiver for constructing the Doppler-delay-beam three-stage precoder may be given by a sub-matrix or may contain multiple submatrices of a S×S DFT-matrix or S×SO$_2$ oversampled DFT matrix. In this way, the size of the codebook and the search space of the delay combinations during the optimization of the parameters of the Doppler-delay-beam three-stage precoder can be greatly reduced. For example, when the codebook is given by a fully oversampled DFT matrix containing SO$_2$−1 vectors and the receiver is configured to select D delays per beam, the receiver computes $$\binom{SO_f - 1}{D}$$

possible delay combinations per beam during the parameter optimization of the precoder. For typical values of S=6, O$_2$=3 and D=3, the receiver performs a parameter optimization for each of the 680 delay combinations per beam. In order to reduce the search space of the delay combinations and hence the computational complexity of the parameter optimization, the codebook matrix may be defined by the first N columns of a DFT matrix or oversampled DFT matrix such that $\Omega_2=[a_0, a_1, \ldots, a_{SO_2-1}]$, where $$a_i = \left[1, e^{\frac{-j2\pi i}{O_2 S}} \ldots e^{\frac{-j2\pi i(S-1)}{O_2 S}}\right]^T \in \mathbb{C}^{S \times 1}$$

(see FIG. 7(a)). For a typical value of N=4, the search space of the above example reduces from 680 to 4 delay combinations per beam. Thus, the receiver performs the parameter optimization for only 4 instead 680 delay combinations per beam. In another example, the codebook matrix $\Omega_2$ is defined by the first $N_1$ columns and the last $N_2$ columns of a DFT matrix or oversampled DFT matrix such that $\Omega_2=[a_0, a_{N_1-1}, a_{SO_2-N_2}, \ldots, a_{SO_2-1}]$. In a further example, the codebook matrix $\Omega_2$ is defined by the $i_2$ columns of a DFT matrix or oversampled DFT matrix such that $\Omega_2=[a_{i_1}, a_{i_1+1}, \ldots, a_{i_2}]$. The codebook matrix may also contain multiple submatrices of a DFT matrix or oversampled DFT matrix. For the case of two DFT submatrices defined by $i_1:i_2$ columns and $i_3:i_4$ columns, the codebook matrix is given by $\Omega_2=[a_{i_1}, a_{i_1+1}, \ldots, a_{i_2}, a_{i_3}, a_{i_3+1}, \ldots, a_{i_4}]$. In accordance with embodiments, the communication device receives from the transmitter the higher layer (such as Radio Resource Control (RRC) layer or MAC-CE) or physical layer (L1) parameters indicating a plurality of columns of a DFT or oversampled DFT matrix used for the configuration of the delay DFT codebook ($\Omega_2$).

In accordance with other embodiments, the communication device is configured to use a priori known (default) parameters indicating a plurality of columns of a DFT or oversampled DFT matrix used for the configuration of the delay DFT codebook ($\Omega_2$).

Reduction of Codebook Size $\Omega_3$

Similarly, to the delay components as explained above, the Doppler-frequency components of the precoder also typically have only a limited value range. The value range may depend on the Doppler-frequency spread of the 2U beam-formed channels obtained when combining the beam-formed vectors $b_u^{(l)}$, $\forall u$ with the MIMO channel impulse responses. Therefore, the entries of the codebook matrix $\Omega_3$ used at the receiver for constructing the precoder may be given by a sub-matrix or may contain multiple submatrices of a T×T DFT-matrix or T×TO_3 oversampled DFT matrix. For example, the codebook $\Omega_3$ may be defined by the first N columns of a DFT matrix or oversampled DFT matrix $D=[a_0, a_1, \ldots, a_{TO_3-1}]$, where $$a_i = \left[1, e^{\frac{-j2\pi i}{O_3 T}} \ldots e^{\frac{-j2\pi i(T-1)}{O_3 T}}\right]^T \in \mathbb{C}^{T \times 1},$$

such that $\Omega_3=[a_0, a_1, \ldots, a_{N-1}]$. The DFT codebook matrix $\Omega_3$ may be defined by the first $N_1$ columns and the last $N_2$ columns of a DFT matrix or oversampled DFT matrix such that $\Omega_3=[a_0, \ldots, a_{N_1-1}, a_{TO_3-N_2}, \ldots, a_{TO_3-1}]$. Also, the codebook matrix $\Omega_3$ may be defined by the $i_1:i_2$ columns of a DFT matrix or oversampled DFT matrix such that $\Omega_3=[a_{i_1}, a_{i_1+1}, \ldots, a_{i_2}]$. The codebook matrix may also contain multiple submatrices of a DFT matrix or oversampled DFT matrix. For the case of two DFT submatrices defined by $i_1:i_2$ columns and $i_3:i_4$ columns, the codebook matrix is given by $\Omega_3=[a_{i_1}, a_{i_1+1}, \ldots, a_{i_2}, a_{i_3}, a_{i_3+1}, \ldots, a_{i_4}]$.

In accordance with embodiments, the communication device receives from the transmitter the higher layer (such as Radio Resource Control (RRC) layer or MAC-CE) or physical layer (L1) parameters indicating a plurality of columns of a DFT or oversampled DFT matrix used for the configuration of the delay DFT codebook ($\Omega_3$).

In accordance with other embodiments, the communication device is configured to use a priori known (default) parameters indicating a plurality of columns of a DFT or oversampled DFT matrix used for the configuration of the delay DFT codebook ($\Omega_3$).

Feedback of Non-Selected Delay or Delay Difference Indices for Constructing the Precoder Matrix In accordance with embodiments, the communication device is configured to select $D_u^{(l)}$ delays for the u-th beam for constructing the Doppler-delay-beam three-stage precoder matrix for the l-th layer from the codebook matrix $\Omega_2$ containing X entries/columns, and to feedback the X–$D_u^{(l)}$ non-selected delay indices from the codebook matrix $\Omega_2$ to the transmitter. For example, when the codebook matrix $\Omega_2=[a_{i_1}, a_{i_1+1}, \ldots, a_{i_1+3}, a_{i_1+4}]$ contains five entries/columns and the receiver is configured to select $D_1^{(l)}=3$ delay components for the first beam and l-th layer for constructing the precoder, and it selects the vectors $d_{1,0,0}^{(l)}=a_{i_1}$, $d_{1,0,1}^{(l)}=a_{i_1+1}$, $d_{1,0,2}^{(l)}=a_{i_1+2}$ from the codebook $\Omega_2$, the receiver feedbacks the non-selected indices $i_1+3$ and $i_1+4$ (or relative indices 3 and 4) to the transmitter.

The number of delays $D_u^{(l)}$ may be identical to a subset of beams or all beams, such that $D_u^{(l)}=D^{(l)}$ (for the case of all beams). The number of delays $D_u^{(l)}$ may also be identical to the beams and layers, such that $D_u^{(l)}=D$.

Feedback of Non-Selected Doppler-Frequency Indices for Constructing the Precoder Matrix In accordance with embodiments, the communication device is configured to select $F_{d,u}^{(l)}$ Doppler-frequency components for the d-th delay and u-th beam for constructing the Doppler-delay-beam three-stage precoder matrix for the l-th layer from the codebook matrix $\Omega_3$ containing X entries/columns, and to feedback the X–$F_{d,u}^{(l)}$ non-selected Doppler-frequency indices from the codebook matrix $\Omega_3$ to the transmitter. For example, the codebook matrix $\Omega_3=[a_{i_1}, a_{i_1+1}, \ldots, a_{i_1+3}, a_{i_1+4}]$ may contain five entries/columns and the receiver is configured to select three Doppler-frequency components for the first beam, first delay and l-th layer for constructing the Doppler-delay-beam three-stage precoder, and it selects the vectors $f_{1,0,0,0}^{(l)}=a_{i_1}$, $d_{1,0,0,1}^{(l)}=a_{i_1+1}$, $d_{1,0,0,2}^{(l)}=a_{i_1+2}$, the receiver feedbacks the indices $i_1+3$ and $i_1+4$ (or relative indices 3 and 4) representing the non-selected Doppler-frequency components for the d-th delay and u-th beam to the transmitter.

The number of Doppler-frequency components $F_{d,u}^{(l)}$ may be identical to a subset of delays and subset of beams, such that $F_{d,u}^{(l)}=F^{(l)}$ (for the case of all delays and beams). The number of delays $D_u^{(l)}$ may also be identical to the delays, beams and layers, such that $F_{d,u}^{(l)}=F$.

CQI/PMI Reporting Using a Composite Doppler-Delay-Beam Three-Stage Precoder

In accordance with embodiments, once the UE is configured with a CSI-RS resource and a CSI reporting configuration (see step 250 in FIG. 4), the UE estimates an unquantized explicit CSI using measurements on the downlink CSI-RS on PRBs, where the CSI-RS is configured over T consecutive time instants/slots in the frequency domain (see step 252 in FIG. 4).

Figure 8:
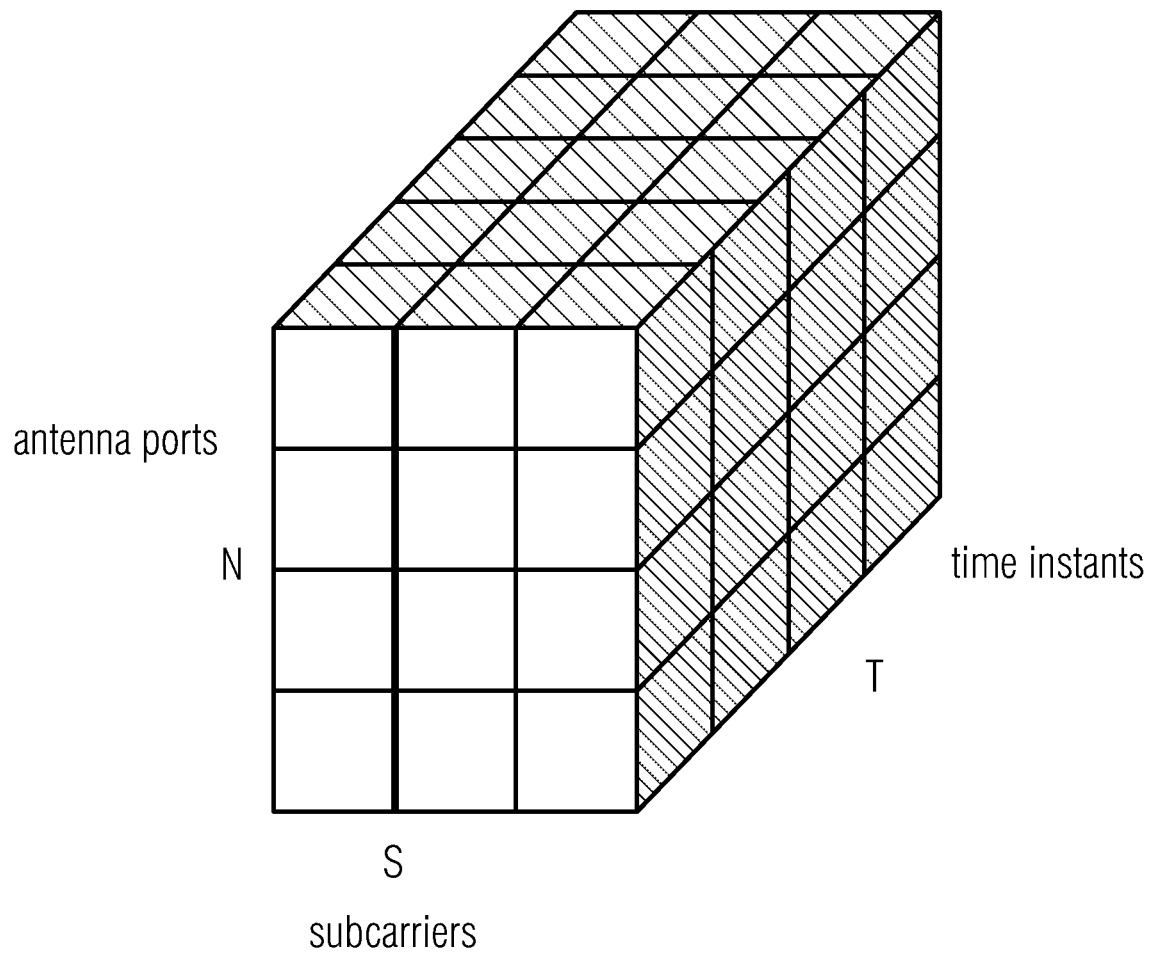
FIG. 8 illustrates a frequency-domain channel tensor (three-dimensional array) $\mathcal{H}$ of dimension N×S×T.

In accordance with embodiments, the explicit CSI is represented by a three-dimensional channel tensor (a three-dimensional array) $\mathcal{H} \in \mathbb{C}^{N \times S \times T}$ of dimension N×S×T with S being the number of configured sub-bands/PRBs, or subcarriers (see FIG. 8), and $N=N_r \cdot N_1 \cdot N_2 \cdot P$, where $N_r$ is the number of UE receive antennas. Here, the first, second and third dimension of the channel tensor represent the space, frequency, and time component of the time-variant frequency-selective MIMO channel, respectively.

In accordance with other embodiments, the explicit CSI is represented by a four-dimensional channel tensor $\mathcal{H} \in \mathbb{C}^{N_r \times N_t \times S \times T}$ of dimension $N_r \times N_t \times S \times T$, where $N_t = N_1 \cdot N_2 \cdot P$. Here, the first and second dimension of $\mathcal{H}$ represent the receive-side and transmit-side space components of the time-variant frequency-selective MIMO channel, respectively. The third and fourth dimension of $\mathcal{H}$ represent the frequency and time component of the MIMO channel, respectively.

In a next step, the UE calculates a CQI using the explicit CSI in the form of the channel tensor $\mathcal{H}$ and a composite Doppler-delay-beam three-stage precoder constructed using three separate codebooks:
- a first codebook $\Omega_1$ for the transmit-side space (beams) components of the Doppler-delay-beam precoder;
- a second codebook $\Omega_2$ for the delay components of the Doppler-delay-beam precoder; and
- a third codebook $\Omega_3$ for the Doppler-frequency components of the Doppler-delay-beam precoder.

In accordance with embodiments, instead of using three separate codebooks, the above mentioned beam, delay and Doppler-frequency components may be included into a single or common codebook, or two of the above mentioned beam, delay and Doppler-frequency components are included in one codebook, and the remaining component is included in another codebook.

Assuming a rank-L transmission, the composite Doppler-delay-beam three-stage precoder $W^{(l)}$ of dimension $N_t \cdot T \times S$ for the l-th layer (l=1, ... , L) is represented by a (column-wise) Kronecker-product (assuming a dual-polarized transmit antenna array at the gNB) as $$W^{(l)} = P^{(l)} \begin{bmatrix} \sum_{u=0}^{U^{(l)}-1} \sum_{d=0}^{D_u^{(l)}-1} \sum_{v=0}^{F_{d,u}^{(l)}-1} \gamma_{1,u,d,v}^{(l)} f_{1,u,d,v}^{(l)} \otimes d_{1,u,d}^{(l)T} \otimes b_u^{(l)} \\ \sum_{u=0}^{U^{(l)}-1} \sum_{d=0}^{D_u^{(l)}-1} \sum_{v=0}^{F_{d,u}^{(l)}-1} \gamma_{2,u,d,v}^{(l)} f_{2,u,d,v}^{(l)} \otimes d_{2,u,d}^{(l)T} \otimes b_u^{(l)} \end{bmatrix}, \quad (1)$$

where $U^{(l)}$ is the number of beams per polarization for the l-th layer, $D_u^{(l)}$ is the number of delays for the l-th layer and u-th beam, $F_{d,u}^{(l)}$ is the number of Doppler-frequency components for the l-th layer, u-th beam and d-th delay, and

- $f_{p,u,d,v}^{(l)}$ is the v-th Doppler-frequency vector of size T×1, selected from a codebook matrix $\Omega_3$, associated with the l-th layer, d-th delay, u-th spatial beam, and the p-th (p=1,2) polarization of the Doppler-delay-beam precoder;
- $d_{p,u,d}^{(l)}$ is the d-th delay vector of size S×1, selected from a codebook matrix $\Omega_2$, associated with the l-th layer, u-th spatial beam and the p-th polarization of the Doppler-delay-beam precoder;
- $b_u^{(l)}$ is the u-th spatial beam (polarization-independent) associated with the l-th layer selected from a codebook matrix $\Omega_1$;
- $\gamma_{p,u,d,v}^{(l)}$ is the Doppler-delay coefficient associated with the l-th layer, u-th spatial beam, d-th delay, v-th Doppler-frequency and the p-th polarization of the Doppler-delay-beam precoder, and $P^{(l)}$ is a scalar normalization factor to ensure a certain average total transmission power, e.g. an average total transmission power over all precoder layers.

Figure 9:
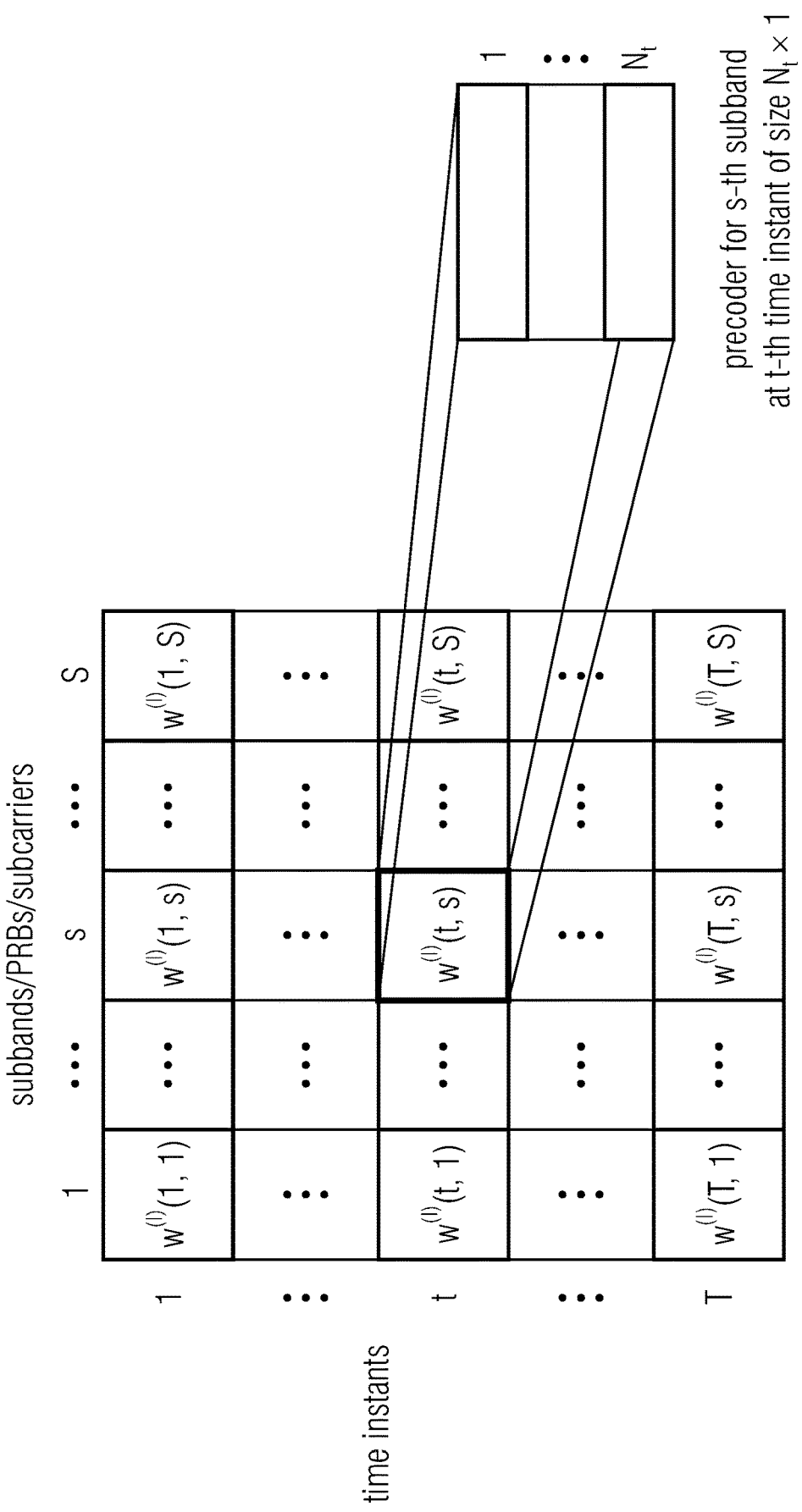
FIG. 9 illustrates a composite Doppler-delay-beam three-stage precoder matrix of size $N_t$ T×S.

A structure of the Doppler-delay-beam composite precoder matrix is shown in FIG. 9, which illustrates the composite Doppler-delay-beam precoder matrix of size $N_t \cdot T \times S$.

In accordance with other embodiments, the Doppler-delay-beam precoder may be expressed as a dual-stage precoder:

$$W^{(l)} = W^{(1,l)} w^{(2,l)} \in N_t \cdot T \cdot S \times 1,$$

where $$W^{(1,l)} = \begin{bmatrix} X_1 & 0 \\ 0 & X_2 \end{bmatrix}$$

with $$X_1 = \begin{bmatrix} f_{1,0,0,0}^{(l)} \otimes d_{1,0,0}^{(l)} \otimes b_0^{(l)} \cdots f_{1,u,d,v}^{(l)} \otimes d_{1,u,d}^{(l)} \otimes b_u^{(l)} \cdots \\ f_{1,U^{(l)}-1,D_u^{(l)}-1,F_{d,u}^{(l)}-1}^{(l)} \otimes d_{1,U^{(l)}-1,D_u^{(l)}-1}^{(l)} \otimes b_{U^{(l)}-1}^{(l)} \end{bmatrix},$$

$$X_2 = \begin{bmatrix} f_{2,0,0,0}^{(l)} \otimes d_{2,0,0}^{(l)} \otimes b_0^{(l)} \cdots f_{2,u,d,v}^{(l)} \otimes d_{2,u,d}^{(l)} \otimes b_u^{(l)} \cdots \\ f_{2,U^{(l)}-1,D_u^{(l)}-1,F_{d,u}^{(l)}-1}^{(l)} \otimes d_{2,U^{(l)}-1,D_u^{(l)}-1}^{(l)} \otimes b_{U^{(l)}-1}^{(l)} \end{bmatrix},$$

and $w^{(2,l)}$ contains the complex Doppler-delay-beam combining coefficients, $$w^{(2,l)} = \begin{bmatrix} \gamma_{1,0,0,0}^{(l)} \cdots \gamma_{1,u,d,v}^{(l)} \cdots \\ \gamma_{1,U^{(l)}-1,D_u^{(l)}-1,F_{d,u}^{(l)}-1}^{(l)} \gamma_{2,0,0,0}^{(l)} \cdots \gamma_{2,u,d,v}^{(l)} \cdots \gamma_{2,U^{(l)}-1,D_u^{(l)}-1,F_{d,u}^{(l)}-1}^{(l)} \end{bmatrix}^T$$

In accordance with embodiments, the values for the number of beams, delays, and Doppler-Doppler-frequency components ($U^{(l)}, D_u^{(l)}, F_{d,u}^{(l)}$) are configured via a higher layer (e.g., RRC, or MAC) signaling or as a part of the DCI (physical layer signaling) in the downlink grant from the gNB to the UE. In accordance with another embodiments, the UE reports the preferred values of ($U^{(l)}, D_u^{(l)}, F_{d,u}^{(l)}$) as a part of the CSI report. In accordance with other embodiments, the values of ($U^{(l)}, D_u^{(l)}, F_{d,u}^{(l)}$) are known a-priori by the UE.

Selection of Spatial Beams

In accordance with embodiments, the number of spatial beams $U^{(l)}$ and the selected beams may depend on the transmission layer. In one method, a subset of the selected spatial beams $b_u^{(l)}$ may be identical for a subset of the layers. For example, for a 4-layer transmission with $U^{(1)}$=4 beams per polarization for the first layer, $U^{(2)}$=4 beams per polarization for the second layer, $U^{(3)}$=2 beams per polarization for the third layer and $U^{(4)}$=2 beams per polarization for the fourth layer, the first two spatial beams of the first layer and second layer are identical ($b_1^{(1)}=b_1^{(2)}, b_2^{(1)}=b_2^{(2)}$) and the remaining spatial beams of the first two layers and of the third and fourth layers are different ($b_3^{(1)} \neq b_3^{(2)}$, $b_4^{(1)} \neq b_4^{(2)}$, $b_1^{(3)} \neq b_1^{(4)}$, $b_1^{(3)} \neq b_2^{(4)}$). In another method, the number of beams is identical for a subset of layers. For example, for a 4-layer transmission, the number of beams of the first layer is identical with the number of beams of the second layer $U^{(1)}=U^{(2)}$ and different for the two remaining layers ($U^{(1)} \neq U^{(3)} \neq U^{(4)}$).

In accordance with embodiments, the number of spatial beams and the beam indices may be identical for all layers and do not depend on the transmission layer index.

Selection of Delays or Delay Differences

In accordance with embodiments, the delays or delay differences may depend on the beam and transmission layer. In one method, a subset of the delays associated with a subset of the spatial beams of a transmission layer may be identical. For example, for a transmission using 4 beams for the l-th layer and first polarization, the first two delays associated to beam 1 and beam 2 are identical ($d_{1,1,1}^{(l)} = d_{1,2,1}^{(l)}$, $d_{1,1,2}^{(l)} = d_{1,2,2}^{(l)}$) and the remaining delays for the first two beams ($d_{1,1,3}^{(l)} \neq d_{1,2,3}^{(l)}$, $d_{1,1,4}^{(l)} \neq d_{1,2,4}^{(l)}$) and the delays of the third and fourth beam are different. In a further method, the number of delays for a subset of the beams of a transmission layer may be identical. For example, the number of delays for the first beam is identical with the number of delays for the second beam ($D_1^{(r)} = D_2^{(r)}$). In a further method, a subset of the delays may be identical for a subset of the spatial beams and transmission layers. For example, the two delays associated with the first beam and second beam of the first layer may be identical with the two delays associated with the first beam and second beam of the second layer ($d_{1,1,1}^{(1)} = d_{1,1,1}^{(2)}$, $d_{1,1,2}^{(1)} = d_{1,1,2}^{(2)}$, $d_{1,2,1}^{(1)} = d_{1,2,1}^{(2)}$, $d_{1,2,2}^{(1)} = d_{1,2,2}^{(2)}$). Other examples of combinations of number of delays and delays per beam and layer are not precluded.

In accordance with embodiments, the number of delays and the delays per beam may be identical for a transmission layer, so that all beams of a transmission layer are associated with the same delays.

In accordance with embodiments, the number of delays and the delays per beam and per layer may be identical for a transmission layer, so that all beams and layers are associated with the same delays.

Selection of Doppler-Frequency Components

In accordance with embodiments, the Doppler-frequency components may depend on the delay, beam and transmission layer. In one method, the Doppler-frequency components associated with a subset of delays and subset of spatial beams may be identical. For example, for a transmission using 4 beams for the l-th layer, some of the Doppler-frequency components for the first delay of beam 1 and beam 2 are identical ($f_{1,1,0,1}^{(l)} = f_{1,2,0,1}^{(l)}$, $f_{1,1,0,2}^{(l)} = f_{1,2,0,2}^{(l)}$) and the remaining Doppler-frequency components of the first delay for the first two beams and the Doppler-frequency components of the third and fourth beam and remaining two delays are different. In a further method, the number of Doppler-frequency components for a subset of the delays and/or beams of a transmission layer may be identical. For example, the number of Doppler-frequency components for the d-th delay of the first beam is identical with the number of Doppler-frequency components of the second beam ($F_{d,1}^{(l)} = F_{d,2}^{(l)}$). In a further method, a subset of the Doppler-frequency components may be identical for a subset of the delays, subset of spatial beams and subset of transmission layers. For example, the two Doppler-frequency components associated with the first delay and first beam and second beam of the first layer may be identical with the two Doppler-frequency components associated with the first delay of the first beam and second beam of the second layer $f_{1,1,1}^{(1)} = f_{1,1,2}^{(2)} = f_{1,1,2}^{(1)}$, $f_{1,2,1}^{(2)} = f_{1,2,1}^{(1)}$, $f_{1,2,2}^{(1)} = f_{1,2,2}^{(2)}$). Other examples of combinations of number of Doppler-frequency components and Doppler-frequency components per beam and layer are not precluded.

In accordance with embodiments, the number of Doppler-frequency components and the Doppler-frequency components per delay and beam may be identical for a transmission layer, so that all delays per beam of a transmission layer are associated with the same Doppler-frequency components.

In accordance with embodiments, the number of Doppler-frequency components and the Doppler-frequency components per delay and per beam may be identical for all transmission layers, so that all delays per beam of all transmission layers are associated with the same Doppler-frequency components.

DFT-Codebook Matrix Structure for $\Omega_1$, $\Omega_2$, and $\Omega_3$ of the Doppler-Delay-Beam Precoder Embodiments for implementing the above mentioned codebooks are now described.

In accordance with embodiments, the vectors (spatial beams) $b_u$) are selected from an oversampled DFT-codebook matrix $\Omega_1$ of size $N_1 N_2 \times O_{1,1} N_1 O_{1,2} N_2$. The DFT-codebook matrix is parameterized by the two oversampling factors $O_{1,1} \in \{1, 2, 3, \ldots\}$ and $O_{1,2} \in \{1, 2, 3, \ldots\}$. The DFT-codebook matrix contains a set of vectors, where each vector is represented by a Kronecker product of a length-$N_1$ DFT-vector $$v_l = \left[1, e^{j\frac{2\pi l}{O_{1,1}N_1}}, \ldots, e^{j\frac{2\pi l(N_1-1)}{O_{1,1}N_1}}\right]^T, l = 0, \ldots, O_{1,1}N_1 - 1$$

corresponding to a vertical beam and a length-$N_2$ DFT-vector $$u_m = \left[1, e^{j\frac{2\pi m}{O_{1,2}N_2}}, \ldots, e^{j\frac{2\pi m(N_2-1)}{O_{1,2}N_2}}\right]^T, m = 0, \ldots, O_{1,2}N_2 - 1$$

corresponding to a horizontal beam.

In accordance with embodiments, the communication device receives the following values from the transmitter using Radio Resource Control (RRC) layer or physical layer (L1) parameters:

$N_1$, $N_2$ and oversampling factors $O_{1,1}$ and $O_{1,2}$ for the configuration of the first codebook ($\Omega_1$).

In accordance with embodiments, the communication device uses a priori known values of $N_1$, $N_2$ and oversampling factors $O_{1,1}$ and $O_{1,2}$ for the configuration of the first codebook ($\Omega_1$).

The delay vectors $d_{u,d}^{(l)}$ may be selected from an oversampled DFT-codebook matrix $\Omega_2 = [c_0, c_1, \ldots, c_{SO_2-1}]$ of size $S \times SO_2$. The DFT-codebook matrix $\Omega_2$ contains $SO_2$ vectors, where each vector is represented by a length-$S$ DFT-vector $$c_l = \left[1, e^{j\frac{2\pi l}{O_2 S}}, \ldots, e^{j\frac{2\pi l(S-1)}{O_2 S}}\right]^T, l = 0, \ldots, O_2 S - 1.$$

Each entry in the codebook matrix is associated with a specific delay. The DFT-codebook matrix is parameterized by the oversampling factor $O_2 = 1, 2, \ldots$ In accordance with embodiments, the communication device is receives from the transmitter the higher layer (such as Radio Resource Control (RRC) layer or MAC-CE) or physical layer (L1) parameter S for the configuration of the delay DFT codebook ($\Omega_2$).

In accordance with embodiments, the communication device uses an a priori known (default) parameter S for the configuration of the delay DFT codebook ($\Omega_2$).

In accordance with embodiments, the communication device receives from the transmitter the higher layer (such as Radio Resource Control (RRC) layer or MAC-CE) or physical layer (L1) parameter oversampling factor $O_2$ for the configuration of the delay DFT codebook ($\Omega_2$).

In accordance with embodiments, the communication device uses an a priori known (default) oversampling factor for $O_2$ the configuration of the delay DFT codebook ($\Omega_2$).

The Doppler-frequency vectors $f_{p,u,d,v}^{(l)}$ may be selected from an oversampled DFT-codebook matrix $\Omega_3 = [a_0, a_1, \ldots, a_{TO_3-1}]$ of size $T \times TO_3$. The DFT-codebook matrix $\Omega_3$ contains $TO_3$ vectors, where each vector is represented by a length-T DFT-vector $$a_l = \left[1, e^{j\frac{2\pi l}{O_3 T}}, \ldots, e^{j\frac{2\pi l(T-1)}{O_3 T}}\right]^T, l = 0, \ldots, O_3 T - 1.$$

Each entry in the codebook matrix is associated with a specific Doppler-frequency. The DFT-codebook matrix is parameterized by the oversampling factor $O_3 = 1, 2, \ldots$.

In accordance with embodiments, the communication device receives from the transmitter the higher layer (such as Radio Resource Control (RRC) layer or MAC-CE) or physical layer (L1) parameter T for the configuration of the Doppler-frequency DFT codebook ($\Omega_3$).

In accordance with embodiments, the communication device uses an a priori known (default) parameter T for the configuration of the Doppler-frequency DFT codebook ($\Omega_3$).

In accordance with embodiments, the communication device receives from the transmitter the higher layer (such as Radio Resource Control (RRC) layer or MAC-CE) or physical layer (L1) parameter oversampling factor $O_3$ for the configuration of the Doppler-frequency DFT codebook ($\Omega_3$).

In accordance with embodiments, the communication device uses an a priori known (default) oversampling factor for $O_3$ the configuration of the Doppler-frequency DFT codebook ($\Omega_3$).

Note that when $O_{1,n} = 1$ no oversampling is applied with respect to the n-th dimension of the spatial DFT codebook. Similarly, when $O_2 = 1$ no oversampling is applied with respect to the delay DFT codebook $\Omega_2$, and the codebook matrix is given by a DFT matrix of size S×S. Similarly, when $O_3 = 1$ no oversampling is applied with respect to the Doppler-frequency DFT codebook $\Omega_2$, and the codebook matrix is given by a DFT matrix of size S×S.

UE-Side Selection of the Doppler-Delay-Beam Precoder W

The UE selects a preferred Doppler-delay-beam precoder matrix W based on a performance metric (see step 256 in FIG. 4).

In accordance with embodiments, the UE selects the precoder-beam matrix W that optimizes the mutual-information $I(W; \mathcal{H})$, which is a function of the Doppler-delay precoder matrix W and the multi-dimensional channel tensor $\mathcal{H}$, for each configured SB, PRB, or subcarrier.

In accordance with other embodiments, the U spatial beams, Doppler-frequencies and delays are selected stepwise. For example, for a rank-1 transmission, in a first step, the UE selects the U spatial beams that optimize the mutual information (e.g., for a rank-1 transmission):

$$\hat{b}_1^{(1)}, \ldots, \hat{b}_U^{(1)} = \arg\max I(\mathcal{H}; b_1^{(1)}, \ldots, b_U^{(1)}) (\text{for rank } 1).$$

In a second step, the UE calculates the beam formed channel tensor $\tilde{\mathcal{H}}$ of dimension $2 UN_f \times S \times T$ with the U spatial beams $\hat{b}_1^{(1)}, \ldots, \hat{b}_U^{(1)}$.

In a third step, the UE selects three-tuples of Doppler-frequency DFT-vectors, delay DFT-vectors and Doppler-delay-beam combining coefficients, where the Doppler-frequency and delay DFT-vectors are selected from the codebooks $\Omega_3$ and $\Omega_2$, respectively, such that the mutual information $I(\tilde{\mathcal{H}}; W|\hat{b}_1^{(1)}, \ldots, \hat{b}_U^{(1)})$ is optimized.

UE-Side Selection of RI for the Doppler-Delay-Beam Precoder W

In accordance with embodiments, the UE may select the rank indicator, RI, for reporting (see step 258 in FIG. 4). When RI reporting is configured at the UE, the UE reports a rank indicator (total number of layers) for the transmission. The rank indicator is selected with respect to the Doppler-delay-beam precoder matrix $W^{(l)}$ (l=1, ..., L) (see equation (1) above), and denotes the average number of layers supported by the Doppler-delay-beam precoded time-variant frequency-selective MIMO channel.

UE-Side Selection of CQI for the Doppler-Delay-Beam Precoder W

In accordance with embodiments, the UE may select the channel quality indicator, CQI, for reporting (see step 258 in FIG. 4). When CQI reporting is configured at the UE, the UE reports a preferred CQI based on a specific performance metric such as signal-to-interference and noise ratio (SINR), average bit error rate, average throughput, etc.

For example, the UE may select the CQI that optimizes the average block error rate block_error_rate($\mathcal{H} | W^{(l)}$ (l=1, ..., L)) at the UE for the selected composite Doppler-delay-beam precoder matrix $W^{(l)}$ (l=1, ..., L) (see equation (1) above) and a given multi-dimensional channel tensor $\mathcal{H}$ for the for the T time instants. The CQI value represents an "average" CQI supported by the Doppler-delay-beam precoded time-variant frequency-selective MIMO channel.

Moreover, in accordance with other embodiment, a CQI (multiple CQI reporting) for each configured SB may be reported using the selected composite Doppler-delay-beam precoder matrix $W^{(l)}$ (l=1, ..., L) (see equation (1) above) and a given multi-dimensional channel tensor IC for the T time instances.

PMI Reporting for the Doppler-Delay-Beam Precoder W

In accordance with embodiments, the UE may select the precoder matrix indicator, PMI, for reporting (see step 258 in FIG. 4). When PMI reporting is configured at the UE, the UE reports at least a two-component PMI.

The first PMI component may correspond to the selected vectors $b_u^{(l)}, d_{p,u,d}^{(l)}$ and $f_{p,u,d,v}^{(l)}$, and may be represented in the form of three-tuple' sets, where each three-tuple (u, d, v) is associated with a selected spatial beam vector $b_u^{(l)}$, a selected delay vector $d_{p,u,d}^{(l)}$, and a selected Doppler-frequency vector $f_{p,u,d,v}^{(l)}$. For example, the three-tuple' sets may be represented by $i_1 = [i_{1,1}, i_{1,2}, i_{1,3}]$ for a rank-1 transmission. Here, $i_{1,1}$ contains $\Sigma_l U^{(l)}$ indices of selected DFT-vectors for the spatial beams, $i_{1,2}$ contains $2 \Sigma_{u,l} D_u^{(l)}$ indices of selected delay-vectors, and $i_{1,3}$ contains $2 \Sigma_{u,d,l} F_{d,u}^{(l)}$ indices of selected Doppler-frequency-vectors.

Figure 10:
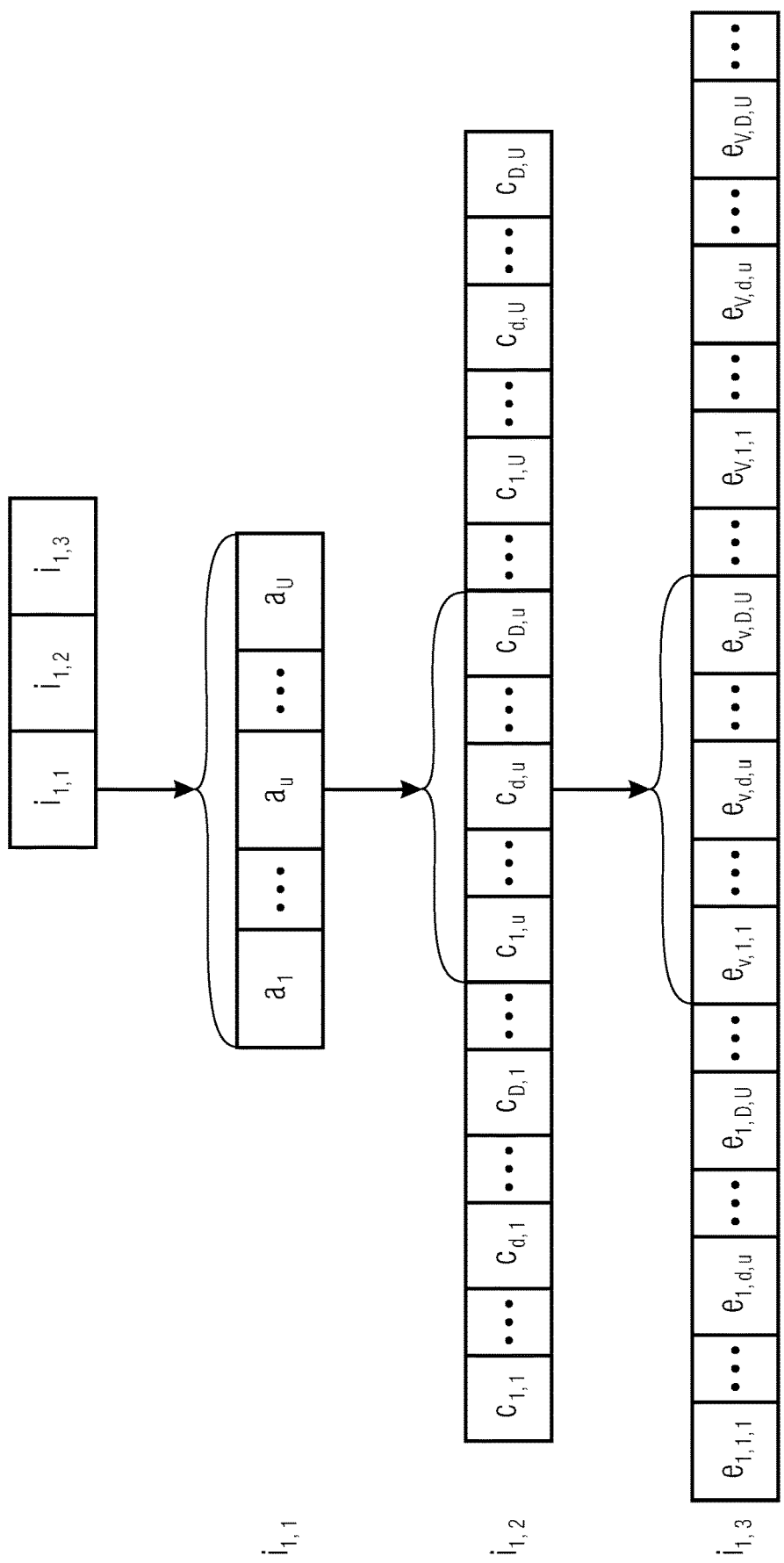
FIG. 10 illustrates feedback indices associated with a beam, delay and Doppler-frequency components for a layer-1 transmission assuming equal number of delays per beam and equal number of Doppler-frequency components per delay and beam.

FIG. 9 illustrates feedback indices associated with a beam, delay and Doppler-frequency components for a layer-1 transmission assuming equal number of delays per beam $D_u^{(l)} = D$, $\forall u$, and equal number of Doppler-frequency components per delay and beam $F_{d,u}^{(l)} = V$, $\forall d, u$. FIG. 10 shows an example for $i_1$ for a layer-1 transmission. The subset $i_{1,1}$ of $i_1$ represents the beam indices selected from the codebook $\Omega_1$ and are denoted by $a_u$, $\forall u$. The subset $i_{1,2}$ of $i_1$ represents the delay indices selected from the codebook $\Omega_2$ and are denoted by $c_{d,u}$, $\forall d, u$. The subset $i_{1,3}$ of $i_1$ represents the selected Doppler-frequency indices from the codebook $\Omega_3$ and are denoted by $e_{v,d,u}$, $\forall v, d, u$.

In accordance with embodiments, to report the 2 $\Sigma_{u,d,l}$ $F_d^{(l)}$ Doppler-delay-beam combining coefficients $\gamma_{p,u,d,v}^{(l)}$ from the UE to the gNB, the UE may quantize the coefficients using a codebook approach. The quantized combining coefficients are represented by $i_2$, the second PMI. The two PMIs are reported to the gNB.

The large-scale channel parameters such as path loss and shadow fading do not change quickly over time, and the channel variations are mainly related to small scale channel fading. This means the MIMO channel parameters of the impulse response such as path components and channel delays do not change over a longer time period, and channel variations caused by movement of the UE lead only to phase fluctuations of the MIMO channel path components. This means the spatial beams, the precoder Doppler-frequency DFT-vectors, the delay DFT-vectors as well as the Doppler-delay coefficients of the Doppler-delay-beam three-stage precoder $W^{(l)}$ remain identical for a long time period, and need to be less frequently updated.

Strongest Delay Indicator

In accordance with embodiments, the processor is configured
- to select the delay indices for the beams for calculating the Doppler-delay-beam three-stage precoder,
- to indicate the delay index corresponding to the strongest delay and
- to feedback the delay indices with the indication of the strongest delay index to the transmitter.

For example, the strongest delay may be associated with the Doppler-delay-beam combining coefficients which have the highest power over all other combining coefficients associated with the delays of the selected beams. The delay indices reported to the transmitter may be sorted so that the first index is associated with the strongest delay. The strongest delay may be used at the transmitter to optimize the scheduling decisions for the multiple users and to reduce interferences between the users when Doppler-delay-beam three-stage precoding is applied for multiuser transmissions.

Strongest Doppler-Frequency Indicator

In accordance with embodiments, the processor is configured
- to the select Doppler-frequency components for the delays and beams for calculating the Doppler-delay-beam three-stage precoder,
- to indicate the Doppler-frequency component index corresponding to the strongest Doppler-frequency component and
- to feedback the Doppler-frequency component indices with the indication of the strongest Doppler-frequency component index to the transmitter.

Similarly to the strongest delay indicator, the strongest Doppler-frequency may be associated with the Doppler-delay-beam combining coefficients which have the highest power over all other combining coefficients associated with the Doppler-frequency components of the selected delays and beams. The Doppler-frequency indices reported to the transmitter may be sorted so that the first index is associated with the strongest Doppler-frequency.

Precoder Construction at the gNB for the Doppler-Delay-Beam Precoder W

Figure 11:
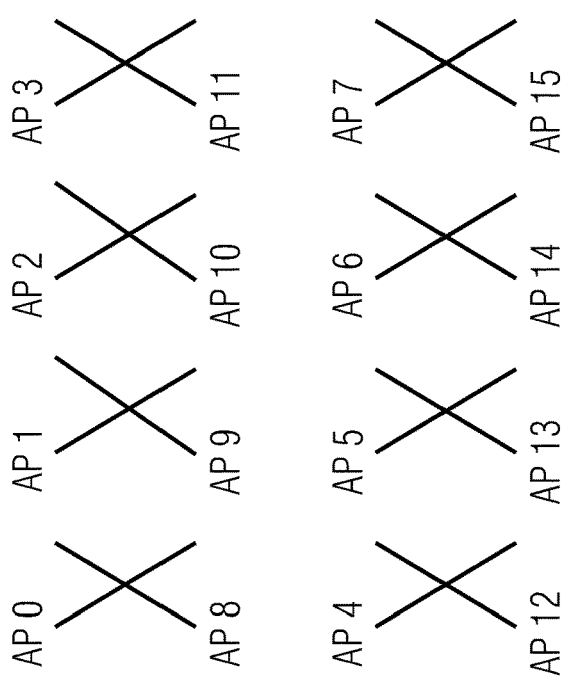
FIG. 11 illustrates a codebook based construction of the l-th layer Doppler-delay-beam three-stage precoder at the gNB and the association of the l-th layer Doppler-delay-beam three-stage precoder with the antenna ports (AP) for an example configuration $N_1$=4, $N_2$=2, P=2.

In accordance with embodiments, the gNB may use the two-component PMI feedback from the UE to construct the precoder matrix according to the codebook-based construction shown in FIG. 11, which illustrates a codebook based construction of the l-th layer precoder at the gNB and the association of the l-th layer precoder with the antenna ports (AP) for an example configuration $N_1=4$, $N_2=2$, $P=2$. The precoder matrix information is used to calculate a multi-user precoding matrix which is applied to the transmission signals to adapt the transmission parameters to the current multiuser channel conditions. The above Doppler-delay-beam composite precoder matrix definition also facilitates the prediction of precoder matrices for future time instances. In this way, the number of CSI reports may be drastically reduced and feedback overhead is saved.

To facilitate the Doppler-delay-beam precoder matrix prediction for QT future time instants, the Doppler-frequency DFT-vectors $f_{p,u,d,v}^{(l)}$ may be cyclically extended to length-QT vectors $t_{p,u,d,v}^{(l)}$. The cyclic extension is defined by $$t_{p,u,d,v}^{(l)} = \left[1, e^{j\frac{2\pi k}{O_3}}, \ldots, e^{j\frac{2\pi k(Q-1)}{O_3}}\right]^T \otimes f_{p,u,d,v}^{(l)}, \forall u, d, v, p, l,$$

where $$f_{p,u,d,v}^{(l)} = \left[1, e^{j\frac{2\pi k}{O_3 T}}, \ldots, e^{j\frac{2\pi k(T-1)}{O_3 T}}\right]^T \in \Omega_3.$$

The predicted precoder matrix for the l-th layer and q-th (q=1, ..., QT) time instant is given by $$\hat{W}^{(l)}(q) = P^{(l)} \begin{bmatrix} \sum_{u=0}^{U^{(l)}-1} \sum_{d=0}^{D_u^{(l)}-1} \sum_{v=0}^{F_{d,u}^{(l)}-1} \gamma_{1,u,d,v}^{(l)} t_{1,u,d,v}^{(l)}(q) \otimes d_{1,u,d}^{(l)T} \otimes b_u^{(l)} \\ \sum_{u=0}^{U^{(l)}-1} \sum_{d=0}^{D_u^{(l)}-1} \sum_{v=0}^{F_{d,u}^{(l)}-1} \gamma_{2,u,d,v}^{(l)} t_{2,u,d,v}^{(l)}(q) \otimes d_{2,u,d}^{(l)T} \otimes b_u^{(l)} \end{bmatrix}$$

where $t_{p,u,d,v}^{(l)}(q)$ is the q-th entry of $t_{p,u,d,v}^{(l)}$.

The predicted precoding matrices may be used in predictive multi-user scheduling algorithms that attempt to optimize, for example, the throughput for all users by using the knowledge of current and future precoder matrices of the users.

Codebook for Doppler-Delay-Beam Combining Coefficients

In accordance with embodiments the UE may be configured to quantize the complex Doppler-delay coefficients $\gamma_{p,u,d,v}^{(l)}$ with a codebook approach. Each coefficient is represented by $$\gamma_{p,u,d,v}^{(l)} = \hat{\gamma}_{p,u,d,v}^{(l)} \phi_{p,u,d,v}^{(l)},$$

where
- $\hat{\gamma}_{p,u,d,v}^{(l)}$ is a polarization-, beam-, delay- and Doppler-frequency-dependent amplitude coefficient which is quantized with N bits; and
- $\phi_{p,u,d,v}^{(l)}$ represents a phase which is represented by a BPSK, or QPSK, or 8PSK, and any higher-order constellation.

In accordance with other embodiments, each coefficient may be represented by its real and imaginary part as $$\gamma_{p,u,d,v}^{(l)} = \text{Re}\{\hat{\gamma}_{p,u,d,v}^{(l)}\} + j\text{Imag}\{\hat{\gamma}_{p,u,d,v}^{(l)}\},$$

where $\text{Re}\{\hat{\gamma}_{p,u,d,v}^{(l)}\}$ and $\text{Imag}\{\hat{\gamma}_{p,u,d,v}^{(l)}\}$ are quantized each with N bits;

Precoder Application at gNB for the Doppler-Delay-Beam Precoder W

In accordance with embodiments the UE may assume that, for CQI, and/or RI, and/or PMI calculation, the gNB applies the Doppler-delay-beam precoder calculated with respect to equation (1) above, to the PDSCH signals on antenna ports {1000,1008+v−1} for v=L layers as $$\begin{bmatrix} y^{(t,3000)}(i) \\ \vdots \\ y^{(t,3000+P-1)}(i) \end{bmatrix} = W(t, i) \begin{bmatrix} x^{(t,0)}(i) \\ \vdots \\ x^{(t,v-1)}(i) \end{bmatrix},$$

where
$[x^{(t,0)}(i), \ldots, x^{(t,v-1)}(i)]^T$ is a symbol vector of PDSCH symbols from the layer mapping defined in Subclause 7.3.1.4 of TS 38.211 [1], P∈{1, 2, 4, 8, 12, 16, 24, 32},
$x^{(t,u)}(i)$ is the i-th symbol of layer u at time instant t,
$y^{(t,u)}(i)$ is the precoded symbol transmitted on antenna port u at time instant t, and
$W(t, i)=[W^{(1)}(t, i), \ldots, W^{(L)}(t, i)]$ is the predicted precoder matrix with WM (t, i) being the t-th block and i-th column of WW.

The corresponding PDSCH signals $[y^{(t,3000)}(i) \ldots y^{(t,3000+P-1)}(i)]$ transmitted on antenna ports [3000,3000+P−1] have a ratio of, energy per resource element, EPRE, to CSI-RS EPRE equal to the ratio given in Subclause 4.1 of TS 38.214 [2].

Doppler-Beam Dual-Stage Composite Precoder

Further embodiments of the present invention provides for an extension of the existing CSI-RS to track the channel time-evolution, e.g., for a channel having channel conditions which change fast, for example due to a high movement of the UE in a multi-path channel environment, and having a short channel coherence time. The present invention is advantageous as by tracking the channel time-evolution, even for channels with varying channel conditions, the CSI needs not to be updated less frequently, e.g., with a rate similar for channels with a long channel coherence time, thereby reducing or avoiding a feedback overhead. For example, the large-scale channel parameters such as path loss and shadow fading may not change quickly over time, even in a channel having a short channel coherence time, so that the channel variations are mainly related to small scale channel fading. This means the MIMO channel parameters of the impulse response such as path components and channel delays do not change over a longer time period, and channel variations caused by movement of the UE lead only to phase fluctuations of the MIMO channel path components. This means the spatial beams and the precoder Doppler-frequency DFT-vectors of a Doppler-beam dual-stage precoder remain identical or substantially identical for a long time period, and need to be less frequently updated.

To address the above-mentioned issues in conventional approaches, according to which current CSI feedback schemes are not sufficient, embodiments of the present invention provide a CSI-RS design allowing track time-evolution of CSI or a new implicit CSI reporting scheme that takes into account the channel time-evolution and provides information about current and future RI, PMI and CQI in a compressed form to reduce the feedback rate.

Figure 12:
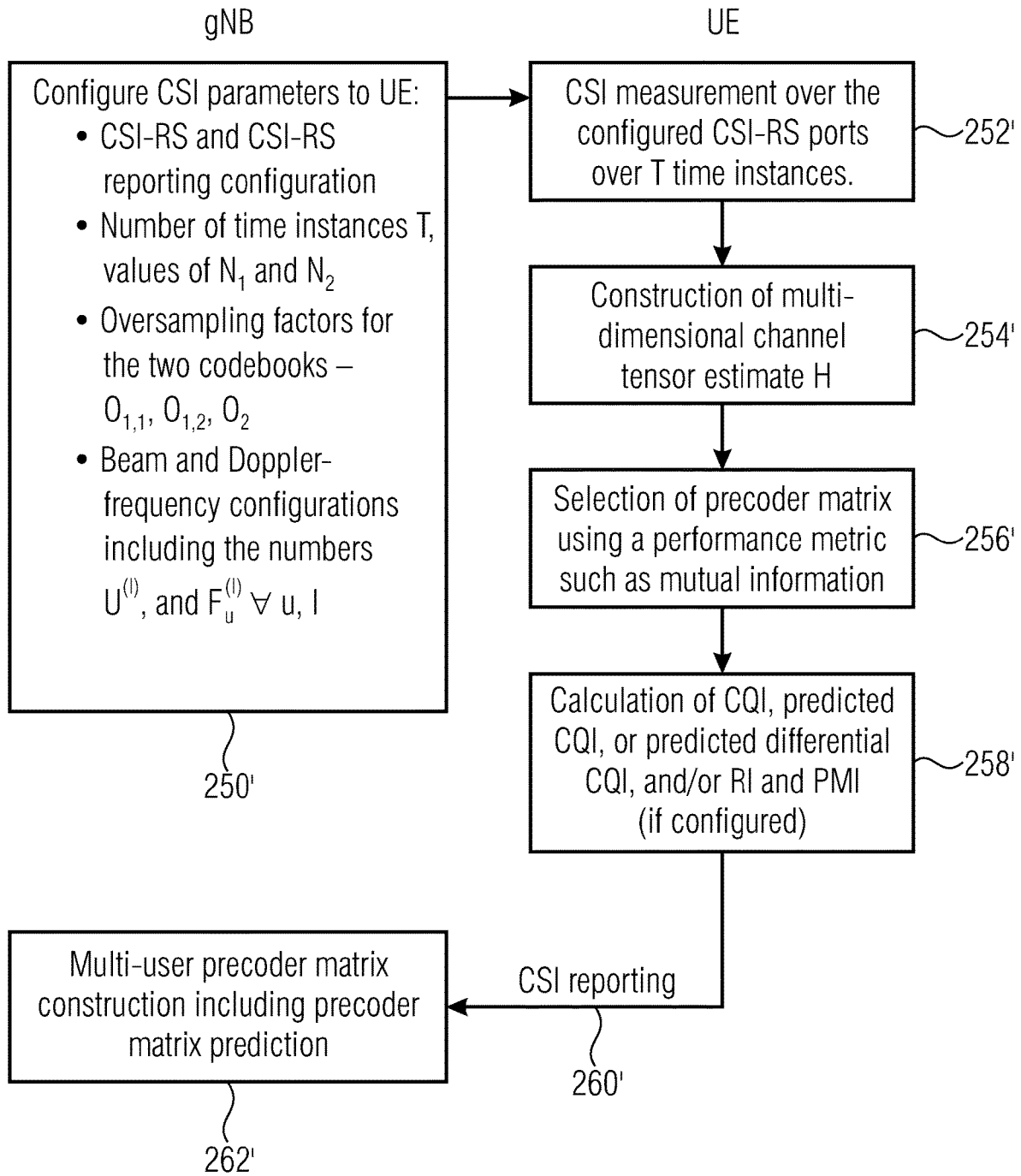
FIG. 12 is a flow diagram illustrating the configuration of CSI parameters, the CSI measurement, the composite precoder matrix calculation and the CSI reporting in accordance with an embodiment of the present invention employing a Doppler-beam dual-stage precoder.

FIG. 12 is a flow diagram illustrating the configuration of CSI parameters, the CSI measurement, the composite precoder matrix calculation and the CSI reporting in accordance with an embodiment of the present invention. The UE may be configured with a CSI-RS resource configuration via a higher layer (such as RRC) containing information about the number of assigned CSI-RS ports used for the transmission to the UE. The number of CSI-RS ports, M, is equal to PN$_1$N$_2$ (where P=1 for co-polarized array antennas, and P=2 for dual-polarized array antennas at the base station), and where N$_1$ and N$_2$ are the number of antenna ports of the first and second spatial dimensions of the gNB array, respectively. The UE is configured with a CSI reporting configuration via a higher layer and/or a physical layer (via DCI) that also contains information for an evaluation of the CSI feedback parameters, such as CQI, RI and PMI, at the UE. The base station or gNB signals via a higher layer or a physical layer at least four integer values for (N$_1$, N$_2$, P), and T, where (N$_1$, N$_2$, P) are used to configure a first codebook, and T is used to configure a second codebook for the PMI decomposition/calculation at the UE. The CQI, RI and PMI selection is performed at the UE according to the subsequently described embodiments. Thus, the first codebook $\Omega_1$ includes the one or more transmit-side spatial beam components of the composite Doppler-beam dual-stage precoder, and the second codebook $\Omega_2$ includes the one or more Doppler-frequency components of the composite Doppler-beam dual-stage precoder.

In accordance with embodiments, the first and second codebooks $\Omega_1$, $\Omega_2$ may include oversampled DFT-codebook matrices. For example, the first codebook $\Omega_1$ may comprise a first oversampled DFT-codebook matrix of size N$_1$N$_2$×O$_{1,1}$N$_1$O$_{1,2}$N$_2$ from which the vectors $b_u^{(l)}$ are selected, where N$_1$ and N$_2$ refer to the first and second numbers of antenna ports, respectively, and O$_{1,1}$ and O$_{1,2}$ refer to the oversampling factors with O$_{1,1}$ ∈{1, 2, 3, ...} and O$_{1,2}$ ∈{1, 2, 3, ...}. The second codebook $\Omega_2$ may comprise a second oversampled DFT-codebook matrix of size T×TO$_2$ from which the Doppler-frequency vectors $f_{p,s,u,v}^{(l)}$ are selected, where T refers to the number of time instances during the observation time, and O$_2$ ∈{1, 2, 3, ...} refers to the oversampling factor of the codebook. The base station or gNB may signal via a higher layer or a physical layer, in addition to the integer values for (N$_1$, N$_2$, P), and T, the oversampling factors O$_{1,1}$, O$_{1,2}$ and O$_2$. Note that when O$_{1,n}$=1 no oversampling is applied with respect to the n-th dimension of the spatial DFT codebook. Similarly, when O$_2$=1 no oversampling is applied with respect to the Doppler-frequency DFT codebook $\Omega_2$, and the codebook matrix is given by a DFT matrix of size T×T.

At a step 250', the gNB or base station sends a CSI-RS configuration and CSI report configuration to the UE. In accordance with embodiments, the CSI-RS configuration may include a CSI-RS resource(s) configuration with respect to sub-clause 7.4.1.5 in TS 38.211 [1] and with sub-clause 6.3.2 in TS.38.331 [4]. Further, an additional higher layer parameter configuration referred to as CSI-RS-BurstDuration is included.

The CSI-RS-BurstDuration is included to provide a CSI-RS design allowing to track the time-evolution of the channel. In accordance with embodiments, a UE is configured with a CSI-RS resource set(s) configuration with the higher layer parameter CSI-RS-BurstDuration, in addition to the configurations from clause 7.4.1.5 in TS 38.211 [2] and clause 6.3.2 in TS.38.331 [4] mentioned above, to track the time-evolution of CSI. The time-domain-repetition of the CSI-RS, in terms of the number of consecutive slots the CSI-RS is repeated in, is provided by the higher layer parameter CSI-RS-BurstDuration. The possible values of CSI-RS-BurstDuration for the NR numerology μ are $2^\mu \cdot X_B$ slots, where X$_B$ ∈{0,1,2, ...,maxNumBurstSlots−1}. The NR numerology μ=0,1,2,3,4 ... defines, e.g., a subcarrier spacing of $2^\mu \cdot 15$ kHz in accordance with the NR standard.

As has been described above with reference to FIG. 5 and to FIG. 6, for example, when the value of X$_B$=0 or the parameter CSI-RS-BurstDuration is not configured, there is no repetition of the CSI-RS over multiple slots. The burst duration scales with the numerology to keep up with the decrease in the slot sizes. Using the same logic used for periodicity of CSI-RS. FIG. 5(a) illustrates a CSI-RS with a periodicity of 10 slots and no repetition (CSI-RS-BurstDuration not configured or CSI-RS-BurstDuration=0), and FIG. 5(b) illustrates a CSI-RS with a periodicity of 10 slots and repetition of 4 slots (CSI-RS-BurstDuration=4). FIG. 6 illustrates a CSI-RS-BurstDuration information element in accordance with an embodiment. The information element of the new RRC parameter CSI-RS-BurstDuration is as follows: the value next to the text burstSlots indicates the value of $X_B$, which for a given New Radio numerology μ (see [1]) provides the burst duration $2^μ \cdot X_B$ of the CSI-RS, i.e., the number of consecutive slots of CSI-RS repetition.

The burst-CSI-RS across multiple consecutive slots enables the extraction of time-evolution information of the CSI and for reporting of the precoder matrix, e.g. as a part of the PMI, in a way as described in more detail below. In other words, the UE may calculate the CQI, RI and PMI according to the embodiments described below with a repetition of the CSI-RS resource(s) over multiple consecutive slots, and report them accordingly.

Returning to the flow diagram of FIG. 12, the CSI report configuration provided by the eNB may be a CSI report configuration with respect to sub-clause 5.2.1.1 in TS 38.214 [2], and the following higher layer parameters: ReportQuantity listed in TS 38.331 [1] with the following additional parameters:

cri-RI-PMIDD-CQI
cri-RI-LI-PMIDD-CQI
cri-RI-PMIDD

The CRI (CSI-RS resource indicator), RI (rank indicator) and LI (layer indicator) mentioned in the reporting quantities are reported, i.e., the possible values reported and the format for reporting CRI, RI and LI are identical as the ones in TS 38.214 [2]. The PMI quantities mentioned in ReportQuantity are defined as PMIDD=PMI values including the Doppler-frequency component configurations as described in the embodiments below.

The CQI value, predicted CQI value, etc. (if configured) as mentioned in the reporting quantity may be calculated as explained in subsequently described embodiments over multiple time slots. The values of the CQI reported are identical as mentioned in TS 38.214 [2].

In addition, the following parameters may be signaled by the eNB to the user equipment via physical layer or higher layer (RRC) parameters:

values of T for the configuration of the Doppler-frequency component codebook $\Omega_2$ is represented by the parameter CodebookConfig-T. The oversampling factor $O_2$ of the codebook $\Omega_2$ is represented by CodebookConfig-O2.

parameters $N_1$, $N_2$ and oversampling factors $O_{1,1}$ and $O_{1,2}$ for the configuration of the first codebook $\Omega_1$, as described below. The parameters $N_1$ and $N_2$ are represented by CodebookConfig-N1 and CodebookConfig-N2, respectively. The oversampling factors $O_{1,1}$ and $O_{1,2}$ are represented by CodebookConfig-O1_1 and CodebookConfig-O1_2, respectively.

In response to the report configuration, the UE
performs, at step 252', measurements on downlink CSI-RS over T consecutive time-instants/slots,
constructs, at step 254', the time-variant frequency-selective MIMO channel tensor $\mathcal{H}$;

selects, at step 256', the Doppler-beam composite dual-stage precoder matrix for each layer (PMI selection) with respect to a specific performance metric as explained in more detail below;
calculates, at step 258', a CQI value, a predicted CQI value, or predicted differential CQI values (if configured) for a future time instant or for a set of future time instants using the selected Doppler-delay-beam composite three-stage precoder matrix and at least one of the MIMO channel tensor $\mathcal{H}$ and a prediction of the MIMO channel tensor for future time instants, and, optionally, selects a RI value (if configured) using the selected Doppler-delay-beam composite three-stage precoder matrix and the MIMO channel tensor $\mathcal{H}$, and
sends, at step 260', the CSI report to the gNB.

The gNB, at step 262', reconstructs the Doppler-beam composite dual-stage precoder matrix (PMI report) to facilitate multi-user precoding matrix calculation and precoder matrix prediction for future time instants.

Reduction of Codebook Size

In accordance with an aspect of the present invention, the one or more Doppler-frequency components of the composite Doppler-beam dual-stage precoder are defined by one or more sub-matrices of a DFT matrix or by one or more sub-matrices of an oversampled DFT matrix. In accordance with embodiments employing the above mentioned two codebooks $\Omega_1$ and $\Omega_2$, the entries of the second codebook matrix $\Omega_2$ may be given by a sub-matrix or multiple sub-matrices of a T×T DFT-matrix or a T×TO$_2$ oversampled DFT matrix, where T and O$_2$ refer to the number of time instances during the observation time and the oversampling factor of the codebook, respectively. This aspect is based on the finding that the Doppler-frequency components, typically, have only a limited value range and that, due to this limited range, not all entries of the codebook matrix need to be used at the receiver for constructing the dual-stage precoder. In accordance with the inventive approach, the size of the codebook and the complexity of selecting the codebook entries (Doppler-frequency components) for constructing the precoder are greatly reduced.

The value range may depend on the Doppler-frequency spread of the 2U beam-formed channels obtained when combining the beam-formed vectors $b_u^{(l)}$, =u with the MIMO channel impulse responses. Therefore, the entries of the codebook matrix $\Omega_2$ used at the receiver for constructing the precoder may be given by a sub-matrix or may contain multiple submatrices of a T×T DFT-matrix or T×T $O_2$ oversampled DFT matrix. For example, the codebook $\Omega_2$ may be defined by the first N columns of a DFT matrix or oversampled DFT matrix D=[$a_0$, $a_1$, . . . , $a_{TO_2-1}$], where $$a_i = \begin{bmatrix} 1 & e^{\frac{-j2\pi i}{O_2 T}} & \ldots & e^{\frac{-j2\pi i(T-1)}{O_2 T}} \end{bmatrix}^T \in C^{T \times 1},$$

such that $\Omega_2=[a_0, a_1, \ldots, a_{N-1}]$. The DFT codebook matrix $\Omega_2$ may be defined by the first $N_1$ columns and the last $N_2$ columns of a DFT matrix or oversampled DFT matrix such that $\Omega_2=[a_0, \ldots, a_{N_1-1}, a_{TO_2-N_2}, \ldots, a_{TO_2-1}]$. Also, the codebook matrix $\Omega_2$ may be defined by the $i_2$ columns of a DFT matrix or oversampled DFT matrix such that $\Omega_2=[a_{i_1}, a_{i_1+1}, \ldots a_{i_2}]$. The codebook matrix may also contain multiple submatrices of a DFT matrix or oversampled DFT matrix. For the case of two DFT submatrices defined by $i_2$ columns and $i_3$:$i_4$ columns, the codebook matrix is given by $\Omega_2=[a_{i_1}, a_{i_1+1}, \ldots, a_{i_2}, a_{i_3}, a_{i_3+1}, \ldots, a_{i_4}]$.

In accordance with embodiments, the communication device receives from the transmitter the higher layer (such as Radio Resource Control (RRC) layer or MAC-CE) or physical layer (L1) parameters indicating a plurality of columns of a DFT or oversampled DFT matrix used for the configuration of the DFT codebook $\Omega_2$.

In accordance with embodiments, the communication device uses a priori known (default) parameters indicating a plurality of columns of a DFT or oversampled DFT matrix used for the configuration of the DFT codebook $\Omega_2$.

Feedback of Non-Selected Doppler-Frequency Indices for Constructing the Precoder Matrix In accordance with embodiments, the receiver is configured to select $F_u^{(l)}$ Doppler-frequency components for constructing the Doppler-beam dual-stage precoder matrix for the l-th layer from the codebook matrix $\Omega_2$ containing X entries/columns, and to feedback the $X-F_u^{(l)}$ non-selected Doppler-frequency component indices from the codebook matrix $\Omega_2$ to the transmitter. For example, when the codebook matrix $\Omega_2=[a_{i_1}, a_{i_1+1}, \ldots, a_{i_1+3}, a_{i_1+4}]$ contains five entries/columns and the receiver is configured to select three Doppler-frequency components for first beam and l-th layer for constructing the Doppler-beam dual-stage precoder, and it selects the vectors $f_{1,0,0}^{(l)}==a_{i_1}, f_{1,0,1}^{(l)}==f_{1,0,2}^{(l)}=a_{i_1+2}$, the receiver feedbacks the indices $i_1+3$ and $i_1+4$ (or relative indices 3 and 4) to the transmitter.

The number of Doppler-frequency components $F_u^{(l)}$ may be identical for a subset of beams, such that $F_u^{(l)}=F^{(l)}$ (for the case of all beams).

CQI/PMI Reporting Using a Composite Doppler-Beam Dual-Stage Precoder

In accordance with embodiments, once the UE is configured with a CSI-RS resource and a CSI reporting configuration (see step 250' in FIG. 12), the UE estimates an un-quantized explicit CSI using measurements on the downlink CSI-RS on PRBs, where the CSI-RS is configured over T consecutive time instants/slots in the frequency domain (see step 252' in FIG. 12).

In accordance with embodiments, the explicit CSI is represented by a three-dimensional channel tensor (a three-dimensional array) $H \in \mathbb{C}^{N \times S \times T}$ of dimension N×S×T with S being the number of configured sub-bands/PRBs, or subcarriers (see FIG. 8 above), and $N=N_r \cdot N_1 \cdot N_2 \cdot P$, where $N_r$ is the number of UE receive antennas. Here, the first, second and third dimension of the channel tensor represent the space, frequency, and time component of the time-variant frequency-selective MIMO channel, respectively.

In accordance with other embodiments, the explicit CSI is represented by a four-dimensional channel tensor $H \in \mathbb{C}^{N_r \times N_t \times S \times T}$ of dimension $N_r \times N_t \times S \times T$, where $N_t = N_1 \cdot N_2 \cdot P$. Here, the first and second dimension of H represent the receive-side and transmit-side space components of the time-variant frequency-selective MIMO channel, respectively. The third and fourth dimension of H represent the frequency and time component of the MIMO channel, respectively.

In a next step, the UE calculates a CQI using the explicit CSI in the form of the channel tensor H and a composite Doppler-beam dual-stage precoder constructed using only two separate codebooks:

a first codebook $\Omega_1$ for the transmit-side space (beams) components of the Doppler-beam precoder, and a second codebook $\Omega_2$ for the Doppler-frequency components of the Doppler-beam precoder.

In accordance with embodiments, instead of using two separate codebooks, the above mentioned beam and Doppler-frequency components may be included into a single or common codebook.

Assuming a rank-L transmission, the composite Doppler-beam dual-stage precoder $P^{(l)}$ of dimension $N_t \cdot T \times S$ for the l-th layer (l=1, ..., L) and s-th subband, subcarrier or PRB (s=1, ..., S) is represented by a (column-wise) Kronecker-product (assuming a dual-polarized transmit antenna array at the gNB) as $$P^{(l)}(s) = P^{(l)} \begin{bmatrix} \sum_{u=0}^{U^{(l)}-1} \sum_{v=0}^{F_{d,u}^{(l)}-1} \gamma_{1,s,u,v}^{(l)} \ f_{1,u,v}^{(l)} \otimes b_u^{(l)} \\ \sum_{u=0}^{U^{(l)}-1} \sum_{v=0}^{F_{d,u}^{(l)}-1} \gamma_{2,s,u,v}^{(l)} \ f_{2,u,v}^{(l)} \otimes b_u^{(l)} \end{bmatrix}, \quad (2)$$

where $U^{(l)}$ is the number of beams per polarization for the l-th layer, $F_{d,u}^{(l)}$ is the number of Doppler-frequency components for the l-th layer, u-th beam, $f_{p,u,v}^{(l)}$ is the v-th Doppler-frequency vector of size T×1 associated with the l-th layer, u-th spatial beam, and the p-th (p=1,2) polarization of the precoder;

$b_u^{(l)}$ is the u-th spatial beam associated with the l-th layer;

$\gamma_{p,s,u,v}^{(l)}$ is the Doppler-beam combining coefficient associated with the l-th layer, u-th spatial beam, v-th Doppler-frequency, s-th subband, subcarrier or PRB, and the p-th polarization of the precoder, and $P^{(l)}$ is a scalar normalization factor to ensure a certain total transmission power.

In accordance with embodiments, the Doppler-beam dual-stage precoder is represented in matrix-vector notation:

$$P^{(l)}(s) = P^{(1,l)} p^{(2,l)}(s) \in \mathbb{C}^{N_t \cdot T \times 1},$$

where $$P^{(1,l)} = \begin{bmatrix} X_1 & 0 \\ 0 & X_2 \end{bmatrix} \text{ with}$$

$$X_1 = \begin{bmatrix} f_{1,0,0}^{(l)} \otimes b_0^{(l)} \ \ldots \ f_{1,u,v}^{(l)} \otimes b_u^{(l)} \ \ldots \ f_{1,U^{(l)}-1,F_u^{(l)}-1}^{(l)} \otimes b_{U^{(l)}-1}^{(l)} \end{bmatrix},$$

$$X_2 = \begin{bmatrix} f_{2,0,0}^{(l)} \otimes b_0^{(l)} \ \ldots \ f_{2,u,v}^{(l)} \otimes b_u^{(l)} \ \ldots \ f_{2,U^{(l)}-1,F_u^{(l)}-1}^{(l)} \otimes b_{U^{(l)}-1}^{(l)} \end{bmatrix},$$

and $p^{(2,l)}(s)$ contains the complex Doppler-beam combining coefficients, $$p^{(2,l)}(s) = \begin{bmatrix} \gamma_{1,s,0,0}^{(l)} \ \ldots \ \gamma_{1,s,u,v}^{(l)} \ \ldots \ \gamma_{1,s,U^{(l)}-1,F_u^{(l)}-1}^{(l)} \ \gamma_{2,s,0,0}^{(l)} \ \ldots \ \gamma_{2,s,u,v}^{(l)} \ \ldots \ \gamma_{2,s,U^{(l)}-1,F_u^{(l)}-1}^{(l)} \end{bmatrix}^T.$$

In accordance with embodiments, the values for the number of beams and Doppler-frequency components ($U^{(l)}$, $F_u^{(l)}$) are configured via a higher layer (e.g., RRC, or MAC) signaling or as a part of the DCI (physical layer signaling)

in the downlink grant from the gNB to the UE. In accordance with another embodiments, the UE reports the preferred values of ($U^{(l)}$, $F_u^{(l)}$) as a part of the CSI report. In accordance with other embodiments, the values of ($U^{(l)}$, $F_u^{(l)}$) are known a-priori by the UE.

Selection of Spatial Beams

In accordance with embodiments, the number of spatial beams $U^{(l)}$ and the selected beams may depend on the transmission layer. In one method, a subset of the selected spatial beams $b_u^{(l)}$ may be identical for a subset of the layers. For example, for a 4-layer transmission with $U^{(1)}=4$ beams per polarization for the first layer, $U^{(2)}=4$ beams per polarization for the second layer, $U^{(3)}=2$ beams per polarization for the third layer and $U^{(4)}=2$ beams per polarization for the fourth layer, the first two spatial beams of the first layer and second layer are identical ($b_1^{(1)}=b_1^{(2)}$, $b_2^{(1)}=b_2^{(2)}$) and the remaining spatial beams of the first two layers and of the third and fourth layers are different ($b_3^{(1)} \neq b_3^{(2)}$, $b_4^{(1)} \neq b_4^{(2)}$, $b_1^{(3)} \neq b_1^{(4)}$, $b_2^{(3)} \neq b_2^{(4)}$). In another method, the number of beams is identical for a subset of layers. For example, for a 4-layer transmission, the number of beams of the first layer is identical with the number of beams of the second layer $U^{(1)}=U^{(2)}$ and different for the two remaining layers ($U^{(1)} \neq U^{(3)} \neq U^{(4)}$).

In accordance with embodiments, the number of spatial beams and the beam indices may be identical for all layers and do not depend on the transmission layer index.

Selection of Doppler-Frequency Components

In accordance with embodiments, the Doppler-frequency components may depend on the beam and transmission layer. In one method, a subset of the Doppler-frequency components associated with a subset of the spatial beams of a transmission layer may be identical. For example, for a transmission using 4 beams for the l-th layer, some of the Doppler-frequency components of beam 1 and beam 2 are identical ($f_{1,1,1}^{(l)}=f_{1,2,1}^{(l)}$, $f_{1,1,2}^{(l)}=f_{1,2,2}^{(l)}$) and the remaining Doppler-frequency components for the first two beams ($f_{1,1,3}^{(l)} \neq f_{1,2,3}^{(l)}$, $f_{1,1,4}^{(l)} \neq f_{1,2,4}^{(l)}$) and the Doppler-frequency components of the third and fourth beam are different. In a further method, the number of Doppler-frequency components for a subset of the beams of a transmission layer may be identical. For example, the number of Doppler-frequency components for the first beam is identical with the number of Doppler-frequency components for the second beam ($F_1^{(l)}=F_2^{(l)}$). In a further method, a subset of the Doppler-frequency components may be identical for a subset of the spatial beams and transmission layers. For example, the two Doppler-frequency components associated with the first beam and second beam of the first layer may be identical with the two Doppler-frequency components associated with the first beam and second beam of the second layer ($f_{1,1,1}^{(1)}=f_{1,1,1}^{(2)}$, $f_{1,1,2}^{(1)}=f_{1,1,2}^{(2)}$, $f_{1,2,1}^{(1)}=f_{1,2,1}^{(2)}$, $f_{1,2,2}^{(1)}=f_{1,2,2}^{(2)}$) Other examples of combinations of number of Doppler-frequency components and Doppler-frequency components per beam and layer are not precluded.

In accordance with embodiments, the number of Doppler-frequency components and the Doppler-frequency components per beam may be identical for a transmission layer, so that all beams of a transmission layer are associated with the same Doppler-frequency components.

DFT-Codebook Matrix Structure for $\Omega_1$ and $\Omega_2$ of the Doppler-Beam Precoder Embodiments for implementing the above mentioned codebooks are now described.

In accordance with embodiments, the vectors (spatial beams) $b_u^{(l)}$ are selected from an oversampled DFT-codebook matrix $\Omega_1$ of size $N_1 N_2 \times O_{1,1} N_1 O_{1,2} N_2$. The DFT-codebook matrix is parameterized by the two oversampling factors $O_{1,1} \in \{1, 2, 3, \dots \}$ and $O_{1,2} \in \{1, 2, 3, \dots \}$. The DFT-codebook matrix contains a set of vectors, where each vector is represented by a Kronecker product of a length-$N_1$ DFT-vector $$v_l = \left[1, e^{j\frac{2\pi l}{O_{1,1} N_1}}, \dots, e^{j\frac{2\pi l(N_1-1)}{O_{1,1} N_1}}\right]^T, l = 0, \dots, O_{1,1} N_1 - 1$$

corresponding to a vertical beam and a length-$N_2$ DFT-vector $$u_m = \left[1, e^{j\frac{2\pi m}{O_{1,2} N_2}}, \dots, e^{j\frac{2\pi m(N_2-1)}{O_{1,2} N_2}}\right]^T, m = 0, \dots, O_{1,2} N_2 - 1$$

corresponding to a horizontal beam.

The Doppler-frequency vectors $f_{p,u,v}^{(l)}$ may be selected from an non-oversampled or oversampled DFT-codebook matrix $\Omega_2$. Each entry in the codebook matrix is associated with a specific Doppler-frequency. The DFT-codebook matrix may be parameterized by the oversampling factor $O_2 \in \{1,2,3, \dots \}$.

In accordance with embodiments, the codebook $\Omega_2$ may be defined by one or more sub-matrices of a T×T DFT-matrix or a T×$TO_2$ oversampled DFT matrix, where T and $O_2$ refer to the number of time instances during the observation time and the oversampling factor of the codebook, respectively.

In accordance with embodiments, the communication device receives the following values from the transmitter using higher layer (such as Radio Resource Control (RRC) layer or MAC-CE) or physical layer (L1) parameters:
  parameters $N_1$, $N_2$ and oversampling factors $O_{1,1}$ and $O_{1,2}$ for the configuration of the first spatial codebook ($\Omega_1$), and
  value of T for the configuration of the second Doppler-frequency component codebook ($\Omega_2$).

In accordance with embodiments, the communication device uses a priori known values of $N_1$, $N_2$ and oversampling factors $O_{1,1}$ and $O_{1,2}$ for the configuration of the first codebook ($\Omega_1$).

In accordance with embodiments, the communication device uses an a priori known (default) parameter T for the configuration of the Doppler-frequency DFT codebook ($\Omega_2$).

In accordance with other embodiments, the communication device receives from the transmitter the higher layer (such as Radio Resource Control (RRC) layer or MAC-CE) or physical layer (L1) parameter oversampling factor $O_2$ for the configuration of the Doppler-frequency DFT codebook ($\Omega_2$).

In accordance with embodiments, the communication device uses an a priori known (default) oversampling factor for $O_2$ the configuration of the Doppler-frequency DFT codebook ($\Omega_2$).

UE-Side Selection of the Doppler-Beam Precoder P

In accordance with embodiments, the UE selects a preferred Doppler-beam precoder matrix P based on a performance metric (see step 256' in FIG. 12).

In accordance with embodiments, the UE selects the precoder matrix P that optimizes the mutual-information I(P; H), which is a function of the Doppler-beam precoder matrix P and the multi-dimensional channel tensor H, for each configured SB, PRB, or subcarrier.

In accordance with other embodiments, the U spatial beams and Doppler-frequencies are selected step-wise. For example, for a rank-1 transmission, in a first step, the UE selects the U spatial beams that optimize the mutual information:

$$\hat{b}_1^{(1)}, \ldots, \hat{b}_U^{(1)} = \operatorname{argmax} I(H; b_1^{(1)}, \ldots, b_U^{(1)}) \text{(for rank 1).}$$

In a second step, the UE calculates the beam formed channel tensor $\hat{H}$ of dimension $2U\ N_f \times S \times T$ with the U spatial beams $\hat{b}_1^{(1)}, \ldots, \hat{b}_U^{(1)}$.

In a third step, the UE selects three-tuples of Doppler-frequency DFT-vectors and Doppler-beam combining coefficients, where the Doppler-frequency are selected from the codebook $\Omega_2$, such that the mutual information $I(\hat{H}; P|\hat{b}_1^{(1)}, \ldots, \hat{b}_U^{(1)})$ is optimized.

UE-Side Selection of RI for the Doppler-Beam Precoder P

In accordance with embodiments, the UE may select the rank indicator, RI, for reporting (see step 258' in FIG. 12). When RI reporting is configured at the UE, the UE reports a rank indicator (total number of layers) for the transmission. The rank indicator is selected with respect to the Doppler-beam precoder matrix $P^{(l)}$ (l=1, . . . , L) (see equation (2) above), and denotes the average number of layers supported by the Doppler-beam precoded time-variant frequency-selective MIMO channel.

UE-Side Selection of CQI for the Doppler-Beam Precoder P

In accordance with embodiments, the UE may select the channel quality indicator, CQI, for reporting (see step' 258 in FIG. 12). When CQI reporting is configured at the UE, the UE reports a preferred CQI based on a specific performance metric such as signal-to-interference and noise ratio (SINR), average bit error rate, average throughput, etc.

For example, the UE may select the CQI that optimizes the average block error rate block_error_rate $(H|P^{(l)}(l=1, \ldots, L))$ at the UE for the selected composite Doppler-beam precoder matrix $P^{(l)}$ (l=1, . . . , L) (see equation (2) above) and a given multi-dimensional channel tensor H for the for the T time instants. The CQI value represents an "average" CQI supported by the Doppler-beam precoded time-variant frequency-selective MIMO channel.

Moreover, in accordance with other embodiment, a CQI (multiple CQI reporting) for each configured SB may be reported using the selected composite Doppler-beam precoder matrix $P^{(l)}$ (l=1, L) (see equation (2) above) and a given multi-dimensional channel tensor H for the T time instants.

PMI Reporting for the Doppler-Beam Precoder P

In accordance with embodiments, the UE may select the precoder matrix indicator, PMI, for reporting (see step 258' in FIG. 12). When PMI reporting is configured at the UE, the UE reports at least a two-component PMI.

The first PMI component may correspond to the selected vectors $b_u^{(l)}$ and $f_{p,u,v}^{(l)}$, and may be represented in the form of tuple' sets, where each three-tuple (u, v) is associated with a selected spatial beam vector $b_u^{(l)}$ and a selected Doppler-frequency vector $f_{p,u,v}^{(l)}$. For example, the tuple' set may be represented by $i_1 = [i_{1,1}, i_{1,2}]$ for a rank-1 transmission. Here, $i_{1,1}$ contains $\Sigma_l\ U^{(l)}$ indices of selected DFT-vectors for the spatial beams, $i_{1,2}$ contains $2\ \Sigma_{u,d,l}\ F_{d,l}^{(l)}$ indices of selected Doppler-frequency-vectors.

FIG. 10 illustrates feedback indices associated with a beam and Doppler-frequency components for a layer-1 transmission assuming equal number of Doppler-frequency components per beam $F_u^{(l)} = V$, $\forall u$. FIG. 10 shows an example for $i_1$ for a layer-1 transmission. The subset $i_{1,1}$ of $i_1$ represents the beam indices selected from the codebook $\Omega_1$ and are denoted by $a_u$, $\forall u$. The subset $i_{1,2}$ of represents the delay indices selected from the codebook $\Omega_2$ and are denoted by $c_{d,u}$, $\forall d, u$. The subset $i_{1,3}$ of $i_1$ represents the selected Doppler-frequency indices from the codebook $\Omega_2$ and are denoted by $e_{v,d,u}$, $\forall v, d, u$.

In accordance with embodiments, to report the $2\ \Sigma_{u,l}\ F_u^{(l)}$ Doppler-beam combining coefficients $\gamma_{p,u,v}^{(l)}$ from the UE to the gNB, the UE may quantize the coefficients using a codebook approach.

The quantized combining coefficients are represented by $i_2$, the second PMI. The two PMIs are reported to the gNB. Strongest Doppler-Frequency Indicator In accordance with embodiments, the processor is configured to the select Doppler-frequency components for the beams for calculating the Doppler-beam dual-stage precoder, to indicate the Doppler-frequency component index corresponding to the strongest Doppler-frequency component and to feedback the Doppler-frequency component indices with the indication of the strongest Doppler-Frequency Component Index to the Transmitter.

The strongest Doppler-frequency may be associated with the Doppler-beam combining coefficients which have the highest power over all other combining coefficients associated with the Doppler-frequency components of the selected beams. The Doppler-frequency indices reported to the transmitter may be sorted so that the first index is associated with the strongest Doppler-frequency.

Precoder Construction at the gNB for the Doppler-Beam Precoder P

Figure 13:
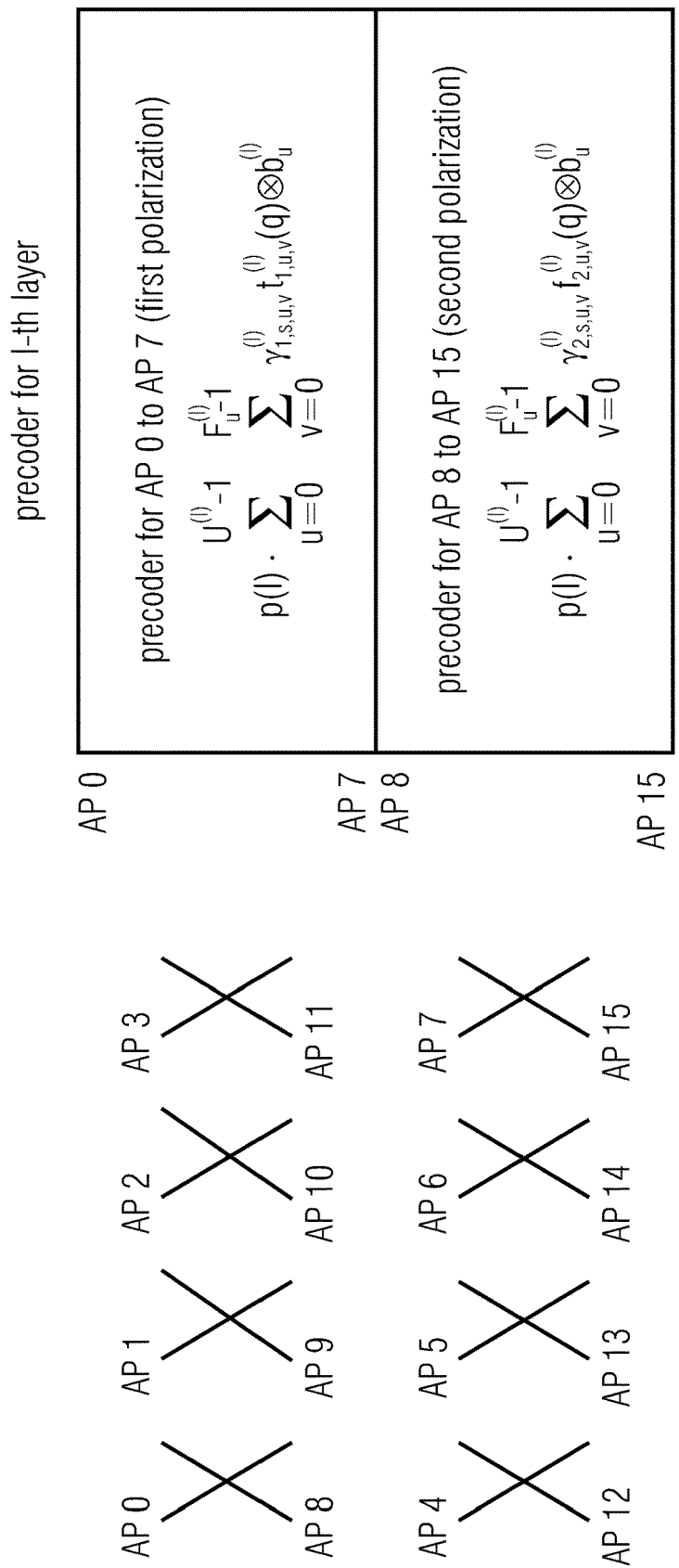
FIG. 13 illustrates a codebook based construction of the l-th layer Doppler-beam dual-stage precoder at the gNB and the association of the l-th layer Doppler-beam dual-stage precoder with the antenna ports (AP) for an example configuration $N_1$=4, $N_2$=2, P=2.

In accordance with embodiments, the gNB may use the two-component PMI feedback from the UE to construct the precoder matrix according to the codebook-based construction shown in FIG. 13, which illustrates a codebook based construction of the l-th layer precoder at the gNB and the association of the l-th layer precoder with the antenna ports (AP) for an example configuration $N_1=4$, $N_2=2$, $P=2$. The precoder matrix information is used to calculate a multi-user precoding matrix which is applied to the transmission signals to adapt the transmission parameters to the current multiuser channel conditions. The above Doppler-beam composite precoder matrix definition also facilitates the prediction of precoder matrices for future time instances. In this way, the number of CSI reports may be drastically reduced and feedback overhead is saved.

To facilitate Doppler-beam precoder matrix prediction for QT future time instants, the Doppler-frequency DFT-vectors $f_{p,u,v}^{(l)}$ may be cyclically extended to length-QT vectors $t_{p,u,v}^{(l)}$. The cyclic extension is defined by $$t_{p,u,v}^{(l)} = \left[1, e^{j\frac{2\pi k}{O_2}}, \ldots, e^{j\frac{2\pi k(Q-1)}{O_2}}\right]^T \otimes f_{p,u,v}^l, \forall u, v, p, l,$$

where $$f_{p,u,v}^{(l)} = \left[1, e^{j\frac{2\pi k}{O_2 T}}, \ldots, e^{j\frac{2\pi k(T-1)}{O_2 T}}\right]^T \in \Omega_2.$$

The predicted precoder matrix for the l-th layer and q-th (q=1, ..., QT) time instant, s-th subband, subcarrier or PRB is given by $$\hat{P}^{(l)}(q,s) = P^{(l)} \begin{bmatrix} \sum_{u=0}^{U^{(l)}-1} \sum_{v=0}^{F_u^{(l)}-1} \gamma_{1,s,u,v}^{(l)} t_{1,u,v}^{(l)}(q) \otimes b_u^{(l)} \\ \sum_{u=0}^{U^{(l)}-1} \sum_{v=0}^{F_u^{(l)}-1} \gamma_{2,s,u,v}^{(l)} t_{2,u,v}^{(l)}(q) \otimes b_u^{(l)} \end{bmatrix}$$

where $t_{p,u,v}^{(l)}(q)$ is the q-th entry of $t_{p,u,v}^{(l)}$.

The predicted precoding matrices may be used in predictive multi-user scheduling algorithms that attempt to optimize, for example, the throughput for all users by using the knowledge of current and future precoder matrices of the users.

Codebook for Doppler-Beam Combining Coefficients

In accordance with embodiments the UE may be configured to quantize the complex Doppler-beam coefficients $\gamma_{p,s,u,v}^{(l)}$ with a codebook approach. Each coefficient is represented by $$\gamma_{p,s,u,v}^{(l)} = \hat{\gamma}_{p,s,u,v}^{(l)} \phi_{p,s,u,v}^{(l)},$$

where $\hat{\gamma}_{p,s,u,v}^{(l)}$ is a polarization-, beam- and Doppler-frequency-dependent amplitude coefficient which is quantized with N bits; and $\phi_{p,s,u,v}^{(l)}$ represents a phase which is represented by a BPSK, or QPSK, or 8PSK, and any higher-order constellation.

In accordance with other embodiments, each coefficient may be represented by its real and imaginary part as $$\gamma_{p,s,u,v}^{(l)} = \text{Re}\{\hat{\gamma}_{p,s,u,v}^{(l)}\} + j\text{Imag}\{\hat{\gamma}_{p,s,u,v}^{(l)}\},$$

where $\text{Re}\{\hat{\gamma}_{p,u,v}^{(l)}\}$ and $\text{Imag}\{\hat{\gamma}_{p,u,v}^{(l)}\}$ are quantized each with N bits;

Precoder Application at gNB for the Doppler-Beam Precoder P

In accordance with embodiments the UE may assume that, for CQI, and/or RI, and/or PMI calculation, the gNB applies the Doppler-beam precoder calculated with respect to equation (2) above, to the PDSCH signals on antenna ports {1000,1008+v−1} for v=L layers as $$\begin{bmatrix} y^{(t,3000)}(i) \\ \vdots \\ y^{(t,3000+P-1)}(i) \end{bmatrix} = P(t,i) \begin{bmatrix} x^{(t,0)}(i) \\ \vdots \\ x^{(t,v-1)}(i) \end{bmatrix},$$

where
$[x^{(t,0)}(i), \ldots, x^{(t,v-1)}(i)]^T$ is a symbol vector of PDSCH symbols from the layer mapping defined in Subclause 7.3.1.4 of TS 38.211 [1], P ∈{1,2,4,8,12,16,24,32},
$x^{(t,u)}(i)$ is the i-th symbol of layer u at time instant t,
$y^{(t,u)}(i)$ is the precoded symbol transmitted on antenna port u at time instant t, and $P(t, i) = [P^{(1)}(t, i), \ldots, P^{(L)}(t, i)]$ is the predicted precoder matrix with P(t, i) being the t-th block and i-th column of $P^{(l)}$.

The corresponding PDSCH signals $[y^{(t,3000)}(i) \ldots y^{(t,3000+P-1)}(i)]$ transmitted on antenna ports [3000,3000+P−1] have a ratio of, energy per resource element, EPRE, to CSI-RS EPRE equal to the ratio given in Subclause 4.1 of TS 38.214 [2].

Doppler-Delay-Beam Three-Stage Composite Precoder and Doppler-Beam Dual-Stage Composite Precoder Extension to CQI Value Prediction In accordance with further embodiments the UE may be configured to predict a CQI value for time-instant/slot "n+K", where n denotes the current time-instant/slot, and K denotes the relative time difference with respect to the current time-instant/slot n.

In one embodiment, the UE uses in a first step a high resolution parameter estimation algorithm, such as RIMAX (see reference [5]), to estimate parameters of a channel model directly from the multi-dimensional channel tensor $\mathcal{H}$. For example, the time-variant MIMO channel model impulse response may be defined by a number of channel taps, where each channel tap is parameterized with a channel gain, Doppler-frequency shift and a delay. The time-variant frequency-selective MIMO channel model frequency-domain response between the i-th gNB antenna and the j-th UE antenna may be expressed by $$h_{i,j}(t,w) = \sum_{m=0}^{M-1} h_{i,j}(m) e^{j2\pi f_m t} e^{-j\frac{2\pi w \tau_m}{W}},$$

where
M is the number of channel delays,
$h_{i,j}(m)$ is the m-th path gain with associated Doppler-frequency shift $f_m$ and channel delay $\tau_m$,
t represent the time instant,
w denotes the subcarrier index, and
W denotes the total number of subcarriers.

In the present example, a non-polarimetric channel model is assumed, where the channel delays are identical for all links (i,j) of the MIMO channel.

It is noted that the coefficients of H(t, w) may also be calculated directly in a non-parameterized form from the MIMO channel tensor $\mathcal{H}$ by using a linear block-filtering approach such as least squares or minimum-mean-squared-error (MMSE) filtering (see references [6] and [7]). In this case, the channel predictor is formed by a weighted sum of the MIMO channel tensor $\mathcal{H}$.

In a second step, the parameterized channel model and the selected Doppler-delay-beam composite precoder $W^{(l)}$ (l=1, ..., L) (see equation (1) above) are used to calculate a parameterized precoded time-variant MIMO channel model frequency-domain response as $$H_{prec}(t,w) = H(t,w)[W^{(1)}(t,w), W^{(2)}(t,w), \ldots, W^{(L)}(t,w)],$$

where the (i,j) entry of $[H(t, w)]_{i,j} = h_{i,j}(t, w)$, and $W^{(l)}(t, w)$ is the t-th block and w-th column of $W^{(l)}$ (see FIG. 9).

Figure 14:
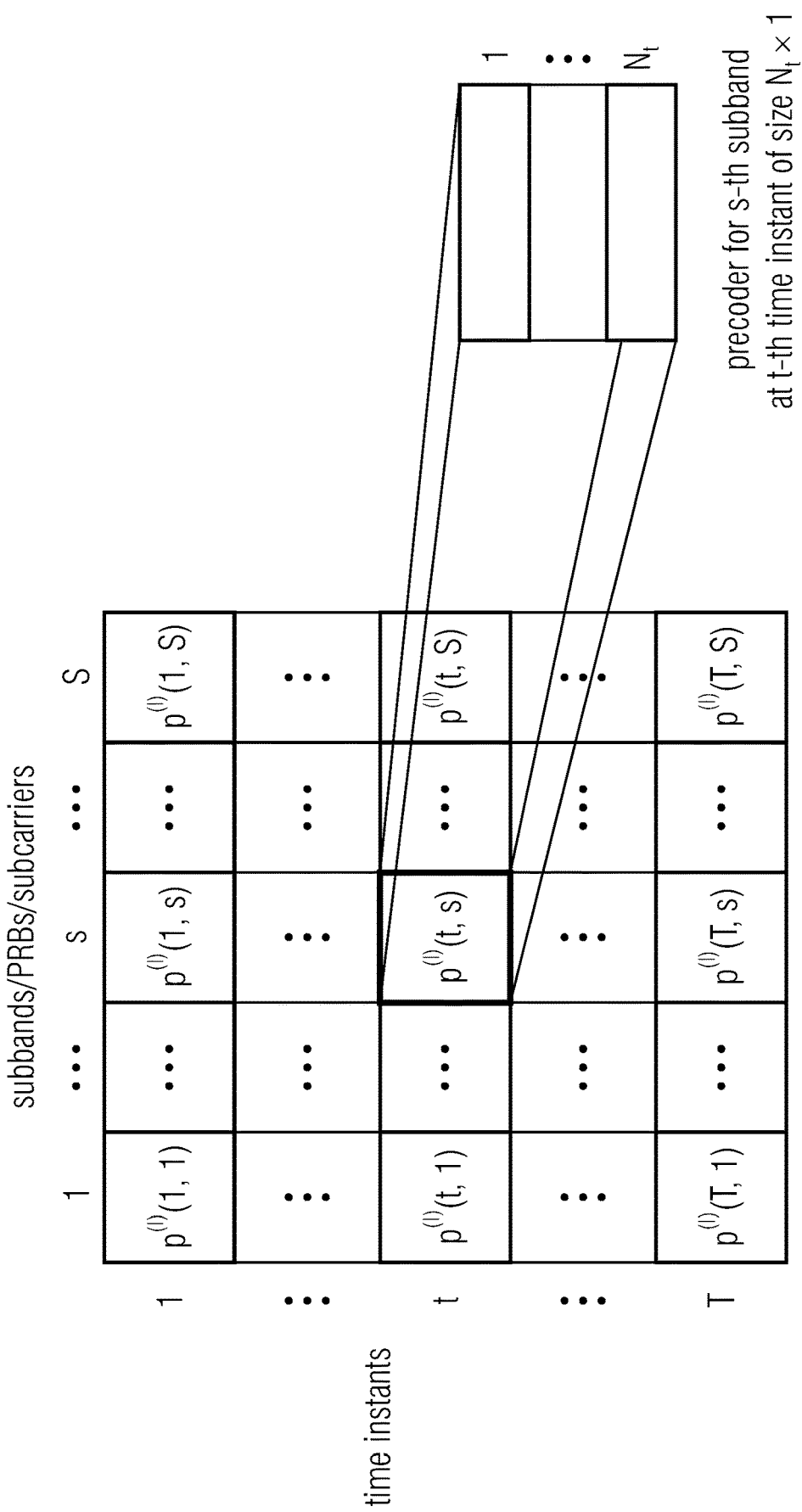
FIG. 14 illustrates a composite Doppler-beam dual-stage precoder matrix of size $N_t$·T×S.

Alternatively, when using the Doppler-beam composite precoder, the parameterized channel model and the selected Doppler-beam composite precoder $P^{(l)}$ (l=1, ..., L) (see equation (2) above) are used to calculate a parameterized precoded time-variant MIMO channel model frequency-domain response as $$H_{prec}(t,w)=H(t,w)[P^{(1)}(t,w),P^{(2)}(t,w),\ldots,P^{(L)}(t,w)],$$

where the (i,j) entry of $[H(t, w)]_{i,j}=h_{i,j}(t, w)$, and $P^{(l)}(t, w)$ is the t-th block and w-th column of $P^{(l)}$ (see FIG. 14).

In a third step, the UE uses the parameterized precoded MIMO channel model response to calculate a CQI value for a future time instant n+K, i.e., the CQI(n+K) is expressed as a function of $H_{prec}(n+K, w)$.

In accordance with further embodiments, the UE may use the above parameterized precoded MIMO channel response also to predict K future CQI values (multiple CQI reporting) for the "n+k" (k=0, . . . , K) future time instants. The K predicted CQI values may be used to calculate differential predicted CQI values by reducing the K predicted CQI values by the "average" CQI value. The predicted single CQI value, or predicted K CQI values, or predicted K differential CQI values is/are reported to the gNB.

As mentioned above, other embodiments operating on the basis of repeated downlink reference signals may use other precoders or other techniques to determine the CSI feedback based on the repeated downlink reference signals to report determine the CSI feedback. Thus, further embodiments of the present invention provide a communication device for providing a channel state information, CSI, feedback in a wireless communication system, wherein the communication device receives a CSI-RS resource configuration including a higher layer (e.g., RRC) parameter, e.g., referred to as CSI-RS-BurstDuration, indicating a time-domain-repetition of the downlink reference signals, e.g., in terms of a number of consecutive slots the downlink reference signals are repeated in. The communication device determines the CSI feedback based on the repeated downlink reference signals and reports the determined CSI feedback.

Extension to Port-Selection Codebook

In accordance with embodiments the UE may be configured with a CSI-RS reporting configuration via a higher layer for reporting a CQI, RI and PMI (if configured) for beam-formed CSI-RS. In this case, the vectors in the first codebook matrix are represented by $N_1N_2$-length column vectors, where the m-th vector (m=1, . . . , $N_1N_2$) contains a single 1 at the m-th position and zeros elsewhere.

It is noted that for the current PDSCH transmission scheme as described in [2] the precoder matrix is kept constant over time until it is updated by a reported PMI. In contrast, the approach in accordance with embodiments takes into account the channel variations by updating the precoder matrix continuously over time without instantaneous PMI reporting.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, the UE may comprise one or more of a mobile or stationary terminal, an IoT device, a ground based vehicle, an aerial vehicle, a drone, a building, or any other item or device provided with network connectivity enabling the item/device to communicate using the wireless communication system, like a sensor or actuator.

In accordance with embodiments, the base station may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system.

The embodiments of the present invention have been described above with reference to a communication system employing a rank 1 or layer 1 communication. However, the present invention is not limited to such embodiments and may also be implemented in a communication system employing a higher rank or layer communication. In such embodiments, the feedback includes the delays per layer and the complex precoder coefficients per layer.

The embodiments of the present invention have been described above with reference to a communication system in which the transmitter is a base station serving a user equipment, and the communication device or receiver is the user equipment served by the base station. However, the present invention is not limited to such embodiments and may also be implemented in a communication system in which the transmitter is a user equipment station, and the communication device or receiver is the base station serving the user equipment. In accordance with other embodiments, the communication device and the transmitter may both be UEs communicating via directly, e.g., via a sidelink interface.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 15:
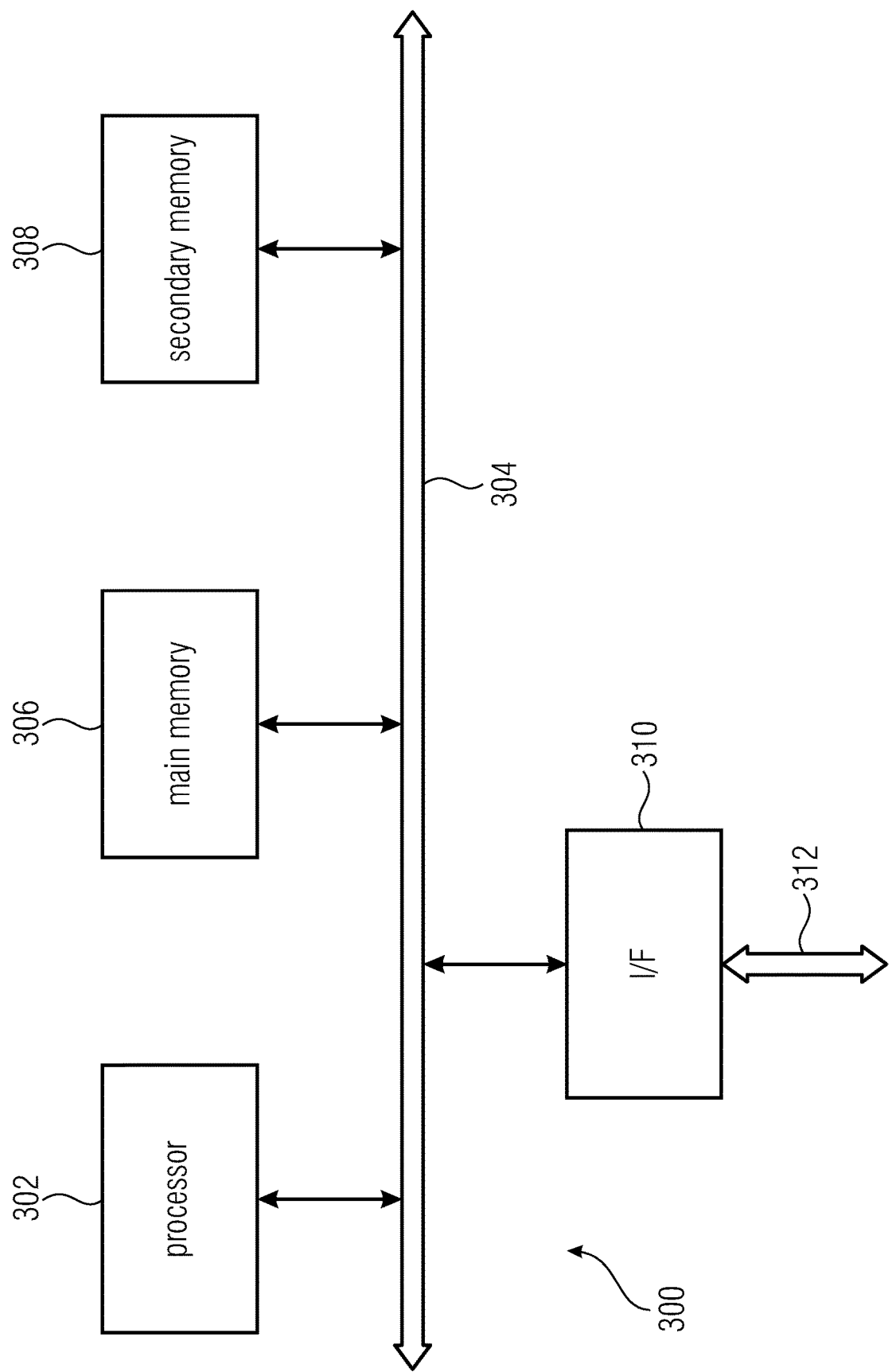
FIG. 15 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 15 illustrates an example of a computer system 350. The units or modules as well as the steps of the methods performed by these units may execute on one or more computer systems 350. The computer system 350 includes one or more processors 352, like a special purpose or a general purpose digital signal processor. The processor 352 is connected to a communication infrastructure 354, like a bus or a network. The computer system 350 includes a main memory 356, e.g., a random access memory (RAM), and a secondary memory 358, e.g., a hard disk drive and/or a removable storage drive. The secondary memory 358 may allow computer programs or other instructions to be loaded into the computer system 350. The computer system 350 may further include a communications interface 360 to allow software and data to be transferred between computer system 350 and external devices. The communication may be in the from electronic, electromagnetic, optical, or other signals capable of being handled by a communications interface. The communication may use a wire or a cable, fiber optics, a phone line, a cellular phone link, an RF link and other communications channels 362.

The terms "computer program medium" and "computer readable medium" are used to generally refer to tangible storage media such as removable storage units or a hard disk installed in a hard disk drive. These computer program products are means for providing software to the computer system 350. The computer programs, also referred to as computer control logic, are stored in main memory 356 and/or secondary memory 358. Computer programs may also be received via the communications interface 360. The computer program, when executed, enables the computer system 350 to implement the present invention. In particular, the computer program, when executed, enables processor 352 to implement the processes of the present invention, such as any of the methods described herein. Accordingly, such a computer program may represent a controller of the computer system 350. Where the disclosure is implemented using software, the software may be stored in a computer program product and loaded into computer system 350 using a removable storage drive, an interface, like communications interface 360.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] 3GPP TS 38.211 V15.1.0, "3rd Generation Partnership Project; Technical Specification Group Radio Access Network; NR; Physical channels and modulation (Release 15), March 2018.
[2] 3GPP TS 38.214 V15.1.0, "3rd Generation Partnership Project; Technical Specification Group Radio Access Network; NR; Physical layer procedures for data (Release 15), March 2018.
[3] K. Manolakis, S. Jaeckel, V. Jugnickel, and V. Braun, "Channel Prediction by Doppler-Delay Analysis and Benefits for Base Station Cooperation," in 77th IEEE Vehicular Technology Conference, June 2013.
[4] 3GPP TS 38.331 V15.1.0, "3rd Generation Partnership Project; Technical Specification Group Radio Access Network; NR; Radio Resource Control (RRC); Protocol specification (Release 15), March 2018.
[5] R. S. Thoma, M. Landmann, and A. Richter, "RIMAX-A maximum likelihood framework for parameter estimation in multidimensional channel sounding." Proceedings of the International Symposium on Antennas and Propagation (ISAP'04). 2004.
[6] I. Barhumi, G. Leus, and M. Moonen, "Optimal training design for MIMO OFDM systems in mobile wireless channels," IEEE Trans. Signal Process, vol. 51, no. 6, pp. 1615-1624, June 2003.
[7] P. Hoeher, S. Kaiser, and P. Robertson, "Two-dimensional pilot-symbol-aided channel estimation by Wiener filtering," in Proc. IEEE ICASSP-97, Munich, Germany, April 1997, pp. 1845-1848.

The invention claimed is:

1. A communication device for providing a Channel State Information (CSI) feedback in a wireless communication system, the communication device comprising:
a transceiver configured to receive, from a transmitter a radio signal via a time-variant, frequency-selective Multiple-input Multiple-output (MIMO) channel, the radio signal comprising downlink reference signals according to a reference signal configuration comprising a number of antenna ports, and downlink signals comprising the reference signal configuration; and a processor configured to
estimate a CSI using measurements on the downlink reference signals on the radio channel, the downlink reference signals provided over a certain observation time,
select, based on a performance metric, a Doppler-delay-beam precoder matrix, W, for a composite Doppler-delay-beam three-stage precoder, the Doppler-delay-beam three-stage precoder being based on one or more codebooks, the one or more codebooks comprising one or more transmit-side spatial beam components of the composite Doppler-delay-beam three-stage precoder, one or more delay components of the composite Doppler-delay-beam three-stage precoder, and one or more Doppler-frequency components of the composite Doppler-delay-beam three-stage precoder, calculate either one or more of a Channel Quality Indicator (CQI), and/or a Precoder Matrix Indicator (PMI), and/or a Rank Indicator (RI), using the CSI and the composite Doppler-delay-beam three-stage precoder with the selected Doppler-delay-beam precoder matrix, W, and report to the transmitter the CSI feedback comprising either one or more of the CQI, and/or the PMI and/or the RI, wherein the PMI and RI are used to indicate the Doppler-delay-beam three-stage composite precoder matrix for the configured antenna ports, wherein the one or more delay components and/or the one or more Doppler-frequency components of the composite Doppler-delay-beam three-stage precoder are defined by one submatrix of a Discrete Fourier Transform (DFT) matrix or by a-one sub-matrix of an oversampled DFT matrix.

2. The communication device of claim 1, wherein the Doppler-delay-beam three-stage precoder is configured to perform precoding in the spatial-delay-Doppler domain, the Doppler-delay-beam three-stage precoder being based on three separate codebooks, wherein the three separate codebooks comprise:

a first codebook, $\Omega_1$, for the one or more transmit-side spatial beam components of the composite Doppler-delay-beam three-stage precoder, a second codebook, $\Omega_2$, for the one or more delay components of the composite Doppler-delay-beam three-stage precoder, and a third codebook, $\Omega_3$, for the one or more Doppler-frequency components of the composite Doppler-delay-beam three-stage precoder, and a set of combination coefficients for complex scaling/combining one or more of the vectors selected from the first, second and third codebook, and wherein the entries of the second codebook matrix, $\Omega_2$, are given by a sub-matrix of a S×S DFT-matrix or a S×SO$_2$ oversampled DFT matrix, where S denotes the number of subbands, $O_2 \in \{1, 2, 3 \ldots\}$ denotes the oversampling factor—and/or wherein the entries of the third codebook matrix, $\Omega_3$, are given by a sub-matrix of a T×T DFT-matrix or a T×TO$_3$ oversampled DFT matrix, where T refers to a number of time instances during the observation time, and $O_3 \in \{1, 2, 3 \ldots\}$ denotes the oversampling factor.

3. The communication device of claim 1, wherein the precoder matrix, $W^{(l)}$, for the p-th polarization and the l-th layer is composed of:

$U^{(l)}$ beamforming vectors $b_u^{(l)}$ selected from the first codebook, $D_u^{(l)}$ delay vectors $d_{p,u,d}^{(l)}$ selected from the second codebook for the u-th beam, $F_{d,u}^{(l)}$ Doppler-frequency vectors $f_{p,u,d,v}^{(l)}$ selected from the third codebook for u-th beam and d-th delay, and a set of combination coefficients $\gamma_{p,u,d,v}^{(l)}$ for complex scaling/combining the vectors selected from the first, second and third codebook.

4. The communication device of claim 1, wherein the Doppler-delay-beam precoder matrix, W, of the l-th transmission layer and p-th polarization is represented by $$W^{(l)} = P^{(l)} \begin{bmatrix} \sum_{u=0}^{U^{(l)}-1} \sum_{d=0}^{D_u^{(l)}-1} \sum_{v=0}^{F_{d,u}^{(l)}-1} \gamma_{1,u,d,v}^{(l)} f_{1,u,d,v}^{(l)} \otimes d_{1,u,d}^{(l)T} \otimes b_u^{(l)} \\ \sum_{u=0}^{U^{(l)}-1} \sum_{d=0}^{D_u^{(l)}-1} \sum_{v=0}^{F_{d,u}^{(l)}-1} \gamma_{2,u,d,v}^{(l)} f_{2,u,d,v}^{(l)} \otimes d_{2,u,d}^{(l)T} \otimes b_u^{(l)} \end{bmatrix},$$

where $U^{(l)}$ is the number of beams per polarization for the l-th layer, $D_u^{(l)}$ is the number of delays for the l-th layer and u-th beam, $F_{d,u}^{(l)}$ is the number of Doppler-frequency components for the l-th layer, u-th beam and d-th delay, $f_{p,u,d,v}^{(l)}$ is the v-th Doppler-frequency vector of size T×1 associated with the l-th layer, d-th delay, u-th spatial beam, and the p-th (p=1,2) polarization of the precoder;

$d_{p,u,d}^{(l)}$ is the d-th delay vector of size S×1 associated with the l-th layer, u-th spatial beam and the p-th polarization of the precoder;

$b_u^{(l)}$ is the u-th spatial beam associated with the l-th layer;

$\gamma_{p,u,d,v}^{(l)}$ is the Doppler-delay complex combination coefficient associated with the l-th layer, u-th spatial beam, d-th delay, v-th Doppler-frequency and the p-th polarization of the precoder, and $P^{(l)}$ is a scalar normalization factor to ensure a certain average total transmission power.

5. The communication device of claim 4, wherein, for quantizing the complex Doppler-delay coefficients $\gamma_{p,u,d,v}^{(l)}$ with a codebook approach, each coefficient is represented by $$\gamma_{p,u,d,v}^{(l)} = \hat{\gamma}_{p,u,d,v}^{(l)} \phi_{p,u,d,v}^{(l)},$$

where $\hat{\gamma}_{p,u,d,v}^{(l)}$ is a polarization-, beam-, delay- and Doppler-frequency-dependent amplitude coefficient which is quantized with N bits; and $\phi_{p,u,d,v}^{(l)}$ represents a phase which is represented by a BPSK, or QPSK, or 8PSK, or any other higher-order PSK constellation, or wherein each coefficient is represented by its real and imaginary part as $$\gamma_{p,u,d,v}^{(l)} = \text{Re}\{\hat{\gamma}_{p,u,d,v}^{(l)}\} + j \cdot \text{Imag}\{\hat{\gamma}_{p,u,d,v}^{(l)}\},$$

where $\text{Re}\{\hat{\gamma}_{p,u,d,v}^{(l)}\}$ and $\text{Imag}\{\hat{\gamma}_{q,u,d,v}^{(l)}\}$ are quantized each with N bits.

6. The communication device of claim 1, wherein the communication device is configured with a CSI-RS reporting configuration via a higher layer for reporting either the CQI and/or RI and/or PMI for a beam-formed CSI-RS, the vectors in the first codebook matrix represented by $N_1N_2$-length column vectors, where the m-th vector (m=1, ..., $N_1N_2$) comprises a single 1 at the m-th position and zeros elsewhere.

7. The communication device of claim 1, wherein the communication device is configured to receive a CSI-RS resource configuration comprising an indication of a time-domain-repetition of the downlink reference signals, e.g., in terms of a number of consecutive slots the downlink reference signals are repeated in.

8. The communication device of claim 1, wherein the precoder matrix, $P^{(l)}$, for the p-th polarization, l-th transmission layer, and s-th subband, subcarrier or physical resource block (PRB) is composed of
 $U^{(l)}$ beamforming vectors $b_u^{(l)}$, independent of the subband, subcarrier or physical resource block, selected from the first codebook,
 $F_u^{(l)}$ Doppler-frequency vectors $f_{p,u,v}^{(l)}$, independent of the subband, subcarrier or physical resource block, selected from the second codebook for u-th beam, and
 a set of combination coefficients $\gamma_{p,s,u,v}^{(l)}$ for complex scaling/combining the vectors selected from the first and second codebook.

9. A transmitter in a wireless communication system comprising a communication device, the transmitter comprising:
 an antenna array comprising a plurality of antennas for a wireless communication with one or more communication devices of claim 1 for providing a Channel State Information feedback to the transmitter; and
 a precoder connected to the antenna array, the precoder to apply a set of beamforming weights to one or more antennas of the antenna array to form, by the antenna array, one or more transmit beams or one or more receive beams,
 a transceiver configured to
  transmit, to the communication device, downlink reference signals, CSI-RS, according to a CSI-RS configuration comprising indicating a time-domain-repetition of the downlink reference signals, e.g., in terms of a number of consecutive slots the downlink reference signals are repeated in, and downlink signals comprising the CSI-RS configuration; and
  receive uplink signals comprising one or more CSI reports from the communication device; and
 a processor configured to:
  extract at least the two component precoder matrix identifier and the rank indicator from the plurality of CSI reports; and
  construct a Doppler-delay-beam precoder matrix applied on the antenna ports using a first component and a second component of the PMI, and determine the beamforming weights responsive to the constructed precoder matrix.

10. A communication device for providing a Channel State Information (CSI), feedback in a wireless communication system, the communication device comprising:
 a transceiver configured to receive, from a transmitter a radio signal via a time-variant, frequency-selective Multiple-input Multiple-output (MIMO) channel, the radio signal comprising downlink reference signals according to a reference signal configuration comprising a number of antenna ports, and downlink signals comprising the reference signal configuration; and
 a processor configured to
  estimate a CSI using measurements on the downlink reference signals on the radio channel, the downlink reference signals provided over a certain observation time,
  select, based on a performance metric, a Doppler-beam precoder matrix, P, for a composite Doppler-beam dual-stage precoder, the Doppler-beam dual-stage precoder being based on one or more codebooks, the one or more codebooks comprising
   one or more transmit-side spatial beam components of the composite Doppler-beam dual-stage precoder, and
   one or more Doppler-frequency components of the composite Doppler-beam dual-stage precoder,
  calculate one or more of a Channel Quality Indicator (CQI), and/or a precoder matrix indicator, Precoder Matrix Indicator (PMI), and/or and a Rank Indicator (RI), using the CSI and the composite Doppler-beam dual-stage precoder with the selected Doppler-beam precoder matrix, P, and
  report to the transmitter the CSI feedback comprising either one or more of the CQI, and/or the PMI and/or the RI, wherein the PMI and RI are used to indicate the Doppler-beam dual-stage composite precoder matrix for the configured antenna ports.

11. The communication device of claim 10, wherein the one or more Doppler-frequency components of the composite Doppler-beam dual-stage precoder are defined by one sub-matrix of a DFT matrix or by one sub-matrix of an oversampled DFT matrix.

12. The communication device of claim 10, wherein the Doppler-beam dual-stage precoder is configured to perform precoding in the spatial-Doppler domains, the Doppler-beam dual-stage precoder being based on two separate codebooks, wherein the two separate codebooks comprise
 a first codebook, $\Omega_1$, for the one or more transmit-side spatial beam components of the composite Doppler-beam dual-stage precoder,
 a second codebook, $\Omega_2$, for the one or more Doppler-frequency components of the composite Doppler-beam dual-stage precoder, and
 a set of combination coefficients for complex scaling/combining one or more of the vectors selected from the first and second codebook.

13. The communication device of claim 10, wherein the Doppler-beam dual-stage precoder matrix, $P^{(l)}$, is configured to perform precoding in the spatial-Doppler domains and is represented for the l-th transmission layer and the s-th sub-band, subcarrier or PRB by $$P^{(l)}(s) = P^{(l)} \begin{bmatrix} \sum_{u=0}^{U^{(l)}-1} \sum_{v=0}^{F_u^{(l)}-1} \gamma_{1,s,u,v}^{(l)} f_{1,u,v}^{(l)} \otimes b_u^{(l)} \\ \sum_{u=0}^{U^{(l)}-1} \sum_{v=0}^{F_u^{(l)}-1} \gamma_{2,s,u,v}^{(l)} f_{2,u,v}^{(l)} \otimes b_u^{(l)} \end{bmatrix},$$

where
 $U^{(l)}$ is the number of beams per polarization for the l-th layer,
 $F_u^{(l)}$ is the number of Doppler-frequency components for the l-th layer, u-th beam,
 $f_{p,u,v}^{(l)}$ is the v-th Doppler-frequency vector of size T×1 associated with the l-th layer, u-th spatial beam, and the p-th (p=1,2) polarization of the precoder;
 $b_u^{(l)}$ is the u-th spatial beam associated with the l-th layer;
 $\gamma_{p,s,u,v}^{(l)}$ is the complex Doppler-beam combination coefficient associated with the l-th layer, u-th spatial beam, v-th Doppler-frequency, s-th sub-band, subcarrier or PRB, and the p-th polarization of the precoder, and
 $P^{(l)}$ is a scalar normalization factor to ensure a certain total transmission power.

14. The communication device of claim 10, wherein, for quantizing the complex Doppler-delay coefficients $\gamma_{p,s,u,v}^{(l)}$ with a codebook approach, each coefficient is represented by $$\gamma_{p,s,u,v}^{(l)} = \hat{\gamma}_{p,s,u,v}^{(l)} \phi_{p,s,u,v}^{(l)},$$

where $\hat{\gamma}_{p,s,u,v}^{(l)}$ is a polarization-, beam- and Doppler-frequency-dependent amplitude coefficient which is quantized with N bits; and $\phi_{p,s,u,v}^{(l)}$ represents a phase which is represented by a BPSK, or QPSK, or 8PSK, or any other higher-order PSK constellation, or wherein each coefficient is represented by its real and imaginary part as $$\gamma_{p,s,u,v}^{(l)} = \text{Re}\{\hat{\gamma}_{p,s,u,v}^{(l)}\} + j \cdot \text{Imag}\{\hat{\gamma}_{p,s,u,v}^{(l)}\},$$

where $\text{Re}\{\hat{\gamma}_{p,s,u,v}^{(l)}\}$ and $\text{Imag}\{\hat{\gamma}_{q,s,u,v}^{(l)}\}$ are quantized each with N bits.

15. The communication device of claim 10, wherein the communication device is configured with a CSI-RS reporting configuration via a higher layer for reporting either the CQI and/or RI and/or PMI for a beam-formed CSI-RS, the vectors in the first codebook matrix represented by $N_1N_2$-length column vectors, where the m-th vector (m=1, . . . , $N_1N_2$) comprises a single 1 at the m-th position and zeros elsewhere.

16. The communication device of claim 10, wherein the communication device is configured to receive a CSI-RS resource configuration comprising indicating a time-domain-repetition of the downlink reference signals, e.g., in terms of a number of consecutive slots the downlink reference signals are repeated in.

17. A transmitter in a wireless communication system comprising a communication device, the transmitter comprising:

an antenna array comprising a plurality of antennas for a wireless communication with one or more communication devices of claim 1 for providing a Channel State Information feedback to the transmitter; and a precoder connected to the antenna array, the precoder to apply a set of beamforming weights to one or more antennas of the antenna array to form, by the antenna array, one or more transmit beams or one or more receive beams, a transceiver configured to transmit, to the communication device, downlink reference signals according to a CSI-RS configuration comprising a number of CSI-RS antenna ports and indicating a time-domain-repetition of the downlink reference signals, e.g., in terms of a number of consecutive slots the downlink reference signals are repeated in, and downlink signals comprising the CSI-RS configuration; and receive uplink signals comprising a plurality of CSI reports from the communication device; and a processor configured to:

extract at least the two component precoder matrix identifier and the rank indicator from the one or more CSI reports; and construct a Doppler-beam precoder matrix applied on the antenna ports using a first component and a second component of the PMI, and determine the beamforming weights responsive to the constructed precoder matrix.

18. A method for providing a Channel State Information, (CSI), feedback in a wireless communication system, the method comprising:

receiving, from a transmitter, a radio signal via a time-variant, frequency-selective Multiple-input Multiple-output (MIMO) channel, the radio signal comprising downlink reference signals according to a reference signal configuration comprising a number of antenna ports, and downlink signals comprising the reference signal configuration;

estimating, at the communication device, a CSI using measurements on the downlink reference signals on the radio channel, the downlink reference signals provided over a certain observation time, based on a performance metric, selecting, at the communication device, a Doppler-delay-beam precoder matrix, W, for a composite Doppler-delay-beam three-stage precoder, the Doppler-delay-beam three-stage precoder being based on one or more codebooks, the one or more codebooks comprising one or more transmit-side spatial beam components of the composite Doppler-delay-beam three-stage precoder, one or more delay components of the composite Doppler-delay-beam three-stage precoder, and ° one or more Doppler-frequency components of the composite Doppler-delay-beam three-stage precoder, calculating, at the communication device, one or more of a Channel Quality Indicator (CQI), and/or a Precoder Matrix Indicator (PMI), and/or a Rank Indicator (RI), using the CSI and the composite Doppler-delay-beam three-stage precoder with the selected Doppler-delay-beam precoder matrix, W, and reporting from the communication device to the transmitter the CSI feedback comprising one or more of the CQI, and/or the PMI and/or the RI, wherein the PMI and RI are used to indicate the Doppler-delay-beam three-stage composite precoder matrix for the configured antenna ports, wherein the one or more delay components and/or the one or more Doppler-frequency components of the composite Doppler-delay-beam three-stage precoder are defined by one matrix of a Discrete Fourier Transform (DFT) matrix or by one or more sub-matrices matrix of an oversampled DFT matrix.

19. A method for providing a Channel State Information (CSI) feedback in a wireless communication system, the method comprising:

receiving, from a transmitter, a radio signal via a time-variant, frequency-selective Multiple-input Multiple-output (MIMO) channel, the radio signal comprising downlink reference signals according to a reference signal configuration comprising a number of antenna ports, and downlink signals comprising the reference signal configuration;

estimating, at the communication device, a CSI using measurements on the downlink reference signals on the radio channel, the downlink reference signals provided over a certain observation time, based on a performance metric, selecting, at the communication device, a Doppler-beam precoder matrix, P, for a composite Doppler-beam dual-stage precoder, the Doppler-beam dual-stage precoder being based on one or more codebooks, the one or more codebooks comprising
- one or more transmit-side spatial beam components of the composite Doppler-beam dual-stage precoder, and
- one or more Doppler-frequency components of the composite Doppler-beam dual-stage precoder, calculating one or more of a Channel Quality Indicator (CQI), a Precoder Matrix Indicator (PMI), and/or a Rank Indicator (RI), using the CSI and the composite Doppler-beam dual-stage precoder with the selected Doppler-beam precoder matrix, P, and reporting to the transmitter the CSI feedback comprising either one or more of the CQI, and/or the PMI and/or the RI, wherein the PMI and RI are used to indicate the Doppler-beam dual-stage composite precoder matrix for the configured antenna ports.

* * * * *

UNITED STATES PATENT AND TRADEMARK OFFICE
CERTIFICATE OF CORRECTION

PATENT NO. : 11,996,910 B2
APPLICATION NO. : 17/197562
DATED : May 28, 2024
INVENTOR(S) : Venkatesh Ramireddy et al.

Page 1 of 1

It is certified that error appears in the above-identified patent and that said Letters Patent is hereby corrected as shown below:

In the Claims

Claim number 1, on Column 61, Line number 25:
form (DFT) matrix or by a-one sub-matrix of an
Should read:
form (DFT) matrix or by one sub-matrix of an Claim number 2, on Column 61, Line number 50:
factor-and/or
Should read:
factor and/or Claim number 18, on Column 66, Line number 30:
pler-delay-beam three-stage precoder, and ° one or
Should read:
pler-delay-beam three-stage precoder, and one or Claim number 18, on Column 66, Line number 49:
(DFT) matrix or by one or more sub-matrices matrix of
Should read:
(DFT) matrix or by one sub-matrix of Signed and Sealed this
Fifteenth Day of April, 2025

Coke Morgan Stewart
*Acting Director of the United States Patent and Trademark Office*